US008050502B2

(12) United States Patent
Sato

(10) Patent No.: US 8,050,502 B2
(45) Date of Patent: Nov. 1, 2011

(54) TWO-DIMENSIONAL CODE GENERATION METHOD, TWO-DIMENSIONAL CODE, TWO-DIMENSIONAL CODE RECOGNITION METHOD, AND IMAGE RECOGNITION DEVICE

(75) Inventor: Kotaro Sato, Sagamihara (JP)

(73) Assignee: NAMCO BANDAI Games Inc., Tokyo (JP)

( * ) Notice: Subject to any disclaimer, the term of this patent is extended or adjusted under 35 U.S.C. 154(b) by 1142 days.

(21) Appl. No.: 11/812,067

(22) Filed: Jun. 14, 2007

(65) Prior Publication Data

US 2007/0297679 A1    Dec. 27, 2007

(30) Foreign Application Priority Data

Jun. 21, 2006   (JP) .................. 2006-171680
Jun. 21, 2006   (JP) .................. 2006-171681

(51) Int. Cl.
  *G06K 9/46*   (2006.01)
  *G06K 9/66*   (2006.01)
(52) U.S. Cl. ...................... 382/192; 382/181
(58) Field of Classification Search .......... 382/181, 382/192
See application file for complete search history.

(56) References Cited

U.S. PATENT DOCUMENTS

| 5,053,609 | A | 10/1991 | Priddy et al. |
| 5,189,292 | A * | 2/1993 | Batterman et al. ............ 235/494 |
| 5,449,895 | A | 9/1995 | Hecht et al. |
| 5,706,099 | A | 1/1998 | Curry |
| 6,321,986 | B1 | 11/2001 | Ackley |
| 6,752,316 | B2 * | 6/2004 | Mizoguchi .............. 235/462.09 |
| 7,412,089 | B2 * | 8/2008 | Squires et al. ................ 382/141 |
| 2001/0033688 | A1 * | 10/2001 | Taylor ........................... 382/181 |
| 2005/0121520 | A1 * | 6/2005 | Yamaguchi et al. ..... 235/462.09 |
| 2006/0269136 | A1 * | 11/2006 | Squires et al. ................ 382/181 |

FOREIGN PATENT DOCUMENTS

JP      B2-2938338     8/1999

* cited by examiner

*Primary Examiner* — Stephen Koziol
(74) *Attorney, Agent, or Firm* — Oliff & Berridge, PLC

(57) ABSTRACT

A two-dimensional code in which given data is encoded as a two-dimensional image. The two-dimensional code includes as image elements: points each of which is placed at point placement reserved position in a two-dimensional region based on a binary data string uniquely associated with the given data according to a preset binary data string placement condition; and a line connecting each of the points and a connection target point according to a preset connection condition. The two-dimensional code is formed as a two-dimensional image by causing the line connecting the points to have a given width.

21 Claims, 43 Drawing Sheets

FIG.3

| −1 | −1 | −1 |
|----|----|----|
| −1 | 8  | −1 |
| −1 | −1 | −1 |

FIG.4

| 1 | 1 | 1 |
|---|---|---|
| 1 | 1 | 1 |
| 1 | 1 | 1 |

FIG.19

| DECIMAL NUMBER | BINARY NUMBER | STANDARD FIBONACCI REPRESENTATION |
|---|---|---|
| 0 | 0 | 0 |
| 1 | 1 | 1 |
| 2 | 10 | 10 |
| 3 | 11 | 100 |
| 4 | 100 | 101 |
| 5 | 101 | 1000 |
| 6 | 110 | 1001 |
| 7 | 111 | 1010 |
| 8 | 1000 | 10000 |
| 9 | 1001 | 10001 |
| 10 | 1010 | 10010 |
| 11 | 1011 | 10100 |
| 12 | 1100 | 10101 |
| 13 | 1101 | 100000 |
| 14 | 1110 | 100001 |
| 15 | 1111 | 100010 |
| 16 | 10000 | 100100 |
| 17 | 10001 | 100101 |
| 18 | 10010 | 101000 |
| 19 | 10011 | 101001 |
| 20 | 10100 | 101010 |
| 21 | 10101 | 1000000 |
| 22 | 10110 | 1000001 |
| 23 | 10111 | 1000010 |
| 24 | 11000 | 1000100 |
| 25 | 11001 | 1000101 |
| 26 | 11010 | 1001000 |
| 27 | 11011 | 1001001 |
| 28 | 11100 | 1001010 |
| 29 | 11101 | 1010000 |
| 30 | 11110 | 1010001 |
| 31 | 11111 | 1010010 |
| 32 | 100000 | 1010100 |
| 33 | 100001 | 1010101 |
| 34 | 100010 | 10000000 |

FIG.21
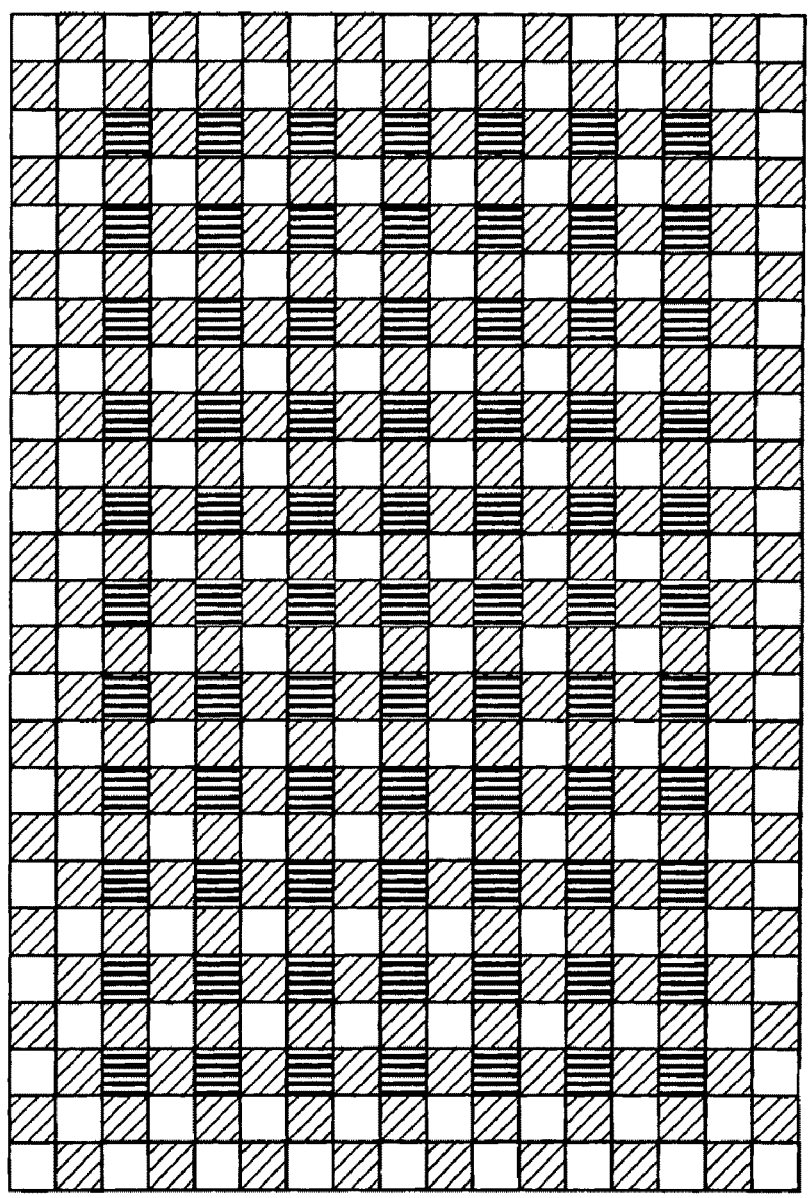
 ML MAIN LAYER
 SL SUBLAYER

FIG.25
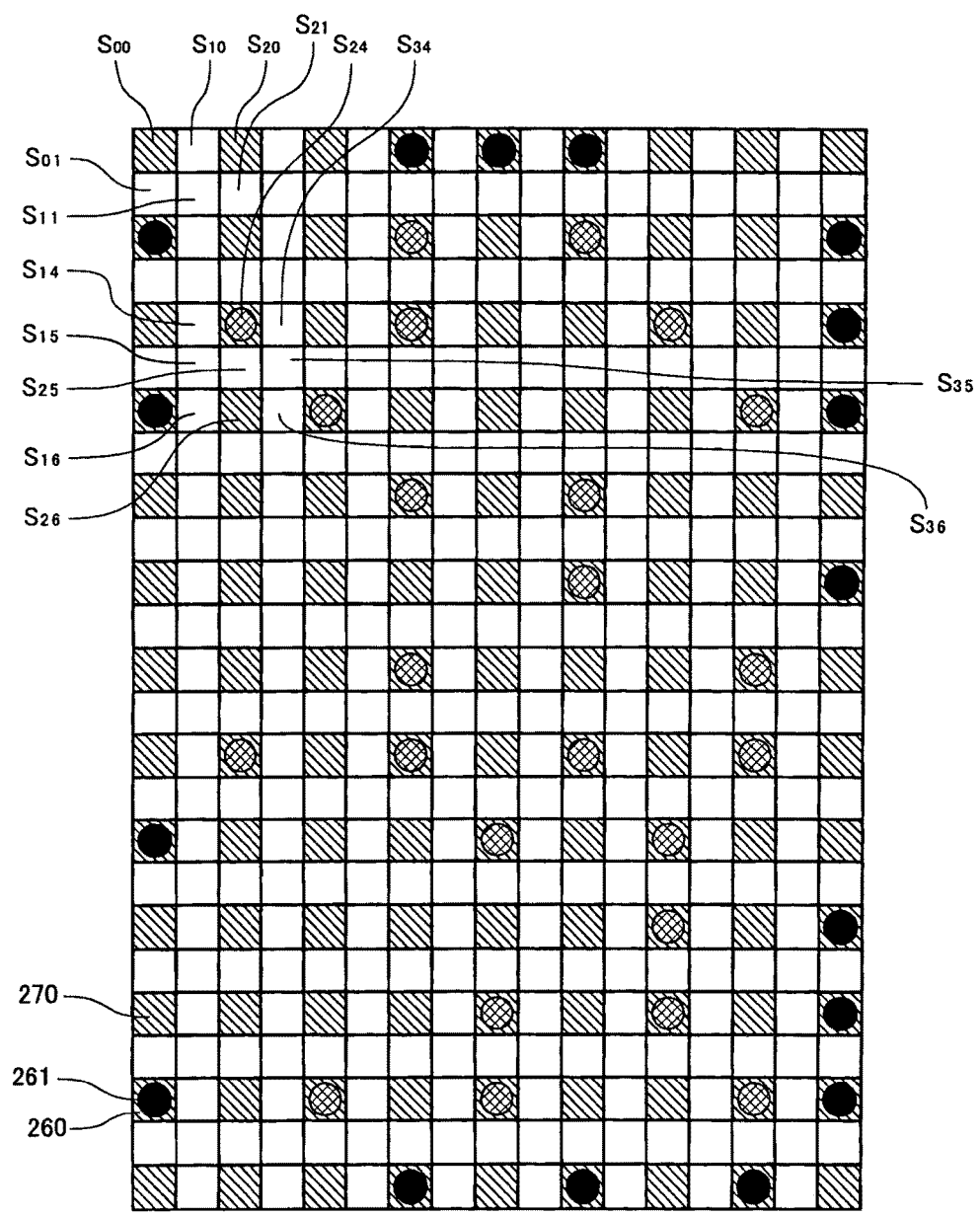
RA RESERVED AREA

FIG.45

| LEVEL | ERROR RESISTANCE | SECURITY PERFORMANCE | PROCESSING SPEED |
|---|---|---|---|
| 1 | × | × | ◎ |
| 2 | △ | × | ◎ |
| 3 | ○ | △ | ○ |
| 4 | ○ | ○ | △ |
| 5 | ◎ | ◎ | × |

TABLE 1 "MELON CODE RECOGNITION LEVEL COMPARISON TABLE"

TWO-DIMENSIONAL CODE GENERATION METHOD, TWO-DIMENSIONAL CODE, TWO-DIMENSIONAL CODE RECOGNITION METHOD, AND IMAGE RECOGNITION DEVICE

Japanese Patent Application No. 2006-171680, filed on Jun. 21, 2006, and Japanese Patent Application No. 2006-171681, filed on Jun. 21, 2006, are hereby incorporated by reference in their entirety.

BACKGROUND OF THE INVENTION

The present invention relates to a two-dimensional code generation method, a two-dimensional code, a two-dimensional code recognition method, and an image recognition device.

A two-dimensional code has been known in which modules representing data are placed two-dimensionally based on predetermined format information. The two-dimensional code allows a large amount of data to be read using a narrow region in comparison with a one-dimensional code. Japanese Patent No. 2938338 discloses a related-art technology, for example.

When using such a two-dimensional code for card identification or the like, the two-dimensional code is printed on the front surface or the back surface of the card using a visible ink or an invisible ink which absorbs infrared rays and the like.

As shown in FIG. 46, a rare card can be relatively easily forged by a patch.

For example, it is possible to take measures against forgery by introducing an advanced technology in the card. However, this increases the manufacturing cost, whereby the profitability is reduced.

It is also possible to take measures against forgery by printing a minute pattern on the card. However, this method requires a high-performance camera for reading the card, thereby making it difficult to read a number of cards at one time using an inexpensive camera.

SUMMARY

According to a first aspect of the invention, there is provided a two-dimensional code generation method comprising:

a binary data string generation step of generating a binary data string uniquely associated with given data based on the given data;

a point placement step of setting point placement reserved positions at each of which a point may be placed in a two-dimensional region, and placing a point at each of the point placement reserved positions in the two-dimensional region according to a preset binary data string placement condition based on the binary data string;

a connection step of connecting points placed in the two-dimensional region through a line according to a preset connection condition; and an image generation step of generating an image of the two-dimensional code based on the line.

According to a second aspect of the invention, there is provided a two-dimensional code generation method comprising:

a binary data string generation step of generating a binary data string uniquely associated with given data based on the given data;

a point placement step of setting point placement reserved positions at each of which a point may be placed in a two-dimensional region, and placing a point at each of the point placement reserved positions in the two-dimensional region based on the binary data string; and an image generation step of generating an image of the two-dimensional code based on the point, the point placement step including setting a main layer in the two-dimensional region, placing a point at part of the point placement reserved positions belonging to the main layer based on the binary data string, and placing a dummy point at another part of the point placement reserved positions belonging to a layer in the two-dimensional region other than the main layer.

According to a third aspect of the invention, there is provided a two-dimensional code in which given data is encoded as a two-dimensional image, the two-dimensional code comprising as image elements:

points each of which is placed at point placement reserved position in a two-dimensional region based on a binary data string uniquely associated with the given data according to a preset binary data string placement condition; and a line connecting each of the points and a connection target point according to a preset connection condition, the two-dimensional code being formed as a two-dimensional image by causing the line connecting the points to have a given width.

According to a fourth aspect of the invention, there is provided a two-dimensional code in which given data is encoded as a two-dimensional image, the two-dimensional code comprising as image elements:

points placed at point placement reserved positions belonging to a main layer set in a two-dimensional region based on a binary data string uniquely associated with the given data; and dummy points placed at point placement reserved positions belonging to a layer in the two-dimensional region other than the main layer, the two-dimensional code being formed as a two-dimensional image by causing the points to have a given pattern.

According to a fifth aspect of the invention, there is provided a two-dimensional code recognition method comprising:

a focused point pixel information detection step of detecting a reference point correspondence position of a recognition target image, calculating a focused point correspondence position on a recognition target image corresponding to a focused point set while being associated with a reference point based on the reference point correspondence position, and detecting pixel information of the recognition target image based on the calculated focused point correspondence position; and a correspondence data calculation step of calculating correspondence data associated with a two-dimensional code based on the detected pixel information.

According to a sixth aspect of the invention, there is provided an image recognition device recognizing a two-dimensional code, comprising:

a focused point pixel information detecting section which detects a reference point correspondence position of a recognition target image, calculates a focused point correspondence position on a recognition target image corresponding to a focused point set while being associated with a reference point based on the reference point correspondence position, and detects pixel information of the recognition target image based on the calculated focused point correspondence position; and a correspondence data calculating section which calculates correspondence data associated with a two-dimensional code based on the detected pixel information.

BRIEF DESCRIPTION OF THE SEVERAL VIEWS OF THE DRAWING

FIG. 3 shows a specific example of 3×3 quadratic differential operators used when performing the quadratic differential process.

FIG. 4 shows a specific example of a blur filter used for a blur process.

FIG. 19 shows a correspondence table of decimal numbers, binary numbers, and standard Fibonacci representation.

FIG. 21 is another view illustrative of an example of a two-dimensional region according to one embodiment of the invention.

FIG. 25 is a view showing a state in which parity information is set based on placement of points in main layers and stones are placed in the parity layers.

FIG. 45 shows a comparison table of a two-dimensional code recognition level.

DETAILED DESCRIPTION OF THE EMBODIMENT

Figure 1:
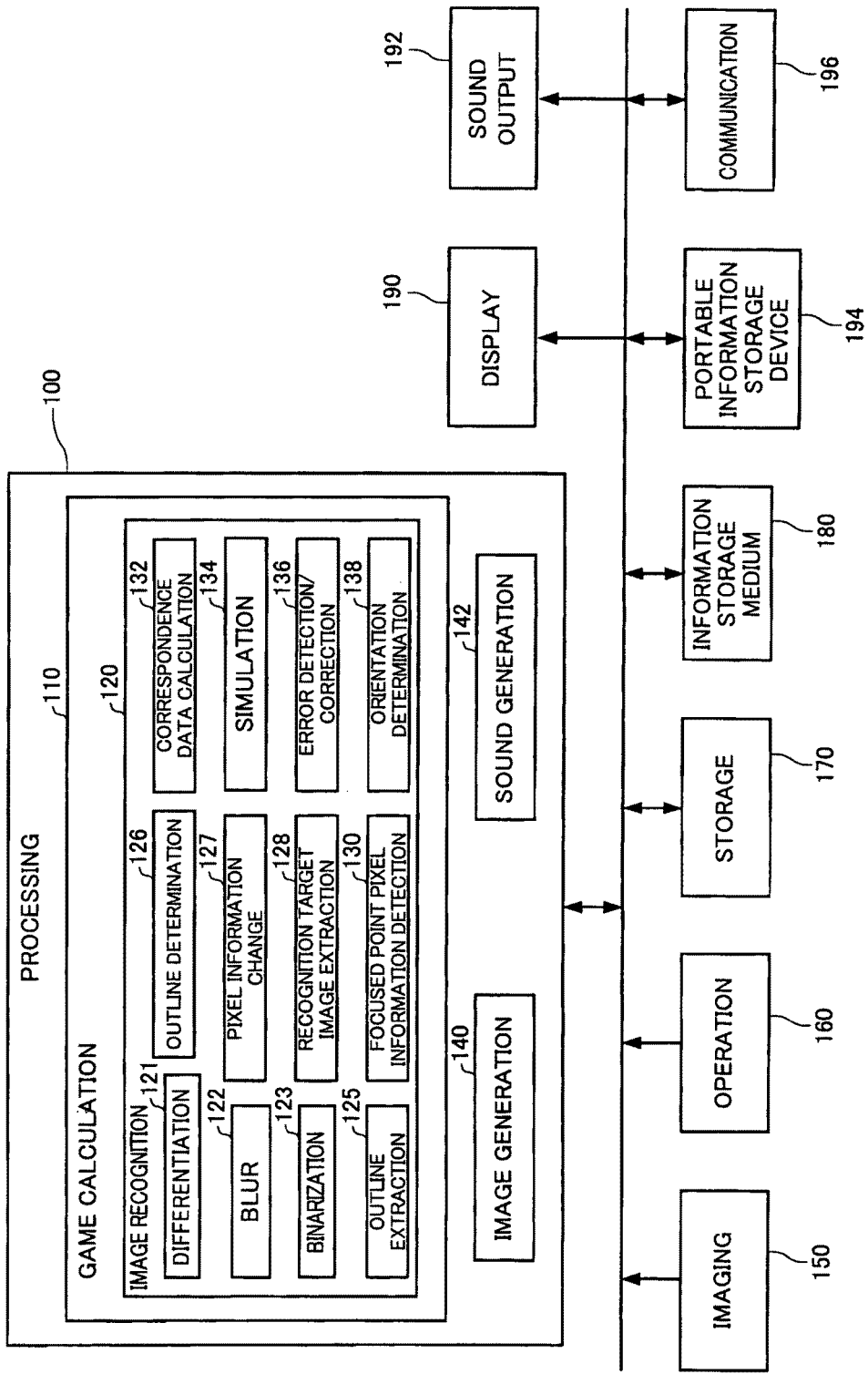
FIG. 1 is a functional block diagram of a game system to which an image recognition device according to one embodiment of the invention is applied.

The invention may provide a two-dimensional code which can be generated and read at low cost, rarely allows forgery, and allows high-speed code generation and recognition.

(1) According to one embodiment of the invention, there is provided a two-dimensional code generation method comprising:

a binary data string generation step of generating a binary data string uniquely associated with given data based on the given data;

a point placement step of setting point placement reserved positions at each of which a point may be placed in a two-dimensional region, and placing a point at each of the point placement reserved positions in the two-dimensional region according to a preset binary data string placement condition based on the binary data string;

a connection step of connecting points placed in the two-dimensional region through a line according to a preset connection condition; and an image generation step of generating an image of the two-dimensional code based on the line.

According to one embodiment of the invention, there is provided a two-dimensional code generation system in which the above steps are implemented. According to one embodiment of the invention, there is provided a program causing a computer to implement the above steps. According to one embodiment of the invention, there is provided a computer-readable information storage medium storing a program which causes a computer to implement the above steps.

According to one embodiment of the invention, there is provided a method of manufacturing a card on which is printed a two-dimensional code generated by implementing the above steps.

(2) In each of the above-described two-dimensional code generation method, program, information storage medium, two-dimensional code generation system, and method of manufacturing a card on which a two-dimensional code is printed, the point placement step may include setting a matrix based on the binary data string, associating the point placement reserved positions with elements of the matrix, and placing a point at each of the associated point placement reserved positions based on a value of each of the elements of the matrix.

(3) In each of the above-described two-dimensional code generation method, program, information storage medium, two-dimensional code generation system, and method of manufacturing a card on which a two-dimensional code is printed, the point placement step may include dividing the two-dimensional region into a plurality of cells arranged in a lattice, and using lattice points or representative points of the cells as the point placement reserved positions.

(4) In each of the above-described two-dimensional code generation method, program, information storage medium, two-dimensional code generation system, and method of manufacturing a card on which a two-dimensional code is printed, the connection step may include performing the connection process of connecting a given point and another point through a line when a necessary condition that a straight line connecting a given point and another point placed in the two-dimensional region does not cross a point placement reserved area is satisfied.

(5) In each of the above-described two-dimensional code generation method, program, information storage medium, two-dimensional code generation system, and method of manufacturing a card on which a two-dimensional code is printed, the point placement step may include setting a main layer in the two-dimensional region, and placing a point at part of the point placement reserved positions belonging to the main layer based on the binary data string.

(6) In each of the above-described two-dimensional code generation method, program, information storage medium, two-dimensional code generation system, and method of manufacturing a card on which a two-dimensional code is printed, when a given one of the point placement reserved positions belongs to the main layer, the point placement step may include setting the main layer so that part of the point placement reserved positions located within a predetermined range around the given one of the point placement reserved positions does not belong to the main layer.

(7) According to one embodiment of the invention, there is provided a two-dimensional code generation method comprising:

a binary data string generation step of generating a binary data string uniquely associated with given data based on the given data;

a point placement step of setting point placement reserved positions at each of which a point may be placed in a two-dimensional region, and placing a point at each of the point placement reserved positions in the two-dimensional region based on the binary data string; and an image generation step of generating an image of the two-dimensional code based on the point, the point placement step including setting a main layer in the two-dimensional region, placing a point at part of the point placement reserved positions belonging to the main layer based on the binary data string, and placing a dummy point at another part of the point placement reserved positions belonging to a layer in the two-dimensional region other than the main layer.

According to one embodiment of the invention, there is provided a two-dimensional code generation system in which the above steps are implemented. According to one embodiment of the invention, there is provided a program causing a computer to implement the above steps. According to one embodiment of the invention, there is provided a computer-readable information storage medium storing a program which causes a computer to implement the above steps. According to one embodiment of the invention, there is provided a method of manufacturing a card on which is printed a two-dimensional code generated by implementing the above steps.

(8) In each of the above-described two-dimensional code generation method, program, information storage medium, two-dimensional code generation system, and method of manufacturing a card on which a two-dimensional code is printed, the point placement step may include setting a sublayer in the two-dimensional region other than the main layer, and placing a dummy point at part of the point placement reserved positions belonging to the sublayer according to a preset dummy point placement condition.

(9) In each of the above-described two-dimensional code generation method, program, information storage medium, two-dimensional code generation system, and method of manufacturing a card on which a two-dimensional code is printed, the point placement step may include setting a parity layer in the two-dimensional region other than the main layer, and placing a point at part of the point placement reserved positions belonging to the parity layer based on parity information.

(10) In each of the above-described two-dimensional code generation method, program, information storage medium, two-dimensional code generation system, and method of manufacturing a card on which a two-dimensional code is printed, the point placement step may include dividing the two-dimensional region into a plurality of areas, setting the parity information based on a point placed in an area other than a given area, and placing a point in part of the parity layer in the given area.

(11) In each of the above-described two-dimensional code generation method, program, information storage medium, two-dimensional code generation system, and method of manufacturing a card on which a two-dimensional code is printed, the binary data string generation step may include converting a given data into standard Fibonacci representation to generate the binary data string uniquely associated with the given data.

(12) Each of the above-described two-dimensional code generation method, program, information storage medium, two-dimensional code generation system, and method of manufacturing a card on which a two-dimensional code is printed, may further comprise:

a reference position setting step of setting information indicating a reference position in the two dimension region, wherein the image generation step includes generating a two-dimensional image including the information indicating the reference position.

(13) Each of the above-described two-dimensional code generation method, program, information storage medium, two-dimensional code generation system, and method of manufacturing a card on which a two-dimensional code is printed, may further comprise:

an orientation information setting step of setting information indicating orientation of the two-dimensional region, wherein the image generation step includes generating a two-dimensional image including the information indicating the orientation.

(14) According to one embodiment of the invention, there is provided a two-dimensional code in which given data is encoded as a two-dimensional image, the two-dimensional code comprising as image elements:

points each of which is placed at point placement reserved position in a two-dimensional region based on a binary data string uniquely associated with the given data according to a preset binary data string placement condition; and a line connecting each of the points and a connection target point according to a preset connection condition, the two-dimensional code being formed as a two-dimensional image by causing the line connecting the points to have a given width.

(15) In the above-described two-dimensional code, when a necessary condition that a straight line connecting a first point and a second point among the points does not cross a point placement reserved area including the point placement reserved positions of the points other than the first and second points is satisfied, the second point may be the connection target point, and the straight line may be a line connecting the connection target point satisfying a predetermined condition and the first point.

(16) In the above-described two-dimensional code, the points may include a point placed at part of the point placement reserved positions belonging to a main layer set in the two-dimensional region based on the binary data string according to the preset binary data string placement condition.

(17) According to one embodiment of the invention, there is provided a two-dimensional code in which given data is encoded as a two-dimensional image, the two-dimensional code comprising as image elements:

points placed at point placement reserved positions belonging to a main layer set in a two-dimensional region based on a binary data string uniquely associated with the given data; and dummy points placed at point placement reserved positions belonging to a layer in the two-dimensional region other than the main layer, the two-dimensional code being formed as a two-dimensional image by causing the points to have a given pattern.

(18) In any of the above-described two-dimensional codes, the points may include a dummy point which is placed at part of the point placement reserved positions belonging to a sublayer set in the two-dimensional region other than the main layer according to a preset dummy point placement condition.

(19) In any of the above-described two-dimensional codes, the points may include a point which is placed at part of the point placement reserved positions belonging to a parity layer set in the two-dimensional region other than the main layer based on parity information.

(20) In any of the above-described two-dimensional codes, the binary data string may be generated based on standard Fibonacci representation of the given data.

(21) According to one embodiment of the invention, there is provided a two-dimensional code recognition method comprising:

a focused point pixel information detection step of detecting a reference point correspondence position of a recognition target image, calculating a focused point correspondence position on a recognition target image corresponding to a focused point set while being associated with a reference point based on the reference point correspondence position, and detecting pixel information of the recognition target image based on the calculated focused point correspondence position; and a correspondence data calculation step of calculating correspondence data associated with a two-dimensional code based on the detected pixel information.

According to one embodiment of the invention, there is provided an image recognition device in which the above steps are implemented. According to one embodiment of the invention, there is provided a program causing a computer to implement the above steps. According to one embodiment of the invention, there is provided a computer-readable information storage medium storing a program which causes a computer to implement the above steps.

(22) In each of the above-described two-dimensional code recognition method, program, information storage medium, and image recognition device, the focused point pixel information detection step may include calculating a point placement reserved position on a recognition target image as the focused point correspondence position while using a point placement reserved position belonging to a main layer in a two-dimensional region as the focused point, and detecting the pixel information of the recognition target image based on the calculated point placement reserved position; and the correspondence data calculation step may include determining a binary data string based on the detected pixel information, and calculating given data uniquely associated with the determined binary data string as the correspondence data.

(23) Each of the above-described two-dimensional code recognition method, program, information storage medium, and image recognition device may further comprise:

a connection simulation step of performing a connection simulation process in which a point is placed at the point placement reserved position in the two-dimensional region based on the binary data string calculated in the correspondence data calculation step according to a preset binary data string placement condition, and the point and a connection target point are connected according to a preset connection condition; and a line error detection/correction step of performing at least one of an error detection process and an error correction process by comparing a connection state of a sampled point detected from the recognition target image and a connection state of a sampled point obtained by the connection simulation process.

(24) Each of the above-described two-dimensional code recognition method, program, information storage medium, and image recognition device may further comprise:

a Fibonacci error detection/correction step of performing at least one of an error detection process and an error correction process for the binary data string calculated in the correspondence data calculation step based on a condition of the binary data string expressed by standard Fibonacci representation.

(25) Each of the above-described two-dimensional code recognition method, program, information storage medium, and image recognition device may further comprise:

a dummy point placement simulation step of performing a simulation process in which a dummy point is placed at a point placement reserved position belonging to a sublayer set in the two-dimensional region other than the main layer according to a preset dummy point placement condition; and a dummy point error detection/correction step of performing at least one of an error detection process and an error correction process by comparing a position of a sampled dummy point detected from the recognition target image and a position of a dummy point obtained by the dummy point simulation process.

(26) Each of the above-described two-dimensional code recognition method, program, information storage medium, and image recognition device may further comprise:

a step of storing orientation determination information indicating relationship between a value of the binary data string and orientation of the recognition target image; and an orientation determination step of determining the orientation of the recognition target image based on the binary data string calculated in the correspondence data calculation step and the orientation determination information.

(27) Each of the above-described two-dimensional code recognition method, program, information storage medium, and image recognition device may further comprise:

a recognition target image extraction step of extracting the recognition target image from input image data, wherein the focused point pixel information detection step includes detecting the pixel information based on the recognition target image extracted in the recognition target image extraction step; and wherein the recognition target image extraction step includes:

an outline extraction step of performing an outline extraction process in which an outline of a pixel group formed of continuous pixels having pixel information satisfying a predetermined pixel condition from the image data;

an outline determination step of determining whether or not a trace of the outline extracted in the outline extraction step satisfies a predetermined trace condition;

a pixel information change step of changing the pixel information of pixels forming the outline extracted in the outline extraction step to pixel information other than the pixel information satisfying the predetermined pixel condition when the predetermined trace condition is determined not to be satisfied in the outline determination step; and an extraction step of extracting the image data corresponding to an inner region of the outline extracted in the outline extraction step as the recognition target image when the predetermined trace condition is determined to be satisfied in the outline determination step.

(28) Each of the above-described two-dimensional code recognition method, program, information storage medium, and image recognition device may further comprise:

a binarization step of subjecting image data to a binarization process, wherein the outline extraction step includes extracting the outline from the image data subjected to the binarization process in the binarization step.

(29) Each of the above-described two-dimensional code recognition method, program, information storage medium, and image recognition device may further comprise:

a differentiation step of subjecting the image data to a differentiation process; and a blur step of subjecting the image data subjected to the differentiation process in the differentiation process to a blur process in which the pixel information of the focused pixel and peripheral pixels placed around the focused pixel is averaged as new pixel information of the focused pixel, wherein the binarization step includes subjecting the image data subjected to the blur process in the blur step to the binarization process.

(30) Each of the above-described two-dimensional code recognition method, program, information storage medium, and image recognition device may further comprise:

a line width detection step of detecting a width of a line forming the recognition target image extracted in the recognition target image extraction step, wherein the blur step includes determining the number of times of the blur process based on the detected width and performing the blur process the determined number of times.

(31) Each of the above-described two-dimensional code recognition method, program, information storage medium, and image recognition device may further comprise:

a line width detection step of detecting a width of a line forming the recognition target image extracted in the recognition target image extraction step, wherein the binarization step includes determining a threshold value used for the binarization process based on the detected width and performing the binarization process by using the determined threshold value.

The embodiments of the invention will be described below. Note that the embodiments described below do not unduly limit the scope of the invention laid out in the claims herein. In addition, not all of the elements of the embodiments described below should be taken as essential requirements of the invention.

1. Two-Dimensional Code

Figure 16A:
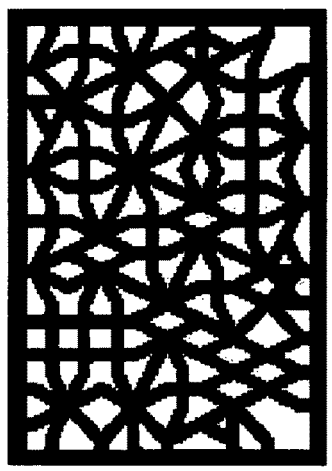
FIGS. 16A to 16C are views showing an example of a two-dimensional code according to one embodiment of the invention.
Figure 16B:
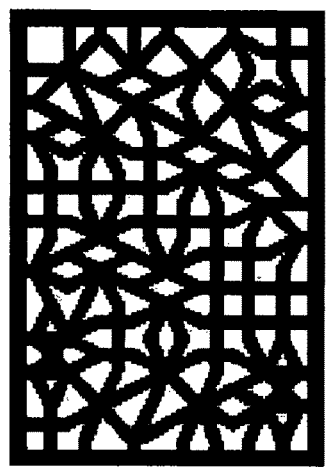
Figure 16C:
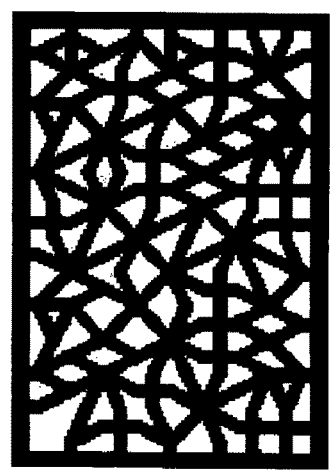

FIGS. 16A to 16C show examples of a two-dimensional code according to this embodiment.

FIG. 16A shows a two-dimensional code corresponding to ID=1234567890123456, FIG. 16B shows a two-dimensional code corresponding to ID=1234567890123457, and FIG. 16C is a two-dimensional code corresponding to ID=1234567890123458.

Figure 17A:
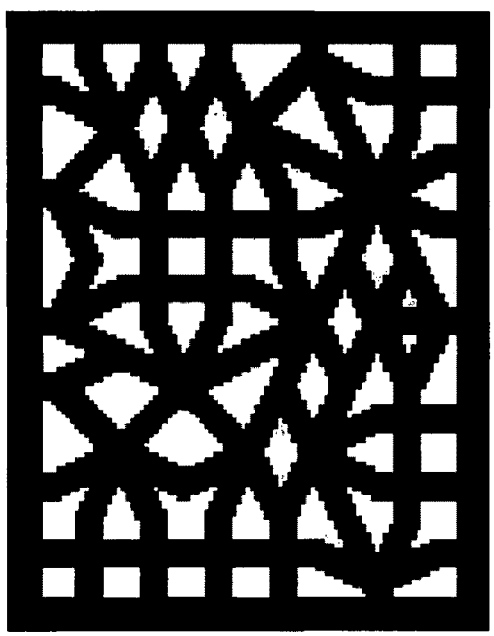
FIGS. 17A and 17B show examples of a simplified two-dimensional code according to one embodiment of the invention.
Figure 17B:
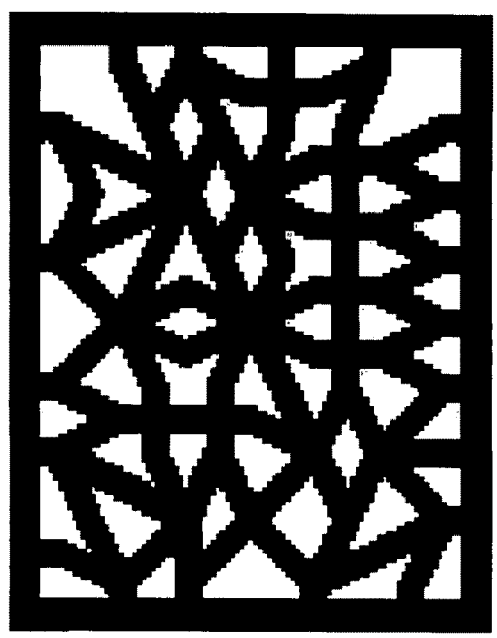

FIGS. 17A and 17B show examples of a simplified two-dimensional code according to this embodiment. FIG. 17A shows a two-dimensional code corresponding to ID=12345678, and FIG. 17B shows a two-dimensional code corresponding to ID=12345679.

As shown in FIGS. 16A to 16C and FIGS. 17A and 17B, the two-dimensional code according to this embodiment is a two-dimensional image resembling the pattern of the skin of a melon so that it is difficult to patch the two-dimensional image. In FIGS. 16A to 16C, an integer of 0 to $2^{55}$ ($3.6 \times 10^{16}$) can be embedded. In FIGS. 17A and 17B, an integer of 0 to $2^{25}$ ($3.6 \times 10^{7}$) can be embedded.

A two-dimensional code according to this embodiment is a two-dimensional code in which given data (corresponding to the ID shown in FIGS. 16A to 16C and FIGS. 17A and 17B) is encoded as a two-dimensional image, wherein the two-dimensional code includes a point placed at a point placement reserved position in a two-dimensional region based on a binary data string uniquely associated with the given data according to preset binary data string placement conditions, and a line connecting each point and a connection target point according to preset connection conditions as image elements, and the two-dimensional code is formed as a two-dimensional image by causing the line connecting the points to have a given width.

The points and the lines as the elements are described in detail in "2. Generation of two-dimensional code".

The corresponding data (ID) can be determined by recognizing the information of the point and the line (elements) from the two-dimensional code shown in FIGS. 16A to 16C and FIGS. 17A and 17B. The details of the method of recognizing the information of the point and the line (elements) from the two-dimensional code are described in "4-4. Recognition process of recognition target image and error correction process".

The two-dimensional code according to this embodiment may have a configuration in which, when a point which satisfies necessary conditions whereby a straight line connecting each point and another point does not pass through a point placement reserved area including the point placement reserved position of another point is a connection target point of each point, the line connects the connection target point satisfying predetermined conditions and each point.

The details of the connection target point satisfying predetermined conditions are described in "2-7. Bridging process (connection process)".

The two-dimensional code according to this embodiment may have a configuration in which the two-dimensional code includes a point placed at the point placement reserved position belonging to a main layer set in the two-dimensional region based on the binary data string according to preset binary data string placement conditions. The details of the preset binary data string placement conditions and the main layer set in the two-dimensional region are described in "2-3. Two-dimensional region" and "2-4. Placement of data in main layer".

A two-dimensional code according to another embodiment is a two-dimensional code in which given data is encoded as a two-dimensional image, wherein the two-dimensional code includes a point placed at a point placement reserved position belonging to a main layer set in a two-dimensional region based on a binary data string uniquely associated with the given data, and a dummy point placed at a point placement reserved position belonging to a layer in the two-dimensional region other than the main layer, and the two-dimensional code is formed as a two-dimensional image by causing the points to have a given pattern.

The two-dimensional code according to this embodiment may have a configuration in which the points include a dummy point which is placed at the point placement reserved position belonging to a sublayer set in the two-dimensional region other than the main layer according to preset dummy point placement conditions. The details of the method of placing the dummy point in the sublayer are described in "2-6. Placement of dummy data in sublayer".

The two-dimensional code according to this embodiment may have a configuration in which the two-dimensional code includes a point which is placed at the point placement reserved position belonging to a parity layer set in the two-dimensional region other than the main layer based on parity information. The details of the method of placing the parity information at the point placement reserved position belonging to the parity layer are described in "2-5. Setting of parity information".

The two-dimensional code according to this embodiment may have a configuration in which the binary data string is generated based on standard Fibonacci representation of the given data. The details of the method of generating the binary data string from the given data are described in "2-2. Standard Fibonacci representation".

In the two-dimensional code according to this embodiment, since an integer respectively corresponds to each pattern, an error occurs even if only a partial difference exists. This makes patching difficult.

The two-dimensional code according to this embodiment may be printed using an invisible ink (e.g. ink which reacts with only infrared rays) so that the two-dimensional code cannot be seen with the naked eye. Or, the two-dimensional code according to this embodiment may be printed using a visible ink.

A two-dimensional code such as a QR code (trademark) basically has a configuration in which a number of tiles spread over a two-dimensional plane have a binary color or a plurality of colors, and the two-dimensional code is expressed by the combination of the tiles of different colors. Therefore, a two-dimensional code may be rearranged in one dimension (linearly) in principle. The amount of information is the same as that of a one-dimensional code.

On the other hand, since the two-dimensional code according to this embodiment fully utilizes the two-dimensional region and contains significant information including the connection information in the two-dimensional plane, the two-dimensional code according to this embodiment cannot be expressed without using the two-dimensional plane. Specifically, the two-dimensional code according to this embodiment cannot be rearranged in one dimension (linearly), and contains a large amount of information utilizing the two-dimensional plane.

Figure 18:
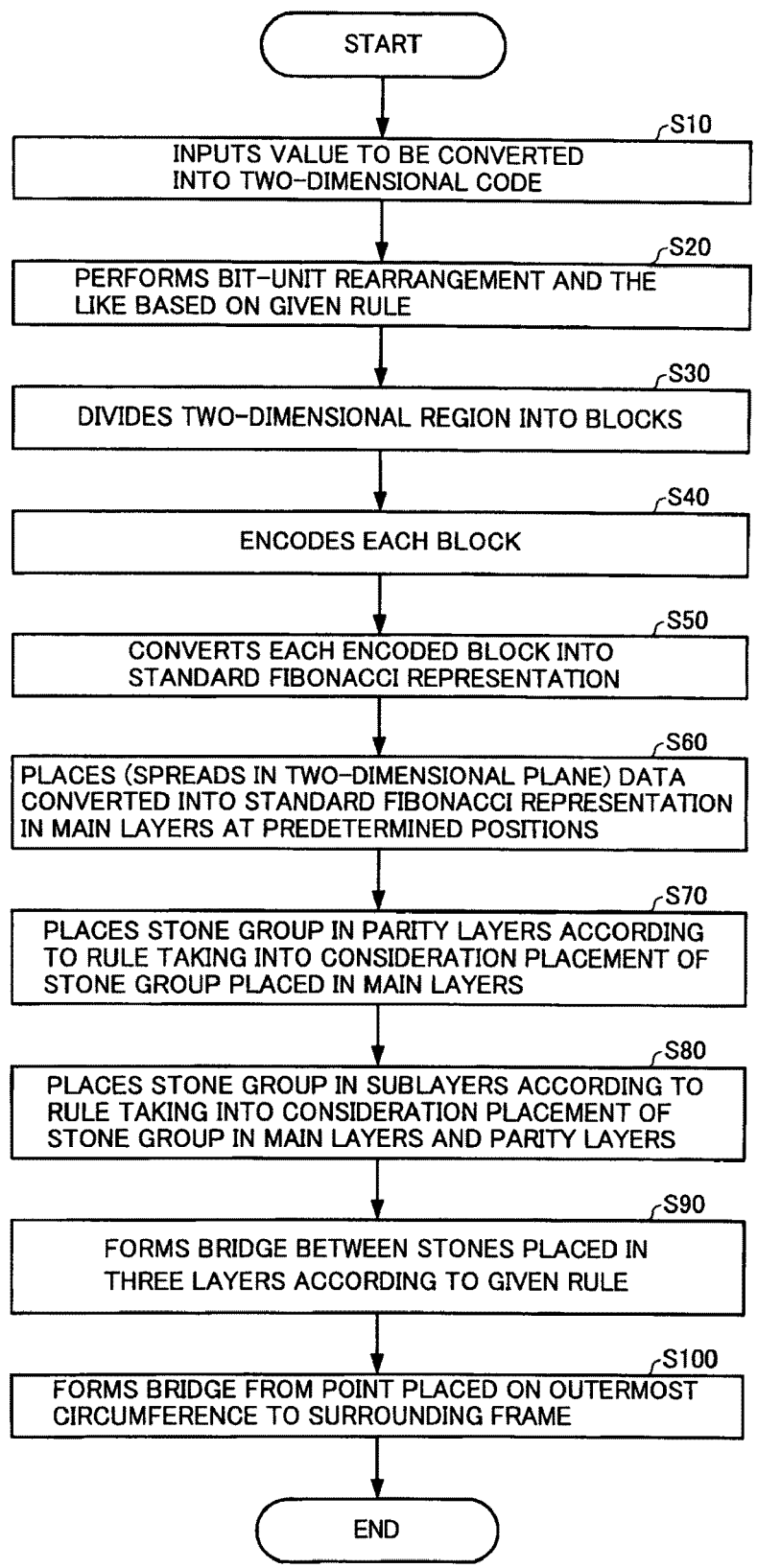
FIG. 18 is a flowchart showing the flow of a two-dimensional code generation process.

2.2 Generation of Two-Dimensional Code 2-1. Flow of Two-Dimensional Code Generation Process FIG. 18 is a flowchart showing the flow of a two-dimensional code generation process.

First, a value converted into a two-dimensional code is input (step S10). The following description is given taking an example in which the substantial amount of information is 55 bits (excluding parity and the like).

A bit-unit rearrangement and the like are performed based on a given rule (step S20).

The two-dimensional region is divided into a plurality of blocks (step S30). In this example, the two-dimensional region is divided into 5 bits×11 blocks.

Each block is encoded (step S40). The encoding method is arbitrary.

Each encoded block is converted into standard Fibonacci representation (step S50).

The details are described in "2-2. Standard Fibonacci representation".

The data converted into standard Fibonacci representation is placed (spread in a two-dimensional plane) in the main layers at predetermined positions (step S60).

The details are described in "2-4. Placement of data in main layer".

A stone (corresponding to point) group is placed in the parity layers according to a rule taking into consideration the placement of the stone (corresponding to point) group placed in the main layers (step S70).

The details are described in "2-5. Setting of parity information".

A stone group is placed in the sublayer according to a rule taking into consideration the placement of the stone groups placed in the main layers and the parity layers (step S80).

The details are described in "2-6. Placement of dummy data in sublayer".

A bridge is formed between the stones placed in the three layers according to a given rule (step S90).

The details are described in "2-7. Bridging process (connection process)".

A bridge is formed from the point placed on the outermost circumference to the surrounding frame (step S100).

2-2. Standard Fibonacci Representation

Given data may be converted into standard Fibonacci representation to generate a binary data string uniquely associated with the given data.

The term "standard Fibonacci representation" particularly refers to the standard representation and the minimal representation of the Fibonacci representation. A representation in which the number of one is minimum is called the standard Fibonacci representation. In the standard Fibonacci representation, a bit string can be formed so that numbers "1" are not adjacent to each other. Specifically, since all natural numbers can be expressed by the sum of nonadjacent Fibonacci numbers, a given decimal number can be converted into Fibonacci representation in which the adjacent bits are not set at "1" by utilizing this property.

In this embodiment, a data string obtained by converting a given decimal number (ID) into standard Fibonacci representation is used as a binary data string.

For example, when expressing one block (=5 bits) (32 kinds) by standard Fibonacci representation (arrangement of "1" and "0" is hereinafter called "Fibonacci bits"="fits"), 7 fits (34 kinds) are necessary. The conversion process is performed for all blocks. Since the number of figures expressed by 7 fits is larger than the number of figures expressed by 5 bits by two, "0" (0000000) among the combinations expressed by 7 fits is replaced with "33" (1010101). This allows the two-dimensional code to be generated with a variety.

FIG. 19 shows a correspondence table of decimal numbers, binary numbers, and standard Fibonacci representation. The decimal numbers 1, 2, 3, 5, 8, 13, 21, and 34 are Fibonacci numbers. This number sequence follows the rule whereby the sum of two successive numbers forms the subsequent number, such as 2=1+1, 3=1+2, and 5=2+3. Such numbers are called Fibonacci numbers.

2-3. Two-Dimensional Region

In this embodiment, a binary data string uniquely associated with given data is generated based on the given data, a point placement reserved position is set at which a point may be placed in the two-dimensional region, a point is placed at the point placement reserved position in the two-dimensional region according to preset binary data string placement conditions based on the binary data string, a connection process is performed which connects the points placed in the two-dimensional region through a line according to preset connection conditions, and an image of the two-dimensional code is generated based on the line. The term "image of the two-dimensional code is generated based on the line" refers to a configuration in which an image of the two-dimensional code is generated by increasing the width of the line connecting the points.

The given data may be real data associated with the two-dimensional code or data obtained by encoding the real data.

The point placement reserved position is position information for specifying a point or an area, and may be set as a relative position with respect to a predetermined reference point.

In this embodiment, a matrix may be set based on the binary data string, the point placement reserved position may be associated with each element of the matrix, and points may be placed at the associated point placement reserved positions based on the value of each element of the matrix.

In this embodiment, the two-dimensional region may be divided into a plurality of cells arranged in a lattice, and the lattice point or a representative point of each cell may be used as the point placement reserved position.

The representative point of each cell may be the center point of each cell, for example.

The point placement reserved positions may be distributed so that the two-dimensional region does not differ in density to a large extent.

Figure 20:
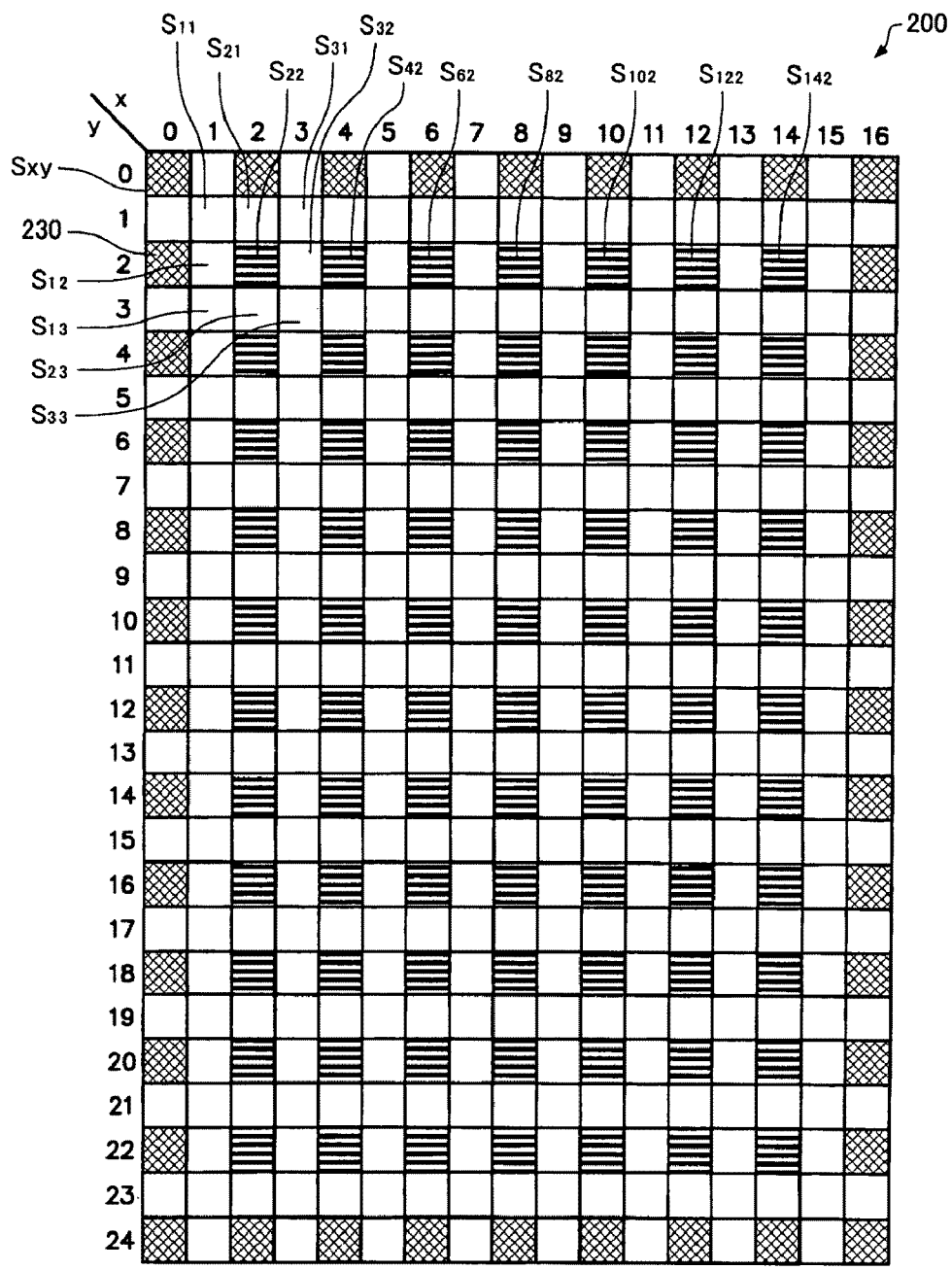
FIG. 20 is a view illustrative of an example of a two-dimensional region according to one embodiment of the invention.

FIGS. 20 and 21 are views illustrative of an example of the two-dimensional region according to this embodiment.

A reference numeral 200 indicates the two-dimensional region according to this embodiment. A two-dimensional code image is generated in the two-dimensional region.

In this embodiment, a point placement process is performed in which the two-dimensional region 200 is divided into a plurality of cells S(x,y) (x=0, 1, 2, . . . , and 16, y=0, 1, 2, . . . , and 24) arranged in a lattice, the value of each bit of the binary data string (bit string) is associated with each cell according to a predetermined rule, and a point is placed in each cell when the bit corresponding to each cell is a first value (e.g. 1) to arrange the points corresponding to the binary data string in the two-dimensional region.

A main layer ML may be set in the two-dimensional region 200, and the point may be placed at the point placement reserved position (e.g. cell or representative point of cell) belonging to the main layer ML based on the binary data string.

The term "point placement reserved position belonging to the main layer" means the case where the lattice point belongs to the main layer when the lattice point formed by dividing the two-dimensional region into a plurality of cells in a lattice is the point placement reserved position, and the case where the cell or the representative point of the cell belongs to the main layer when the representative point (center point) of each cell is the point placement reserved position.

When a given point placement reserved position belongs to the main layer ML, the main layers may be set so that the point placement reserved position ML positioned within a predetermined range around the given point placement reserved position does not belong to the main layer.

The predetermined range around the given point placement reserved position may be set so that the point placement reserved positions and the like longitudinally, laterally, and diagonally adjacent to the given point placement reserved position are included within the predetermined range.

For example, the predetermined range is set so that cells S(1,1), S(1,2), S(1,3), S(2,1), S(2,3), S(3,1), S(3,2), and S(3,3) longitudinally, laterally, and diagonally adjacent to a cell (2,2) belonging to the main layer ML do not belong to the main layer ML.

The two-dimensional region may be partitioned in a checked pattern (partitioned in a lattice) to form cells, and the cells in the odd-numbered rows and the odd-numbered columns or the cells in the even-numbered rows and the even-numbered columns may be set to be the main layers ML.

The main layers may be set according to a predetermined rule whereby the cells adjacent to the main layer cell through the side or the vertex do not belong to the main layer.

For example, when the binary data is divided into eleven blocks and each block is 7 fits, the cells of y=2 and x=2, 4, 6, 8, 10, 12, and 14 correspond to each fit of one block. Specifically, the first fit of the first block is associated with the cell S(2,2), the second fit of the first block is associated with the cell S(4,2), the third fit of the first block is associated with the cell S(6,2), the fourth fit of the first block is associated with the cell S(8,2), the fifth fit of the first block is associated with the cell S(10,2), the sixth fit of the first block is associated with the cell S(12,2), and the seventh fit of the first block is associated with the cell S(14,2), for example. The mth fit of the nth block may be associated with the cell S(2m,2n) in this manner.

For example, the value of each bit of the binary data string may be associated with the main layer cell according to a predetermined rule by placing the point in the corresponding cell S(2m,2n) when the mth fit of the nth block is the first value (e.g. 1) and not placing the point in the corresponding cell S(2m,2n) when the mth fit of the nth block is the second value (e.g. 0).

A parity layer PL may be set in the two-dimensional region 200 in addition to the main layer ML, and the point may be placed at the point placement reserved position belonging to the parity layer PL based on parity information.

The parity layer of which the minimum constituent unit is the cell may be set in the two-dimensional region of the main layer ML according to a predetermined rule, and a point corresponding to a parity bit may be placed in the parity layer. As shown in FIG. 21, the parity bits may be placed in the parity layers positioned around the main layers ML (cells Si,j (i+j=even number) on the outermost circumference (shaded portion)), for example.

As shown in FIG. 21, a sublayer SL may be set in the two-dimensional region 200 in addition to the main layer ML, and a dummy point may be placed at the point placement reserved position belonging to the sublayer SL according to preset dummy point placement conditions.

2-4. Placement of Data in Main Layer

Figure 22:
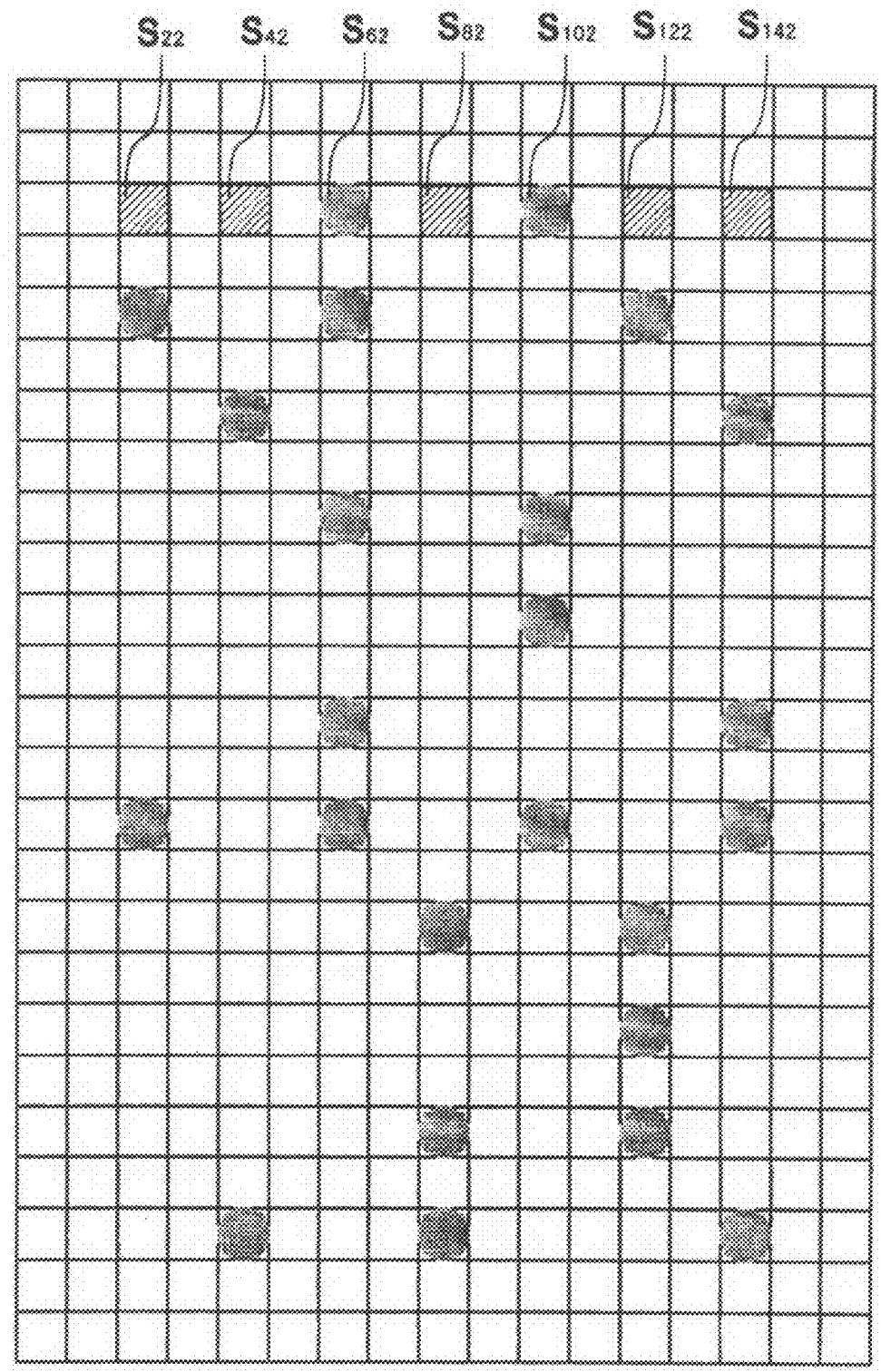
FIG. 22 is a view illustrative of placement of a binary data string in main layers.

FIG. 22 is a view illustrative of placement of each piece of bit information of the binary data string (bit string) in the main layer.

The data (binary data string) converted into standard Fibonacci representation is placed (spread in a two-dimensional plane) in the main layers ML according to a rule. The following description is given taking an example in which the cells in the even-numbered rows and the even-numbered columns belong to the main layers ML, and the binary data is placed in 7 fits in the horizontal direction and 11 blocks in the longitudinal direction, as shown in FIG. 20.

A stone (point which represents the presence or absence of data; this object is hereinafter called stone for convenience of description) is placed at a position of "1" expressed by fit, and a stone is not placed at a position of "0".

For example, when the fit string of the first block is "0010100", since the first fit, the second fit, the fourth fit, the sixth fit, and the seventh fit of the first block are "0", the stone is not placed in the corresponding cells S(2,2), S(4,2), S(8,2), S(12,2), and S(14,2). Since the third fit and the fifth fit of the first block are "1", the stones are placed in the corresponding cells S(6,2) and S(10,2).

In this embodiment, since the data converted into standard Fibonacci representation is placed, "1" does not consecutively appear in the binary data string in the lateral direction (see FIG. 19). Therefore, when placing the stones in the main layer cells, the stones are not consecutively placed. Since the main layer cells are arranged in the lateral direction at intervals of one cell, the stones are placed at intervals of at least three cells.

Although the above description has been given taking an example in which the cells regularly are arranged in a lattice, the application of the invention is not limited thereto.

2-5. Setting of Parity Information

The two-dimensional region may be divided into a plurality of areas, the parity information may be set based on the points placed in the area other than a given area, and the points may be placed in the parity layers in the given area.

The points placed in the area other than the given area may or may not include a dummy point.

A stone group is also placed in the parity layers according to a rule taking into consideration the placement of the stone group placed in the main layers.

The two-dimensional region may be divided into a plurality of areas, the parity information may be set for the parity layers in a given area based on the points (may or may not include dummy point) placed in the area other than the given area, and the points may be placed in the parity layers in the given area based on the parity information.

Figure 23:
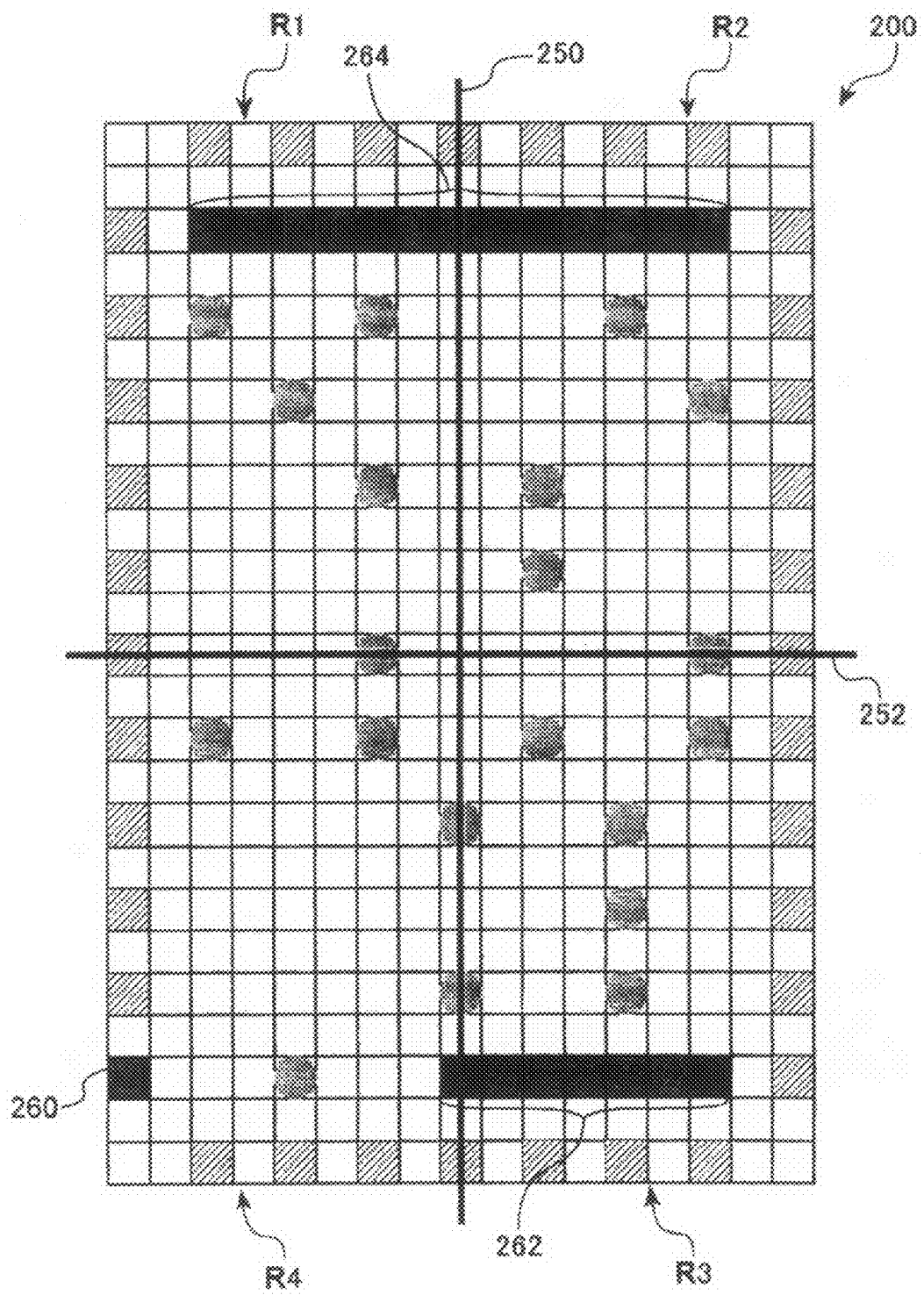
FIG. 23 is a view illustrative of a parity bit setting method.
Figure 24:
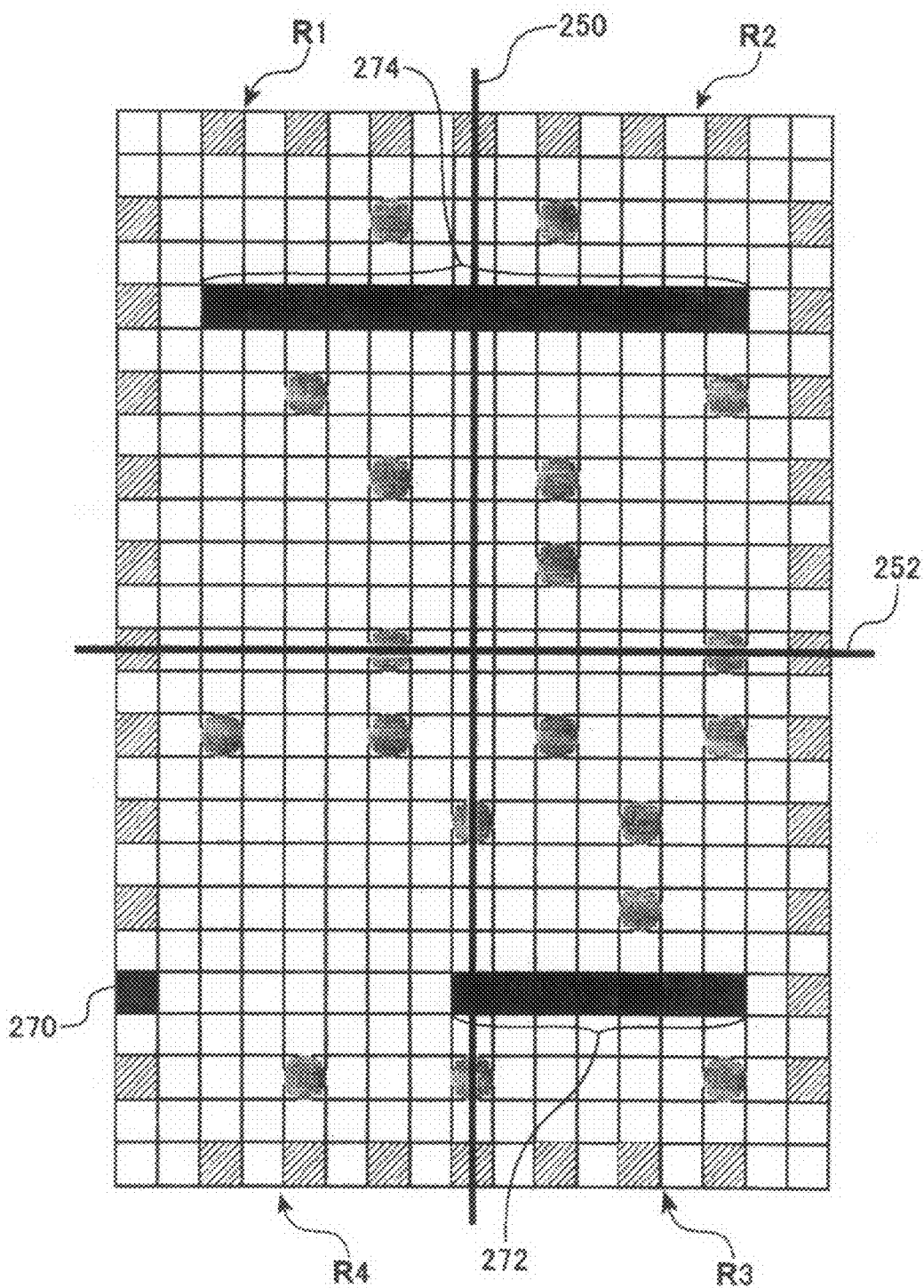
FIG. 24 is another view illustrative of a parity bit setting method.

FIGS. 23 and 24 are views illustrative of a parity bit setting method. FIG. 25 is a view showing a state in which the stones are placed in the parity layers based on the parity information when the points of the main layers are placed as shown in FIG. 22.

The following description is given taking an example in which the parity bits are placed in the parity layers positioned around the main layers ML (cells Si,j (i+j=even number) on the outermost circumference (shaded portion)), as shown in FIG. 20. The stones are placed in the parity layers according to the following rule.

(1) When dividing the main layers into four groups in the longitudinal direction and the lateral direction, the stones placed in the regions to which the parity layer does not belong are counted (the stone on the boundary line between the regions is counted).

As shown in FIG. 23, the two-dimensional region is divided into four regions R1, R2, R3, and R4 by a dividing line 250 in the longitudinal direction and a dividing line 252 in the lateral direction, for example.

(2) The parity stones in the longitudinal column (right and left ends) are placed when the total number of stones in the lateral direction (the row at the same Y coordinate as the cells and the row at the Y coordinate of point symmetry) is an even number.

(3) The parity stones in the lateral column (upper and lower ends) are placed when the total number of stones in the longitudinal direction (the row at the same X coordinate as the cells and the row at the X coordinate of point symmetry) is an even number.

For example, whether or not to place the parity stone is examined below while focusing on two points 260 and 270 on the lower left (leftmost end).

For example, the parity stone is placed in the cell 260 in the longitudinal column (right and left ends) shown in FIG. 23 when the total number of stones in a row 262 at the same Y coordinate as the cell 260 and a row 264 at the Y coordinate of point symmetry is an even number. With regard to the row 262 at the same Y coordinate as the cell 260, the area other than the region R4 to which the cell 260 belongs is taken into consideration. Since the total number of stones placed in the rows 262 and 264 is four, a stone 261 is placed in the cell 260, as shown in FIG. 25.

The parity stone is placed in the cell 270 in the longitudinal column (right and left ends) shown in FIG. 24 when the total number of stones in a row 272 at the same Y coordinate as the cell 270 and a row 274 at the Y coordinate of point symmetry is an even number. With regard to the row 272 at the same Y coordinate as the cell 270, the area other than the region R4 to which the cell 270 belongs is taken into consideration. Since the total number of stones placed in the rows 272 and 274 is five, the stone is not placed in the cell 270, as shown in FIG. 25.

Whether or not to place the parity stone is determined for all of the parity layers on the outermost circumference.

In this embodiment, as a measure for preventing patch forgery, a situation is avoided in which the parity is determined by only the periphery of the parity stone (i.e. local information), but the effects of the information of the line away from the parity are taken into consideration. If the region to which the target cell belongs is included in the count target, the parity in the four regions becomes identical (=symmetrical) (becomes redundant in terms of information). Therefore, the count target is made unsymmetrical. One stone which is placed (or is not placed) in the main layer affects six pieces of parity in total. This contributes to error correction to a large extent.

2-6. Placement of Dummy Data in Sublayer

A stone group is also placed in the sublayers according to a rule taking into consideration the placement of the stone groups placed in the main layers and the parity layers.

The position of the sublayer at which the stone can be placed is clearly defined in the same manner as the main layer and the parity layer.

As the rule whereby the stone is placed in the sublayer, the cells of which the "X coordinate+Y coordinate" of the cell Sxy is an even number are excluded (since such cells include at least the cells which have been reserved for the main layers and the parity layers).

When the stone is not placed in the cells around the cell in which the stone is not placed (five cells when the cell is adjacent to the wall, and eight cells when the cell is not adjacent to the wall) in the main layer and the parity layer, the stone is placed in the sublayer.

Figure 26:
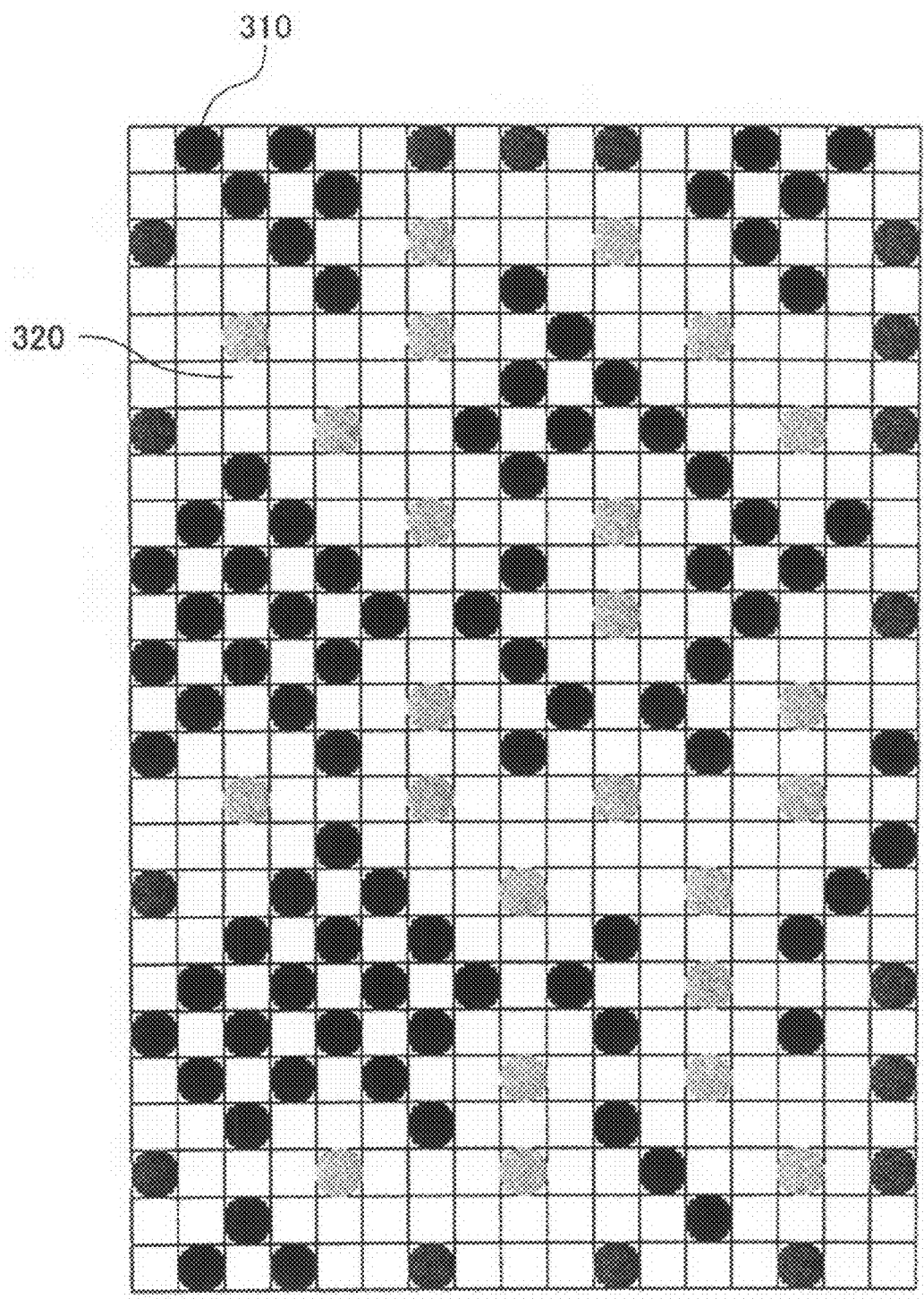
FIG. 26 is a view illustrative of placement of dummy data (dummy stone) in a sublayer.

FIG. 26 is a view illustrative of placement of dummy data (dummy stone) in the sublayer.

In FIG. 25, RA indicates the reserved area. The areas other than the reserved areas RA are sublayers.

Since the sublayer cell S(1,0) is adjacent to the wall, the cells (hereinafter called "surrounding cells") sharing the side or the vertex with the cell S(1,0) are five cells S(0,0), S(2,0), S(0,1), S(1,1), and S(2,1). The stone is placed in the cell S(1,0) when the stone is not placed in the main layer and the parity layer in the five cells, and the stone is not placed in the cell S(1,0) when the stone is placed in at least one of the five cells. In FIG. 25, since the stone is not placed in the surrounding cells S(0,0), S(2,0), S(0,1), S(1,1), and S(2,1), the stone is placed in the cell S(1,0), as indicated by 310 in FIG. 26.

In FIG. 25, since the sublayer cell S(2,5) is not adjacent to the wall, the cells sharing the side or the vertex with the cell S(2,5) are eight cells S(1,4), S(2,4), S(3,4), S(1,5), S(3,5), S(1,6), S(2,6), and S(3,6). The stone is placed in the cell S(2,5) when the stone is not placed in the main layer and the parity layer in the eight cells, and the stone is not placed in the cell S(2,5) when the stone is placed in at least one of the eight cells. In FIG. 25, since the stone is placed in the surrounding cell S(2,4), the stone is not placed in the cell S(2,5), as indicated by 320 in FIG. 26.

2-7. Bridging Process (Connection Process)

In this embodiment, the points placed in the two-dimensional region are connected through a line according to preset connection conditions.

A connection process of connecting a given point and another point through a line is performed when necessary conditions are satisfied whereby a straight line connecting a given point and another point placed in the two-dimensional region does not cross the point placement reserved area. The line connecting a given point and another point may be a straight line.

This allows the points to be connected without causing the line to impair the information of the point placement reserved position.

A point which satisfies necessary conditions whereby a straight line connecting each point and another point does not pass through the main layer may be set to be a connection target point of each point.

The points may be connected through a line according to a predetermined rule set so that the line does not cross the cell associated with the value of each bit of the binary data string or the cell in which the point of the main layer is not placed.

The dummy points may be connected through a line according to a predetermined rule set so that a line connecting the dummy points does not pass through the main layer.

As described above, a bridge is formed between the stones placed in the three layers according to the rule. The bridge is the "visible portion (or portion which can be recognized using infrared rays)"="image recognition target" of the two-dimensional code according to this embodiment.

The following bridging rule (connection conditions or connection rule) may be set as the preset connection conditions, for example.

FIGS. 27 to 30 are views illustrative of the bridging rule.

Rule 1: When the stone (irrespective of the layer) is placed at the "position of the knight in Japanese chess" or the "position at an angle of 45 degrees at an interval of one cell" around the stone placed in the main layer or the parity layer, the bridge is formed.

Figure 27:
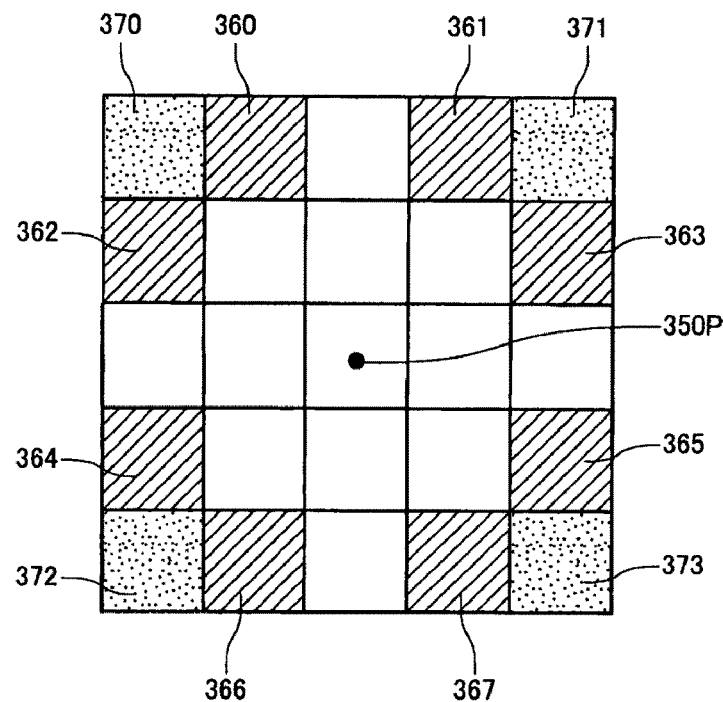
FIG. 27 is a view illustrative of a bridging rule.

In FIG. 27, when 350P is the stone placed in the main layer or the parity layer, if the stone is placed in cells 360, 361, 362, 363, 365, 366, and 367 at the "position of the knight in Japanese chess" or cells 370, 371, 372, and 373 at the "position at an angle of 45 degrees at an interval of one cell" around the stone 350P, the bridge is formed (connected), for example.

Figure 28:
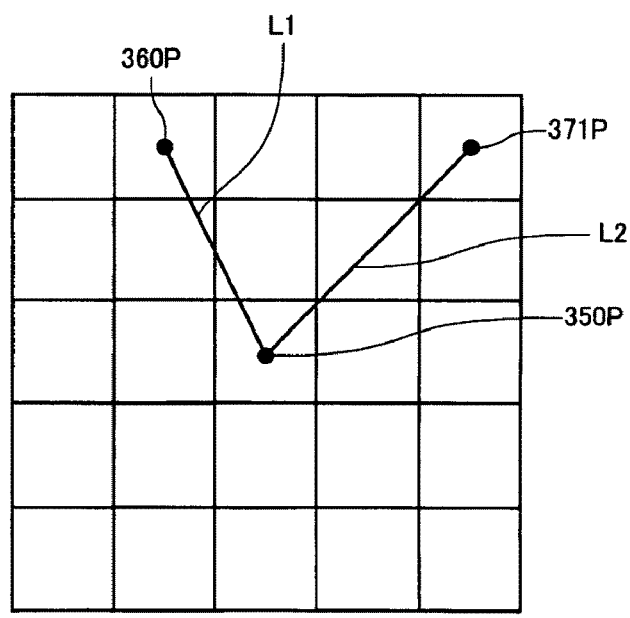
FIG. 28 is another view illustrative of a bridging rule.

As shown in FIG. 28, since a stone (point) 360P is placed in the cell 360 at the "position of the knight in Japanese chess" with respect to the stone (point) 350P, the stone (point) 350P and the stone (point) 360P are connected through a line L1.

Since a stone (point) 371P is placed in the cell 371 at the "position at an angle of 45 degrees at an interval of one cell" with respect to the stone (point) 350P, the stone (point) 350P and the stone (point) 371P are connected through a line L2.

Rule 2: When the stone (limited to the sublayer) is placed at the "position at an interval of one cell in the longitudinal direction or the lateral direction" around the stone placed in the sublayer, the bridge is formed. However, when the bridge may hide the information indicating the presence or absence of the stone on the main layer or the parity layer, the bridge is not formed.

Figure 29:
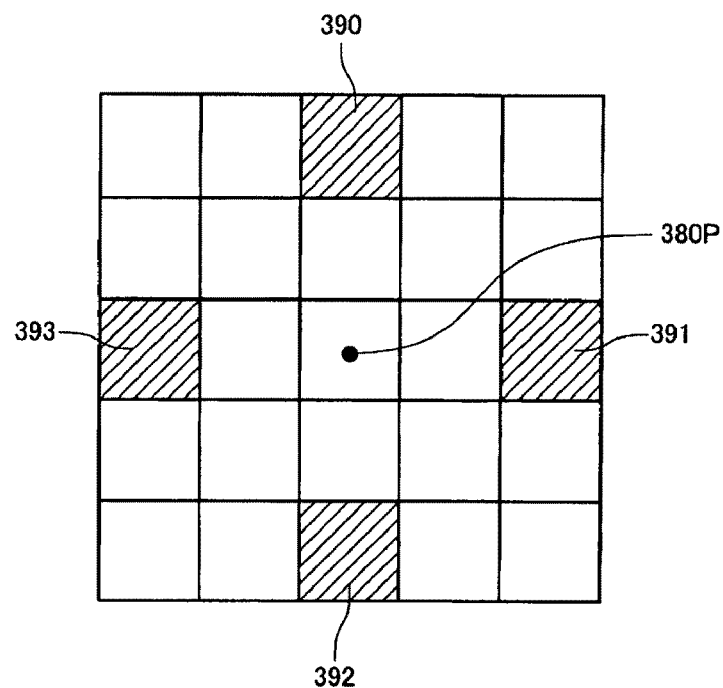
FIG. 29 is still another view illustrative of a bridging rule.

In FIG. 29, when 380P is the stone placed in the sublayer, if the stone is placed in cells (limited to the sublayer) 390, 391, 392, and 393 at the "position at an interval of one cell in the longitudinal direction or the lateral direction" around the stone 380P, the bridge is formed (connected), for example.

Figure 30:
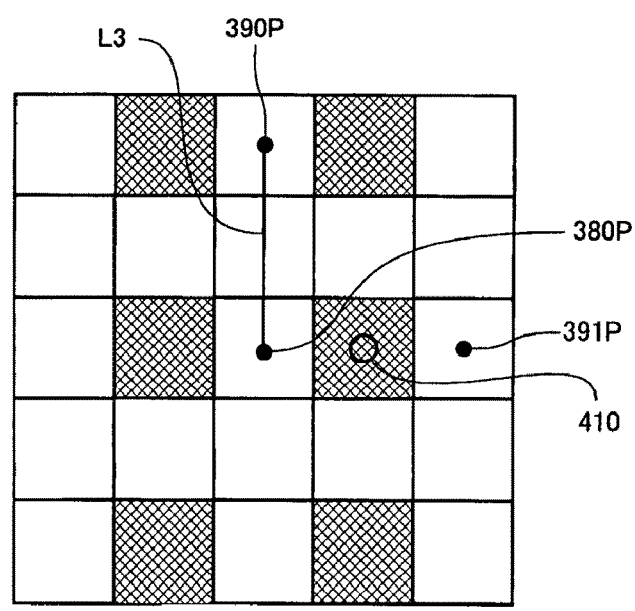
FIG. 30 is yet another view illustrative of a bridging rule.

Since a stone (point) 390P is placed in the cell 390 at the "position at an interval of one cell in the longitudinal direction or the lateral direction" with respect to the stone (point) 380P placed in the sublayer, the stone (point) 380P and the stone (point) 390P are connected through a line L3 (see FIG. 30).

A stone (point) 391P is placed in the cell 391 at the "position at an interval of one cell in the longitudinal direction or the lateral direction" with respect to the stone (point) 380P placed in the sublayer. However, since a stone (point) 410 of the main layer may be hidden when connecting the stone (point) 380P and the stone (point) 391P through a line, the bridge is not formed (see FIG. 30).

Rule 3: When the stone is placed on the upper and lower ends (of the four sides forming the rectangle of the parity layer) at the "position at an interval of one cell in the longitudinal direction" around the stone placed in the parity layer, the bridge is formed. Likewise, the bridge is formed when the stone is placed on the right and left ends at the "position at an interval of one cell in the lateral direction".

Figure 31:
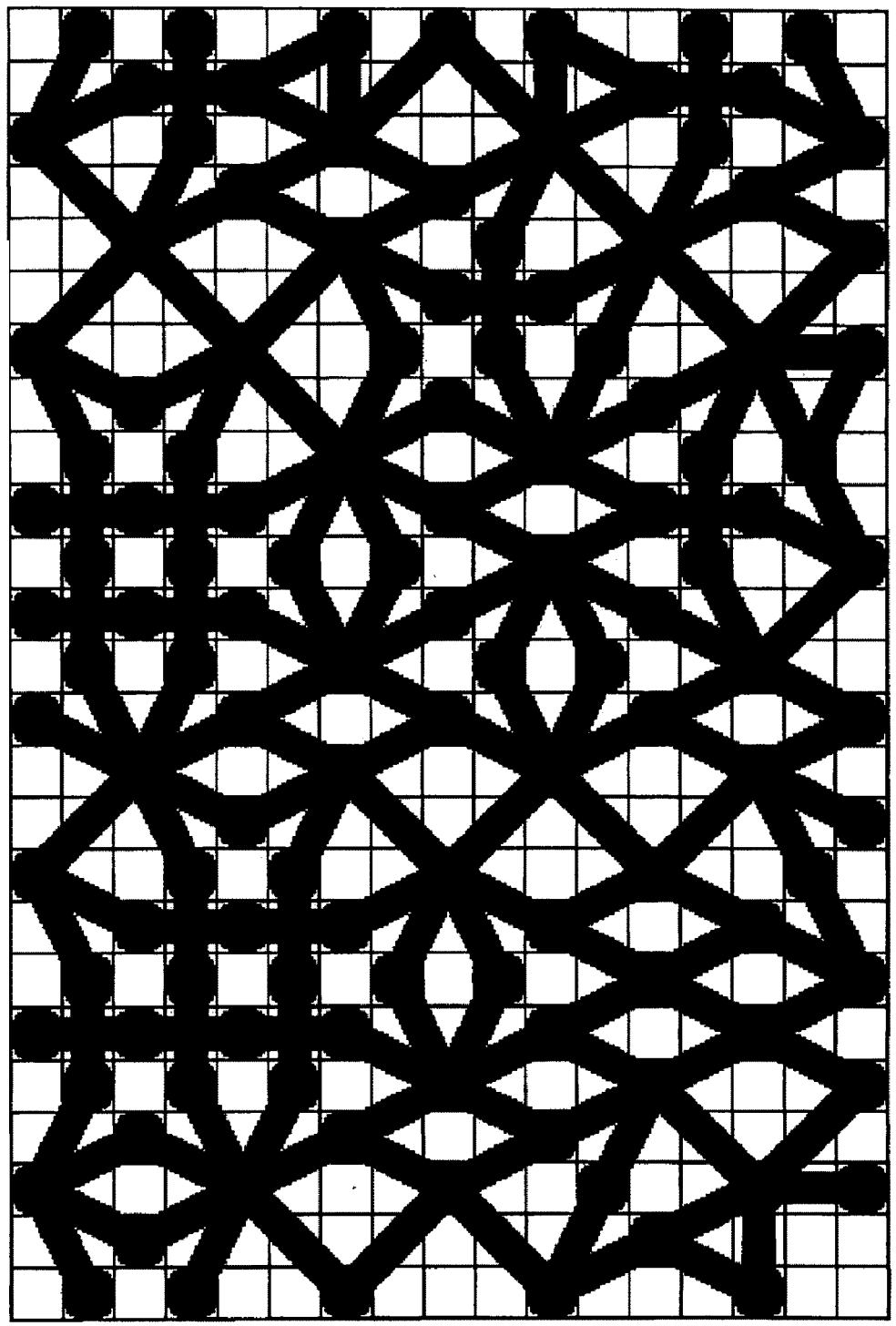
FIG. 31 is a view showing a state in which points in a two-dimensional region are connected through a line.

FIG. 31 shows a state in which the points in the two-dimensional region are connected through lines. The width of the line may be arbitrarily set at a value smaller than the width of the cell. It is desirable to adjust width of the line to a value appropriate for an image recognition system utilizing the two-dimensional code.

Although FIG. 31 also shows the stones as the elements other than the bridges, only the lines of the bridges are actually seen.

Figure 32:
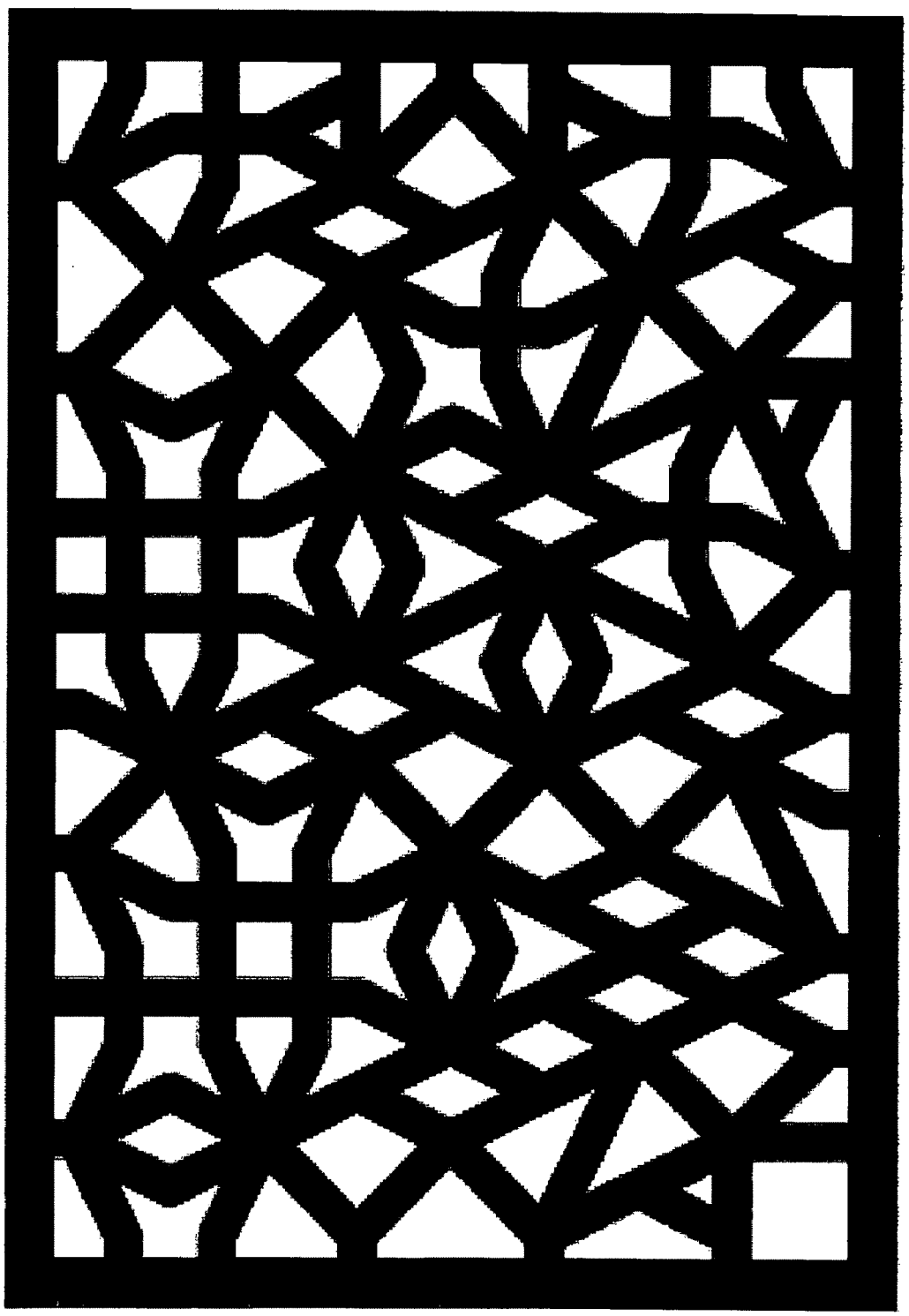
FIG. 32 is a view showing a completed two-dimensional code.

A two-dimensional code as shown in FIG. 32 is completed by forming the bridge from the point placed on the outermost circumference to the surrounding frame.

The two-dimensional code according to this embodiment has a feature in which a portion in which the density of the lines is significantly high or low does not exist. On the other hand, since there is room for the position of the stone (stone in the main layer) with important information irrespective of whether the stone is black or white, the stones and the bridges are placed so that at least necessary information is obtained even when imaging the two-dimensional code using a camera with a low image quality (i.e. even if out of focus or distortion occurs).

3. Two-Dimensional Code Generation System

Figure 33:
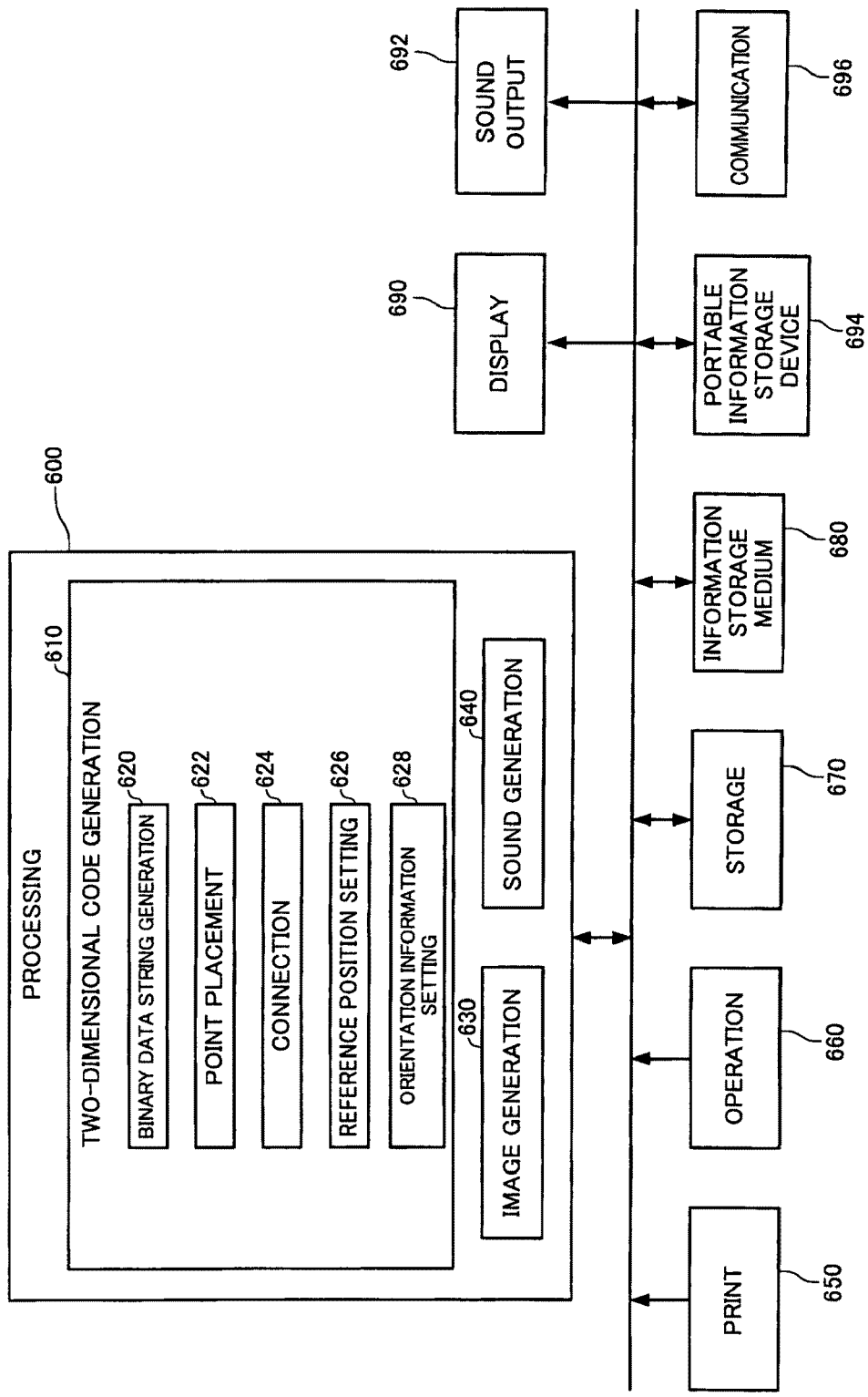
FIG. 33 is a functional block diagram of a two-dimensional code generation system.

FIG. 33 shows an example of a functional block diagram of a two-dimensional code generation system according to this embodiment. Note that the two-dimensional code generation system according to this embodiment may have a configuration in which some of the elements (sections) shown in FIG. 33 are omitted.

A print section 650 prints an image of the generated two-dimensional code with a visible or invisible ink.

An operation section 660 is used to input operation data. The function of the operation section 660 may be implemented by a lever, a direction indication key, a button, or the like.

A storage section 670 functions as a work area for a processing section 600, a communication section 696, and the like. The function of the storage section 670 may be implemented by a RAM (VRAM) or the like.

An information storage medium 680 (computer-readable medium) stores a program, data, and the like. The function of the information storage medium 680 may be implemented by an optical disk (CD or DVD), a memory card, a hard disk, a memory (ROM), or the like. The processing section 600 performs various processes according to this embodiment based on a program (data) stored in the information storage medium 680. Specifically, a program for causing a computer to function as each section according to this embodiment (program for causing a computer to execute the process of each section) is stored in the information storage medium 680.

A display 690 displays an image generated according to this embodiment.

A sound output section 692 outputs sound generated according to this embodiment. The function of the sound output section 692 may be implemented by a speaker, a headphone, or the like.

A portable information storage device 694 stores player's personal data, game save data, and the like. As examples of the portable information storage device 694, a memory card, a portable game system, and the like can be given.

The communication section 696 performs various types of control for communicating with the outside (e.g. host device or another game system). The function of the communication section 696 may be implemented by hardware such as a processor or a communication ASIC, a program, and the like.

The program (data) for causing a computer to function as each section according to this embodiment may be distributed to the information storage medium 680 (storage section 670) from an information storage medium included in a host device (server) through a network and the communication section 696. Use of the information storage medium of the host device (server) may also be included within the scope of the invention.

The processing section 600 (processor) performs a game calculation process, an image generation process, a sound generation process, and the like based on operation data from the operation section 660, a program, and the like. The processing section 600 performs various processes using the storage section 670 as a work area. The function of the processing section 600 may be implemented by hardware such as a processor (e.g. CPU or DSP) or ASIC (e.g. gate array) and a program.

The processing section 600 includes a two-dimensional code generation section 610, an image generation section 630, and a sound generation section 640.

The two-dimensional code generation section 610 includes a binary data string generation section 620, a point placement section 622, a connection section 624, a reference position setting section 626, and an orientation information setting section 628.

The binary data string generation section 620 generates a binary data string uniquely associated with given data based on the given data, the point placement section 622 sets a point placement reserved position at which a point may be placed in the two-dimensional region, and places a point at the point placement reserved position in the two-dimensional region according to preset binary data string placement conditions based on the binary data string, and the connection section 624 performs a connection process of extracting a connection target point for each point placed in the two-dimensional region and connecting each point and the connection target point according to preset connection conditions.

The point placement section 622 may set a matrix based on the binary data string, associate the point placement reserved position with each element of the matrix, and place points in the associated point placement reserved positions based on the value of each element of the matrix.

The point placement section 622 may divide the two-dimensional region into a plurality of cells arranged in a lattice, and sets the lattice point or a representative point of each cell to be the point placement reserved position.

The connection section 624 may set a point which satisfies necessary conditions whereby a straight line connecting each point and another point does not pass through a point placement reserved area including the point placement reserved position of another point to be the connection target point of each point, and connect the connection target point satisfying predetermined conditions and each point through a line (straight line).

The point placement section 622 may set the main layer in the two-dimensional region, and place the point at the point placement reserved position belonging to the main layer based on the binary data string.

When a given point placement reserved position belongs to the main layer, the point placement section 622 may set the main layers so that the point placement reserved position located within a predetermined range around the given point placement reserved position does not belong to the main layer.

The point placement section 622 may set the sublayer in the two-dimensional region in addition to the main layer, and place the dummy point at the point placement reserved position belonging to the sublayer according to preset dummy point placement conditions.

The point placement section 622 may set the parity layer in the two-dimensional region in addition to the main layer, and place the point at the point placement reserved position belonging to the parity layer based on parity information.

The point placement section 622 may divide the two-dimensional region into a plurality of areas, set the parity information based on the points placed in the area other than a given area, and place the points in the parity layers in the given area.

The binary data string generation section 620 converts given data into standard Fibonacci representation to generate the binary data string uniquely associated with the given data.

The reference position setting section 626 sets information indicating the reference position of the two-dimensional region.

The image generation section 630 generates a two-dimensional image including the information indicating the reference position.

The orientation information setting section 628 sets information indicating the orientation of the two-dimensional region.

The image generation section 630 generates a two-dimensional image including the information indicating the orientation.

The image generation section 630 functions as a two-dimensional image generation section which increases the width of the line connecting the points and generates the two-dimensional image.

The sound generation section 642 processes sound based on the results of various processes performed by the processing section 600, generates game sound such as background music (BGM), effect sound, or voice, and outputs the game sound to the sound output section 192.

4. Image Recognition Process 4-1. Flow of Image Recognition Process

Figure 34:
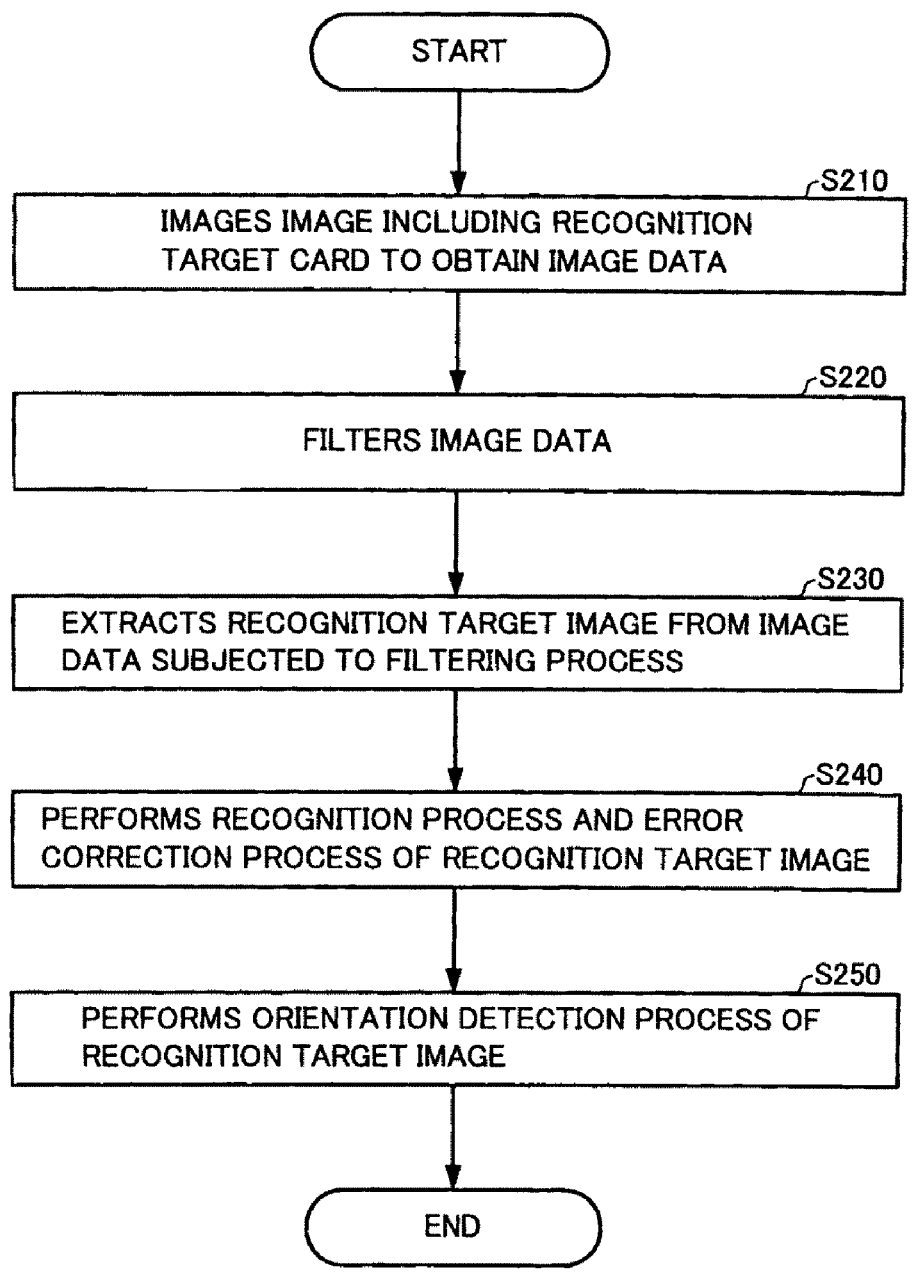
FIG. 34 is a flowchart showing the flow of a recognition process of an image including a two-dimensional code image (recognition target image).

FIG. 34 is a flowchart showing the flow of a recognition process of an image including a two-dimensional code image (recognition target image).

An image including a recognition target card is imaged to obtain image data (step S210).

Figure 2A:
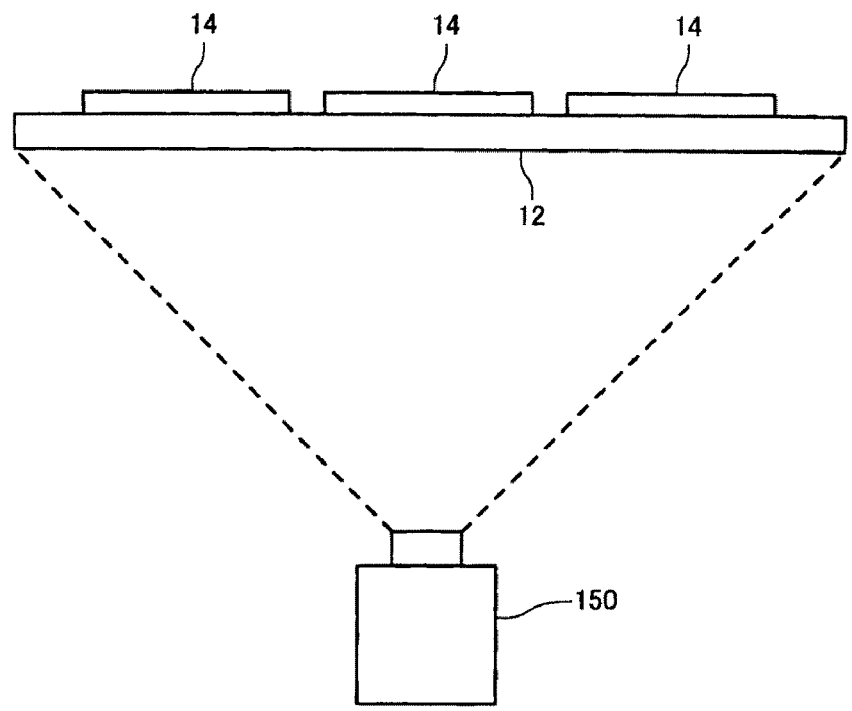
FIGS. 2A and 2B are views illustrative of imaging of a recognition target object using an imaging section.

FIG. 2A is a view illustrative of a process of imaging a recognition target object using an imaging section. An imaging section 150 images a plurality of cards 14 (recognition target objects) arranged on a stage 12 by the player from the lower side of the stage 12. The stage 12 is formed of a transparent glass plate or the like so that the imaging section 150 can image the cards 14.

Figure 2B:
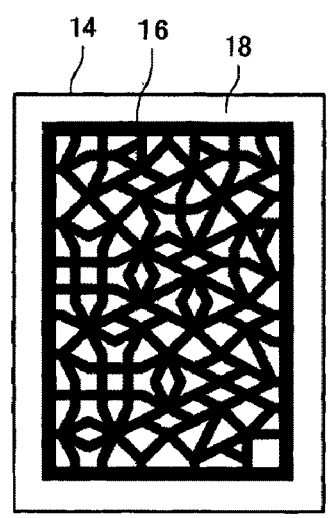

FIG. 2B is a view illustrative of the card as the recognition target object according to this embodiment. A pattern 16 for identifying each card is printed on the back surface (surface contacting the stage 12) of the card 14. A blank portion 18 with a predetermined width is provided around the pattern 16. In this embodiment, the shape (rectangle) of the outer edge of the pattern 16 printed on each card 14 is determined from image data obtained by imaging the cards 14, and the image data corresponding to the region (region enclosed by the blank portion 18) of the pattern 16 is extracted as a recognition target image.

The card on which the two-dimensional code according to this embodiment is printed allows accurate detection of the position and the rotation angle of the card unless the card is hidden, even if various objects other than the card exist around the card. When imaging the card, "paper, cloth, or the like of a uniform color" used as the background is unnecessary. Therefore, the card is suitable for applications in which the card printed with a visible or invisible ink is placed on the table surface of an arcade game machine on which an unexpected object is placed (on which the "hand" may be placed and which is adversely affected by the difference in brightness due to a ceiling light), and imaged from the lower side of the table.

The image data obtained by imaging is filtered (step S220).

It is generally difficult to uniformly light the table surface to be imaged due to the effects of disturbance, the limitations to the housing design, and the like. Therefore, nonuniformity which occurs due to the placement of lighting (particularly infrared lighting of which the substantial sensitivity decreases due to the characteristics of an imaging device), noise which occurs during imaging in a dark place or when using an inexpensive camera, and the like cannot be avoided.

In this embodiment, only necessary information (i.e. the frame and the bridges of the two-dimensional code according to this embodiment) is extracted before performing the image recognition process, and a preprocess is performed using a filter which suppresses unnecessary information (e.g. nonuniform lighting and noise). The preprocess includes a quadratic differential process, a blur process, and a binarization process.

The details are described in "4-2. Filtering process".

The recognition target image is extracted from the image data subjected to the filtering process (step S230).

The input image (expressed in black and white as a result of the preprocess) is scanned to the right from the upper left point. When an object (white) of a color differing from the background color (black) has been found, the outline of the object is traced counterclockwise with respect to the point, and whether or not the trace result is the shape of the card (rectangle with four vertices) is determined.

(1) When the trace result is not the shape of the card, the traced outline is only deleted, and the input image is continuously scanned.

(2) When the trace result is the shape of the card, the contents of the card are read, and the process branches to one of the following two steps.

(3) When the card contains the two-dimensional code according to this embodiment, the decode results are returned, the object is deleted together with the contents, and the input image is continuously scanned.

(4) When the card does not contain the two-dimensional code according to this embodiment, the traced outline is only deleted, and the input image is continuously scanned.

The above operations (1) to (4) are repeatedly performed until all points are traced (i.e. until the lower right point is reached).

FIGS. 35A to 35D are views illustrative of the concept of the recognition target image extraction process (main process) according to this embodiment (black and white are reversed in FIGS. 35A to 35D for convenience).

Figure 35A:
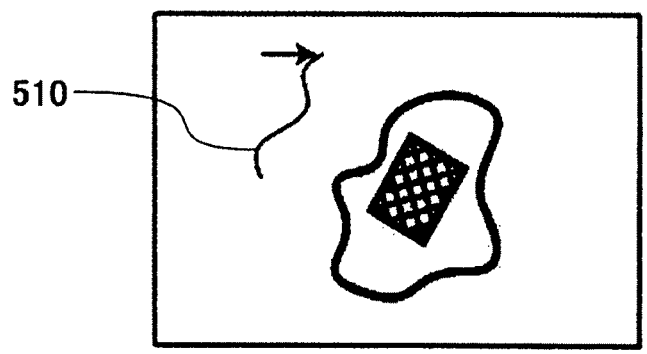
FIGS. 35A to 35D are views illustrative of the concept of a recognition target image extraction process (main process) according to one embodiment of the invention.

As shown in FIG. 35A, when a line noise 510 with a width of 1 exists in the input image data, the line noise 510 is deleted momentarily (by one operation).

Figure 35B:
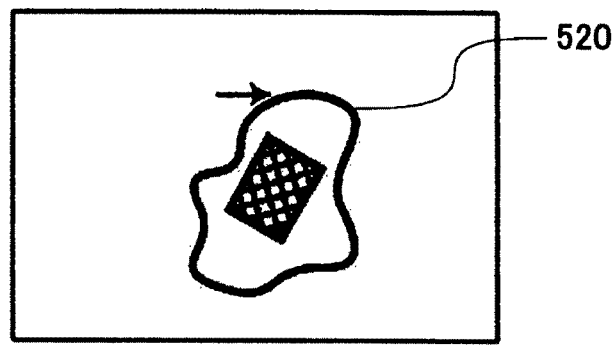

As shown in FIG. 35B, when an obstacle 520 with a line width of 2 or more exists in the input image data, whether or not the outline of the obstacle 520 is rectangular (card) is determined. When the outline of the obstacle 520 is rectangular (card), a process shown in FIG. 35D is performed. When the outline of the obstacle 520 is not rectangular (card), a process shown in FIG. 35C is performed.

Figure 35C:
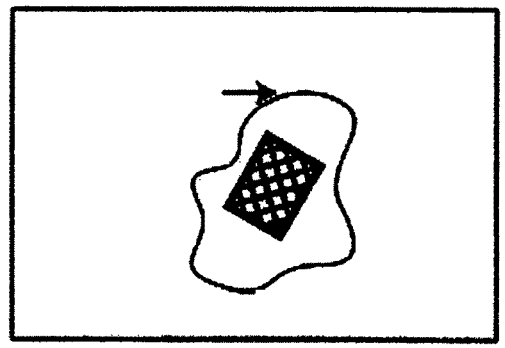
Figure 35D:
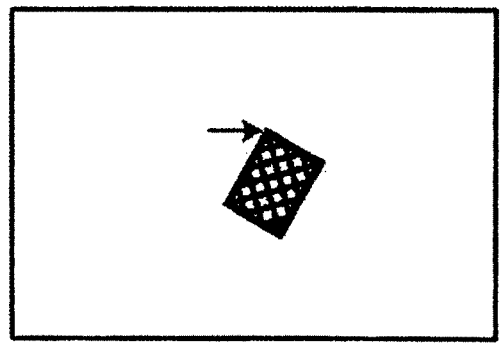

In FIG. 35C, the line with a line width of 2 or more is peeled.

In FIG. 35D, whether the obstacle 520 is the recognition target image is determined. When the inner image of the rectangle is the two-dimensional code according to this embodiment (e.g. when an error has not occurred during the recognition process), the inside of the rectangle is deleted at one time. When the inner image of the rectangle is not the two-dimensional code according to this embodiment (e.g. when an error has occurred during the recognition process), the skin is peeled off to determine whether or not the inner image of the rectangle is the two-dimensional code according to this embodiment.

The details are described in "4-3. Recognition target image extraction process".

A recognition process and an error correction process of the recognition target image are performed (step S240).

The details are described in "4-4. Recognition process and error correction process of recognition target image".

An orientation detection process of the recognition target image is performed (step S250).

The details are described in "4-8. Sister ID and orientation of card".

4-2. Filtering Process

Figure 36:
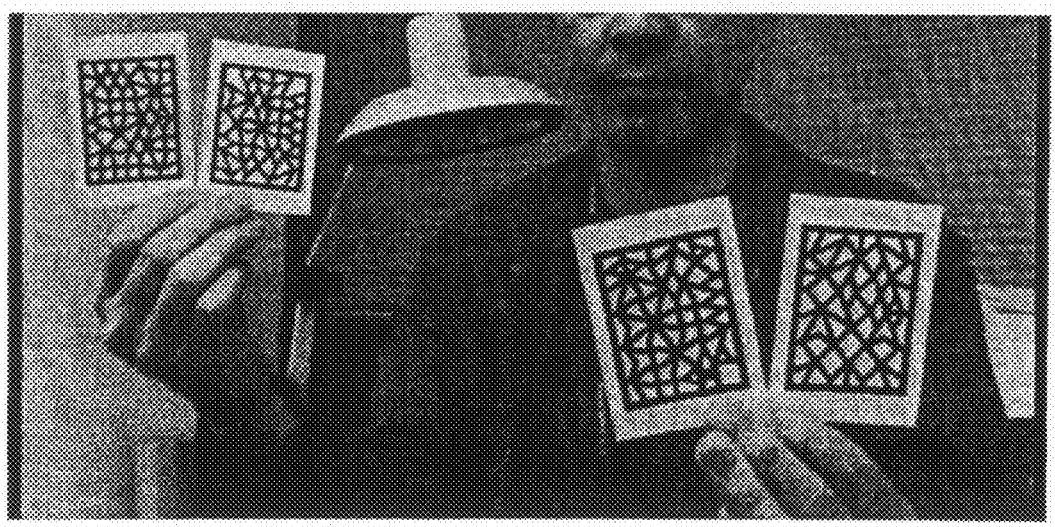
FIG. 36 shows an input image as a photographed image.

An example of the filtering process according to this embodiment is described below on the assumption that the image shown in FIG. 36 is the input image (photographed image).

Figure 37:
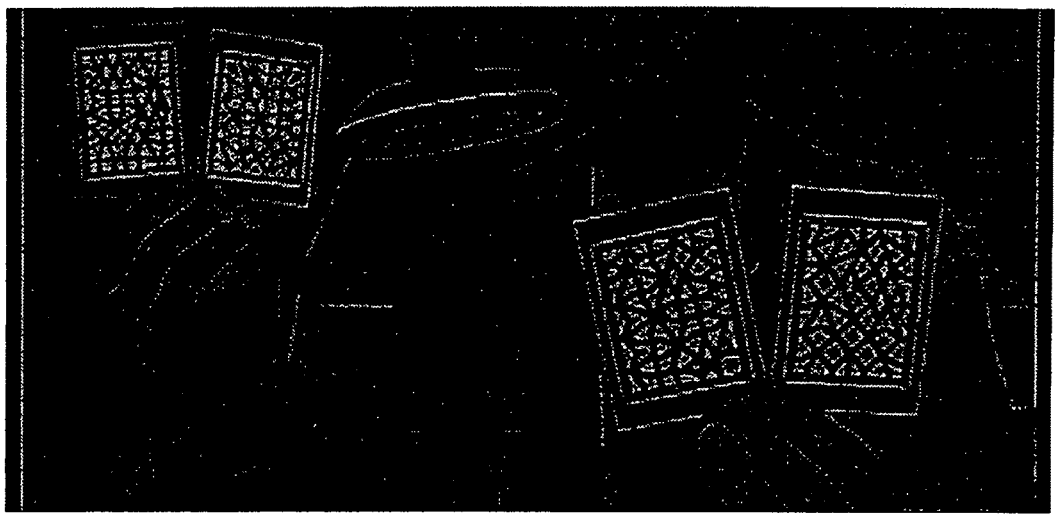
FIG. 37 shows an image data after a quadratic differential process.

The image data of the input image is subjected to the quadratic differential process to obtain the quadratic differential image data as show in FIG. 37.

FIG. 3 is a view showing a specific example of 3×3 quadratic differential operators used when performing the quadratic differential process. In this embodiment, a weighting coefficient "8" is set for the focused pixel at the center, and a weighting coefficient "−1" is set for each of the eight adjacent pixels. Quadratic differential data corresponding to the focused pixel is obtained by adding up the values obtained by multiplying each pixel by the weighting coefficient, and multiplying the resulting value by a predetermined gain (e.g. 1). The peripheral focused pixel around which eight adjacent pixels do not exist may be subjected to the quadratic differential process on the assumption that adjacent pixels of the same grayscale data as the focused pixel exist, or each peripheral pixel may not be subjected to the quadratic differential process.

Figure 38:
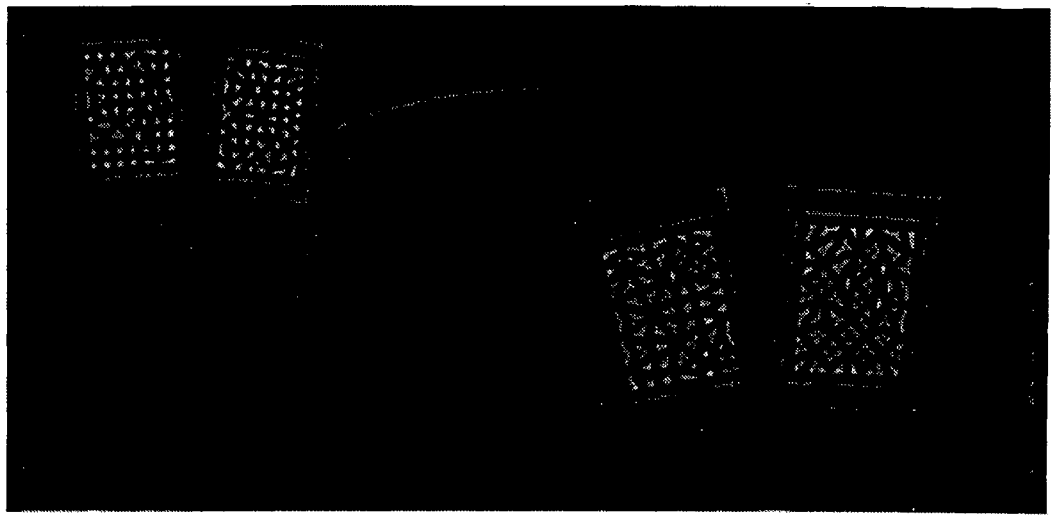
FIG. 38 shows image data after a blur process.

The image data subjected to the quadratic differential process is subjected to the blur process to obtain the image data after the blur process as shown in FIG. 38.

The image data subjected to the quadratic differential process is subjected to the blur process using the quadratic differential data of the focused pixel and the peripheral pixels.

FIG. 4 is a view showing a specific example of a blur filter used for the blur process. In this embodiment, the same weighting coefficient is set for the focused pixel at the center and each of the eight adjacent pixels. In more detail, new quadratic differential data of the focused pixel is obtained by adding up the values obtained by multiplying the quadratic differential data of each of the focused pixel and the eight adjacent pixels by the coefficient "1", and multiplying the resulting value by a predetermined gain (e.g. 1/9). Specifically, the blur process is performed which averages the grayscale data of the nine pixels including the focused pixel. The peripheral focused pixel around which eight adjacent pixels do not exist is subjected to the blur process on the assumption that adjacent pixels of the same grayscale data as the focused pixel exist. The blur process may be applied a number of times.

For example, this embodiment applies the blur process three times. The line width extracted as the bridge is adjusted by the number of times the blur process is applied (a method may be used in which the blur process is adjusted by the Gaussian blur radius and the blur filter is applied only once, for example).

Figure 39:
FIG. 39 shows image data after a binarization process.

The image data after the blur process is subjected to the binarization process to obtain the image data after the binarization process as shown in FIG. 39. In FIG. 39, the horizontal lines of the window shade behind the person with a low contrast are clearly extracted.

In the binarization process, the quadratic differential data after the blur process is converted into binary data by comparison with a predetermined threshold value S-TH. When the quadratic differential data is greater than the threshold value S-TH, the binary data is set at "1". When the quadratic differential data is equal to or less than the threshold value S-TH, the binary data is set at "0".

The binarization process may be performed by translating (casting) the quadratic differential data after the blur process into an unsigned integer. The negative value of the new quadratic differential data can be made close to the maximum positive value by translating the quadratic differential data into an unsigned integer, whereby the contrast of the image after the binarization process can be increased.

Figure 5A:
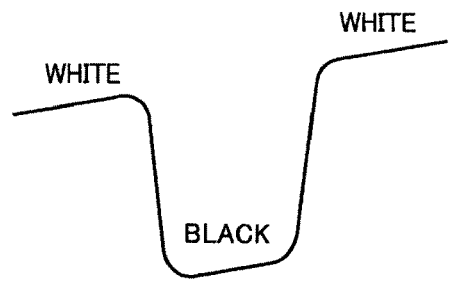
FIGS. 5A to 5E are views illustrative of processes performed by a differentiation section, a blur section, and a binarization section.
Figure 5B:
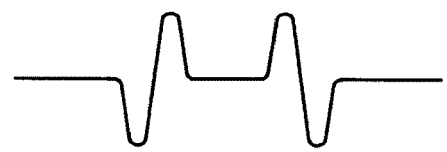
Figure 5C:
Figure 5D:
Figure 5E:
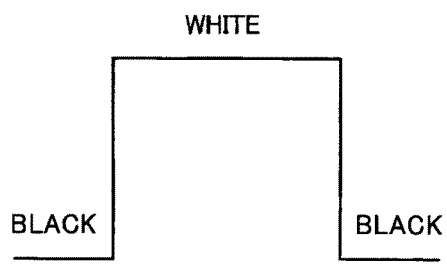

FIGS. 5A to 5E are views illustrative of the process performed by a differentiation section 121, a blur section 122, and a binarization section 123 described above. When subjecting the image data of two boundaries at which the color of the pixel changes from white to black or from black to white as shown in FIG. 5A to the quadratic differential process using the second derivative operators shown in FIG. 3, quadratic differential data corresponding to the shape shown in FIG. 5B is obtained. The blur filter shown in FIG. 4 is applied to the quadratic differential data three times to obtain new quadratic differential data corresponding to the shape shown in FIG. 5C. The quadratic differential data subjected to the blur process is cast into an unsigned integer to obtain quadratic differential data in which the negative value at the boundary is close to the maximum positive value as shown in FIG. 5D. The cast quadratic differential data is subjected to the binarization process using the threshold value S-TH equal to zero to obtain binary data in which the boundary is emphasized as shown in FIG. 5E. When comparing the binary data after the binarization process and the initial image data shown in FIG. 5A, the color of the pixel is reversed in terms of black and white.

Since the negative value has occurred particularly in the vicinity of the edge ("boundary" between light and shade) due to the quadratic differential process and the blur process, an image in which the edge of the input image is extracted and emphasized is obtained (and the contrast is increased over the entire image) by making the negative value close to the maximum positive value by casting. The image is then simply adjusted using the threshold value. As a result, an output image is obtained in which the black and white of the two-dimensional code portion are reversed. Moreover, an adverse effect of nonuniform lighting is eliminated, and the region in which various articles other than the two-dimensional code are present is divided into a number of small regions suitable for elimination of foreign matter, noise, and the like in the recognition target image extraction process.

This filtering process depends on the widths of the frame and the bridge of the two-dimensional code (width in the imaged image; determined depending on the line width in the actual card and the imaging distance).

Since it is necessary to emphasize the widths of the frame and the bridge of the two-dimensional code according to this embodiment, it is necessary to adjust the filter strength of the blur process (e.g. the number of times that the blur process is performed) and the threshold value of the binarization process corresponding to (number of pixels of) the line width of the two-dimensional code. When the line width does not change, it is unnecessary to adjust the filter strength and the threshold value. For example, if 4×8 cards are arranged and accurately recognized at VGA, 2×4 cards can be recognized at QVGA with the same accuracy (at a higher speed due to a reduction in area).

Note that the process can be facilitated by providing a blank portion (white frame when the frame and the bridge on the original card are black) around the two-dimensional code according to this embodiment.

4-3. Recognition Target Image Extraction Process

Figure 6:
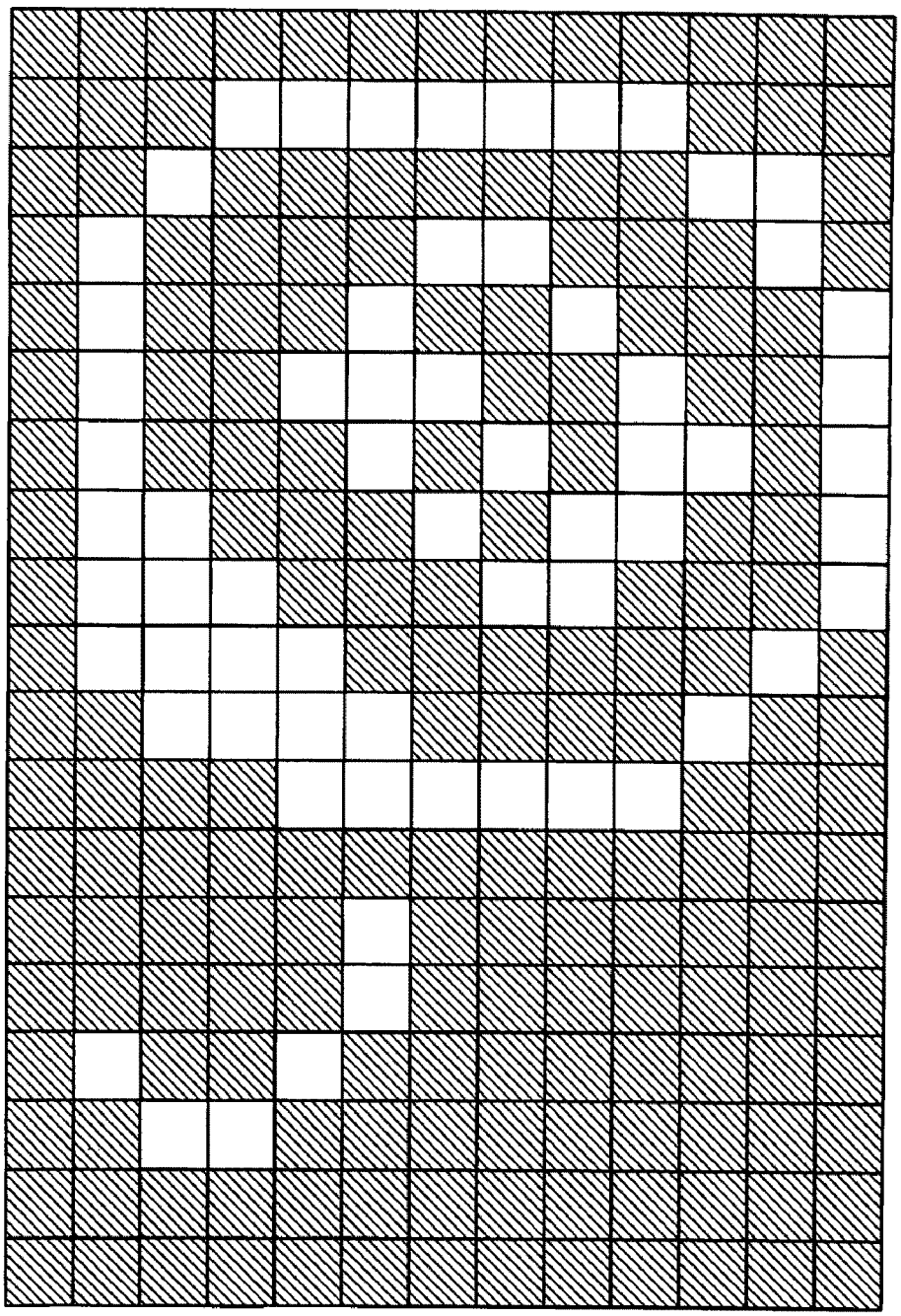
FIG. 6 shows a specific example of an image (binary image) subjected to a binarization process.

FIG. 6 is a view showing a specific example of the image (binary image) subjected to the binarization process. In FIG. 6, each square region corresponds to each pixel. The pixels in the hatched regions are pixels with binary data (pixel information)=0, and the pixels in the remaining regions are pixels with binary data (pixel information)=1. The binary image shown in FIG. 6 shows the case where the number of pixels is reduced in order to simplify the description of the binarization process and an outline extraction process described later, and one card 14 is placed on the stage 12. In this example, an image other than the card 14 is also illustrated. In the following description, the pixel with binary data=1 is called "white pixel", and the pixel with binary data=0 is called "black pixel".

In the outline extraction process, the outline of a pixel group formed of adjacent white pixels is extracted by scanning each pixel forming the binary image in a predetermined order to detect a first white pixel reached, and sequentially tracing other white pixels adjacent to the first white pixel until the first white pixel is again reached.

Figure 7:
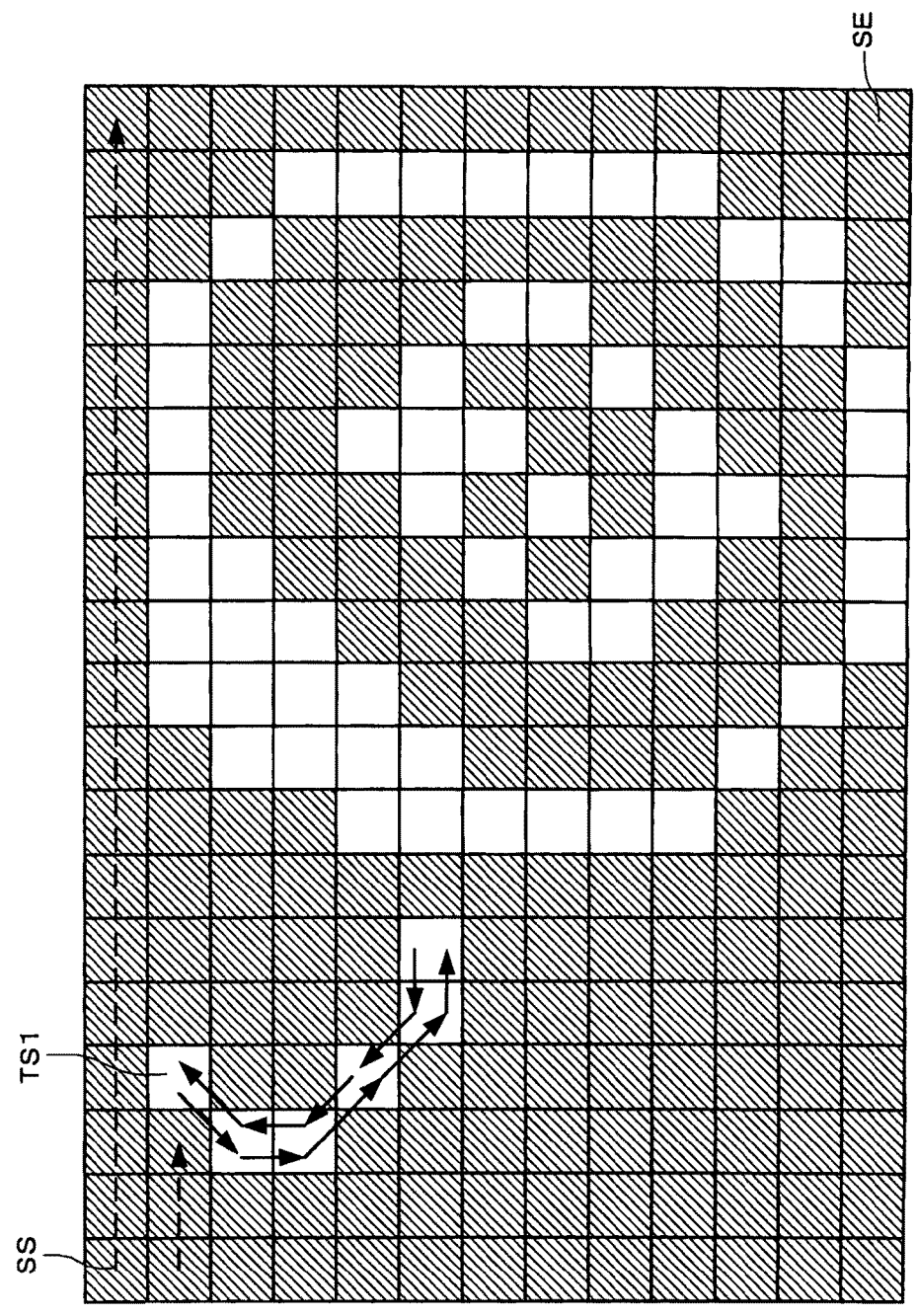
FIG. 7 shows a specific example of an outline extraction process.

FIG. 7 is a view showing a specific example of the outline extraction process. In the example shown in FIG. 7, a scan starting point SS is set on the upper left of the binary image. Each pixel is sequentially scanned toward the right, and the scan operation is completed at a scan end point SE on the lower right. An outline extraction section 125 extracts the white pixel detected first as a trace starting point TS1 during the scan operation, and traces the white pixels in the order indicated by the solid arrows in FIG. 7 until the trace starting point TS is again reached.

The details of the outline extraction process are described below. The outline extraction section 125 examines eight pixels positioned around the position of the detected white pixel, and determines the position of the white pixel to be subsequently traced.

Figure 8:
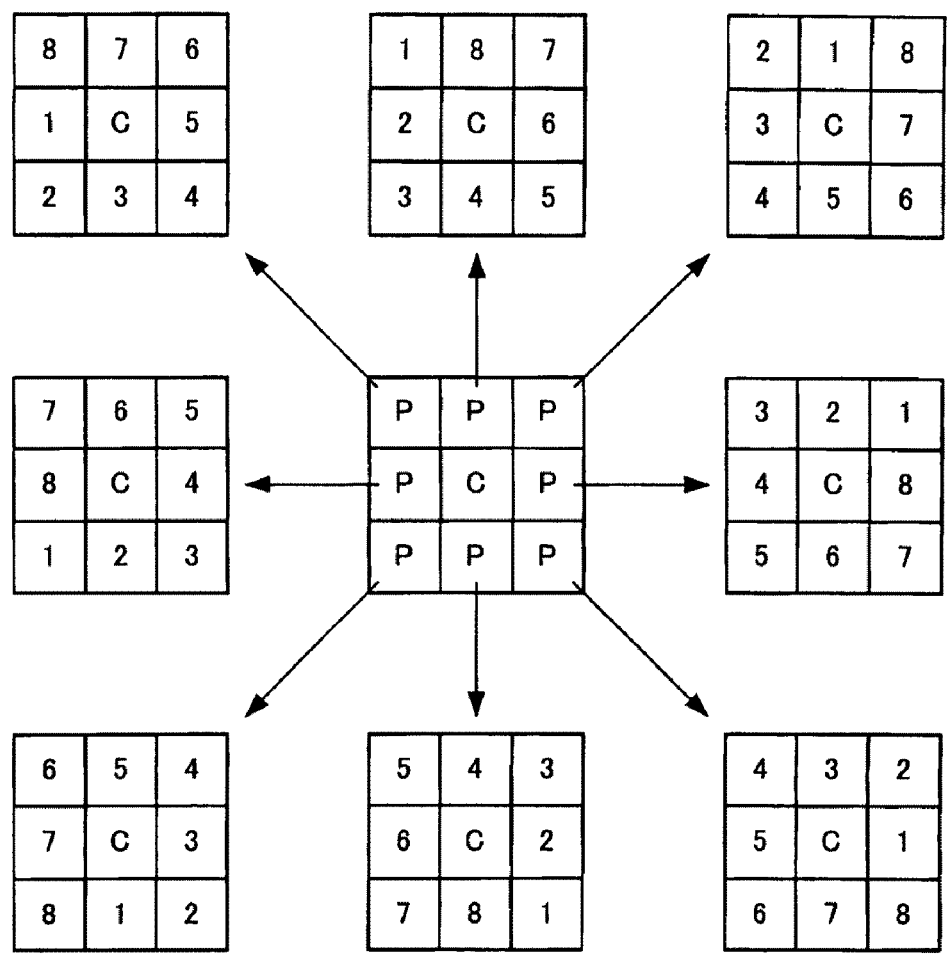
FIG. 8 is a view illustrative of a method of determining the next white pixel during the outline extraction process.

FIG. 8 is a view illustrative of the method of determining the next white pixel during the outline extraction process. In FIG. 8, "C" indicates the present focused pixel (white pixel), and "P" indicates the position of the pixel (white pixel) immediately before the present pixel is reached. The numerals "1" to "8" indicate the order of priority of selection of the white pixel subsequently traced. For example, when the preceding white pixel is positioned right above the present focused pixel, the upper left pixel, the left pixel, the lower left pixel, the bottom pixel, the lower right pixel, the right pixel, the upper right pixel, and the top pixel are sequentially examined, and the white pixel which first appears is determined to be the white pixel subsequently traced. Since the pixel corresponding to "1" is not determined to be the white pixel subsequently traced irrespective of the position of the preceding white pixel, it suffices to examine seven pixels "2" to "8" at the maximum.

After the process of sequentially tracing the white pixels from the trace starting point TS1 has been completed, the outline extraction section 125 has extracted the outline based on the coordinate values of the white pixels sequentially traced.

After each white pixel forming the outline has been changed to a black pixel or each pixel positioned inside the outline has been changed to a black pixel by a pixel information change process described later, the outline extraction section 125 resumes the outline extraction process from the pixel (next scan target pixel) on the right of the trace starting point TS1.

Figure 9:
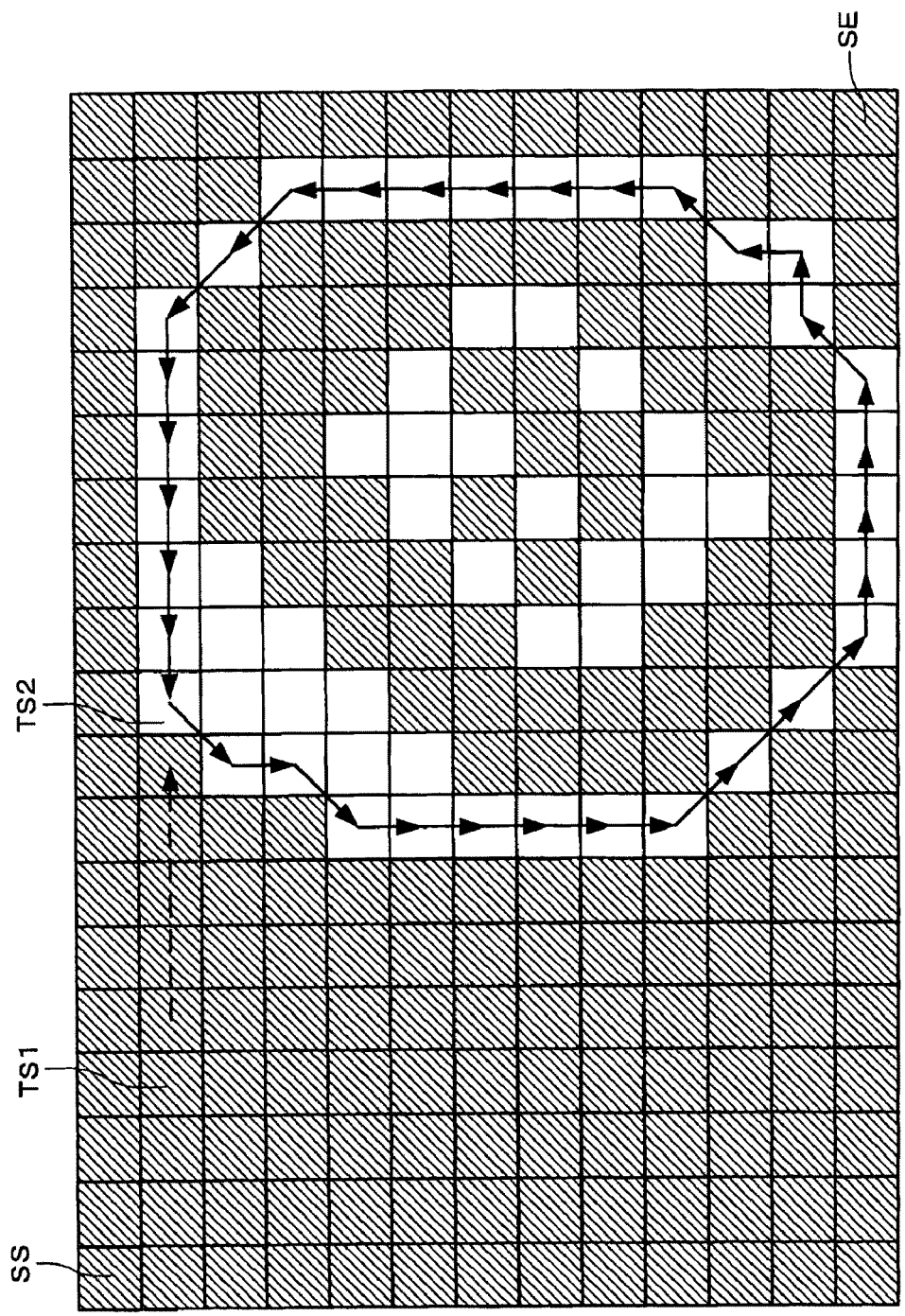
FIG. 9 is a view illustrative of the flow of the outline extraction process.

FIGS. 9 to 12 are views illustrative of the flow of the outline extraction process. In FIG. 9, since it has been determined that the shape of the trace of the outline extracted in FIG. 7 is not a predetermined shape, the white pixels forming the outline starting from the trace starting point TS1 have been changed to black pixels by a pixel information change section 127 described later. The outline extraction section 125 resumes the scan operation from the pixel on the right of the trace starting point TS1, extracts the white pixel detected next as a trace starting point TS2, traces the white pixels in the order indicated by the solid arrows, and extracts the outline based on the coordinate values of the traced white pixels.

Figure 10:
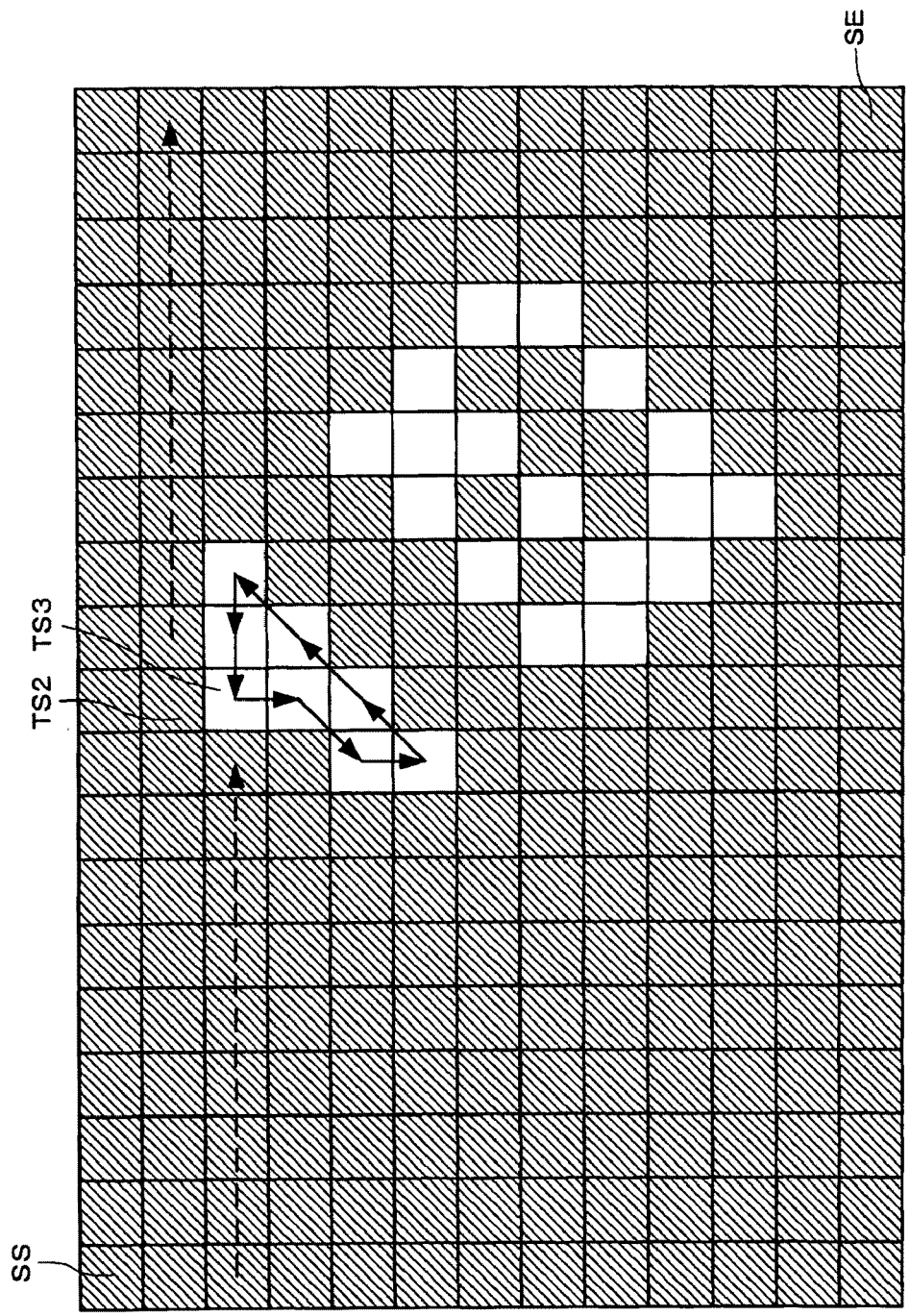
FIG. 10 is another view illustrative of the flow of the outline extraction process.

In FIG. 10, since it has been determined that the shape of the trace of the outline extracted in FIG. 9 is not a predetermined shape, the white pixels forming the outline starting from the trace starting point TS2 have been changed to black pixels by the pixel information change section 127 described later. The outline extraction section 125 resumes the scan operation from the pixel on the right of the trace starting point TS2, extracts the white pixel detected next as a trace starting point TS3, traces the white pixels in the order indicated by the solid arrows, and extracts the outline based on the coordinate values of the traced white pixels.

Figure 11:
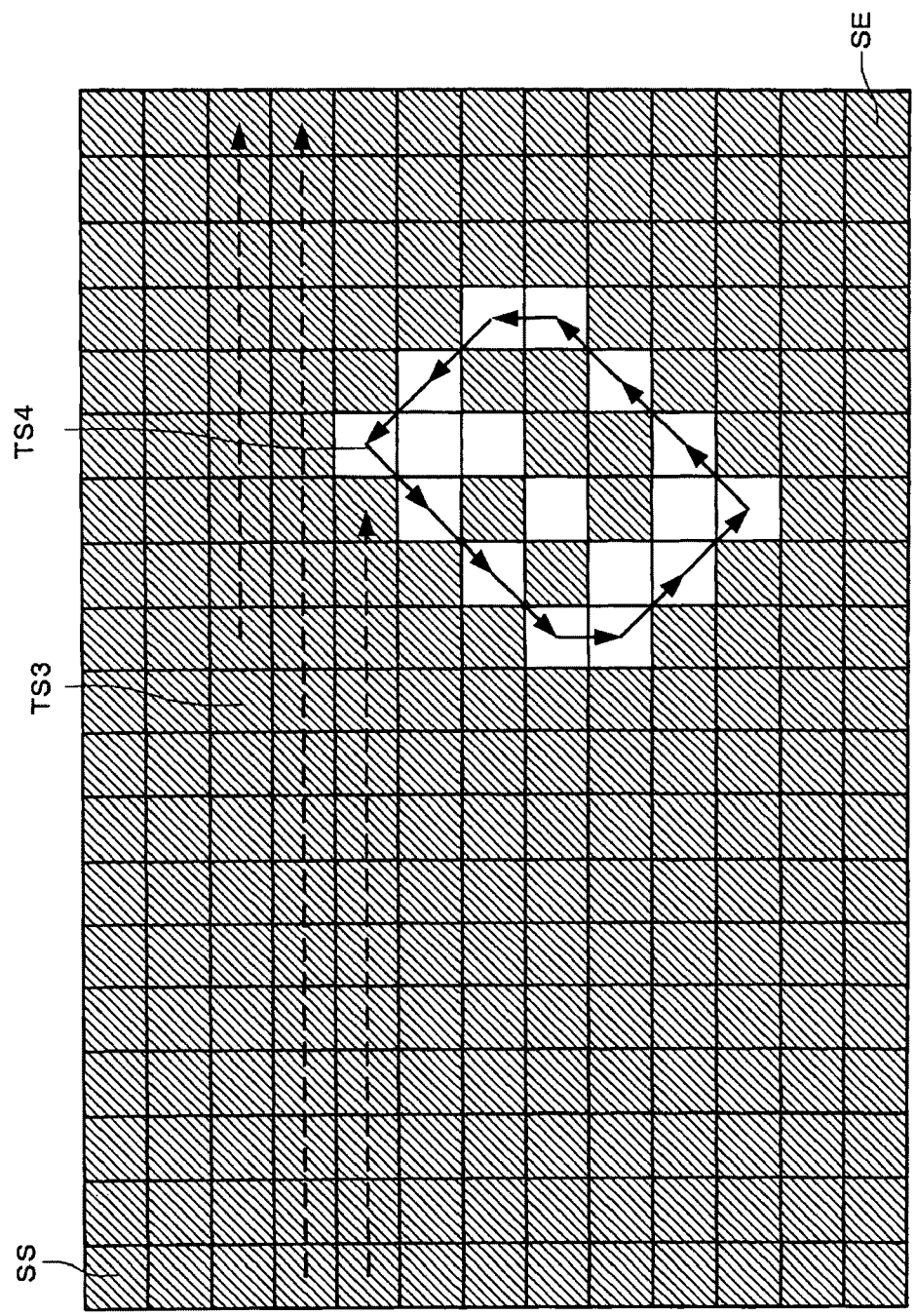
FIG. 11 is still another view illustrative of the flow of the outline extraction process.

In FIG. 11, since it has been determined that the shape of the trace of the outline extracted in FIG. 10 is not a predetermined shape, the white pixels forming the outline starting from the trace starting point TS3 have been changed to black pixels by the pixel information change section 127 described later. The outline extraction section 125 resumes the scan operation from the pixel on the right of the trace starting point TS3, extracts the white pixel detected next as a trace starting point TS4, traces the white pixels in the order indicated by the solid arrows, and extracts the outline based on the coordinate values of the traced white pixels.

Figure 12:
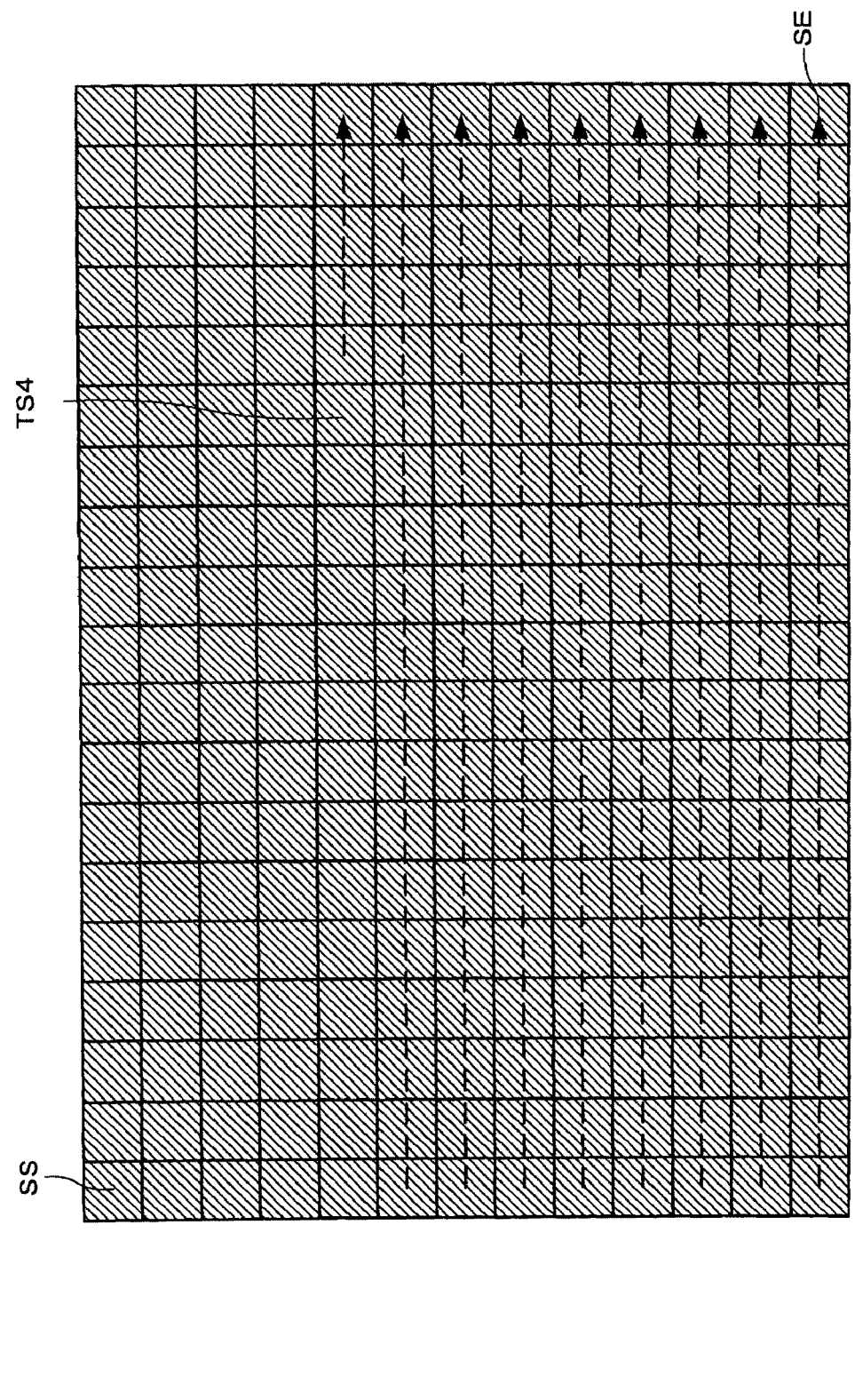
FIG. 12 is yet another view illustrative of the flow of the outline extraction process.

In FIG. 12, since it has been determined that the shape of the trace of the outline extracted in FIG. 11 is not a predetermined shape and the inside is a correct two-dimensional code, each pixel positioned inside the outline has been changed to a black pixel by the pixel information change section 127 described later after the recognition target image has been extracted. The outline extraction section 125 resumes the scan operation from the pixel on the right of the trace starting point TS4, and scans the pixels to the scan end point SE to finish the operation.

An outline determination section 126 determines whether or not the shape of the trace of the outline extracted by the outline extraction section 125 is a predetermined shape. In this embodiment, in order to extract the pattern 16 printed on the card 12 as the recognition target image, the outline determination section 126 determines whether or not the shape of the trace of the outline is rectangular. The outline determination section 126 determines whether or not the shape of the trace of the outline is rectangular by detecting the vertices of the rectangle included in the pixel string forming the outline.

The details of the shape determination process are described below. In the outline determination process, a partial pixel string with a predetermined length L is moved along the extracted outline, and the inner product IP of two vectors set corresponding to the head portion and the end portion of the partial pixel string is calculated.

Figure 13:
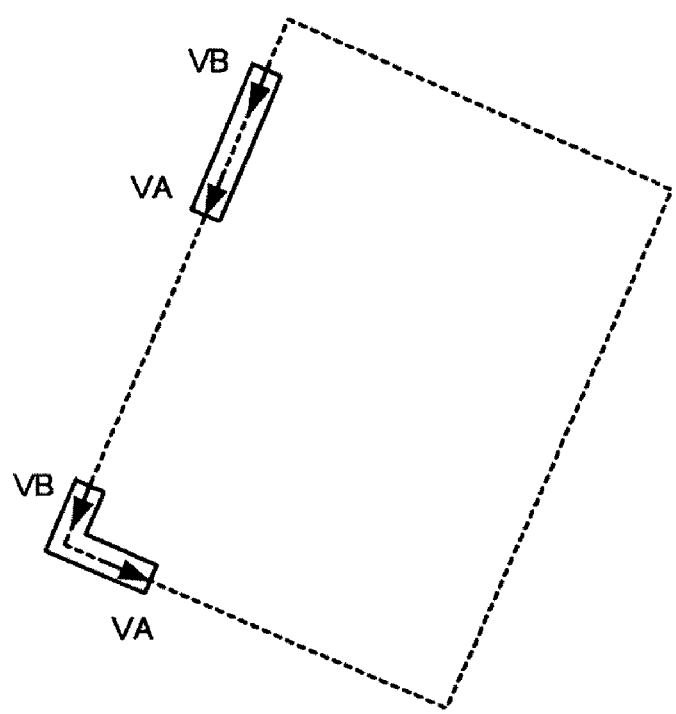
FIG. 13 shows a specific example of a partial pixel string which moves along the outline.

FIG. 13 is a view showing a specific example of the partial pixel string which moves along the outline. For example, when the length L is 10, a partial pixel string is generated which is formed of 10 pixels along the outline. Two vectors A and B with a predetermined length M (the vector A of the head portion is indicated by VA, and the vector B of the end portion is indicated by VB) are respectively set for the head portion and the end portion of the partial pixel string. For example, when the length M is 3, the vector VA has a direction having the first pixel of the partial pixel string as the end point and the third pixel as the starting point. The vector VB has a direction having the end pixel of the partial pixel string as the starting point and the third pixel from the end pixel as the end point.

The vectors VA and VB may be expressed as follows.

$$VA = (\text{difference in } X \text{ component of } VA, \text{difference in } Y \text{ component of } VA) = (vax, vay)$$

$$VB = (\text{difference in } X \text{ component of } VB, \text{difference in } Y \text{ component of } VB) = (vbx, vby)$$

Therefore, the inner product IP of the vectors VA and VB is as follows.

$$IP = VA \cdot VB = vax \times vbx + vay \times vby$$

In the outline determination process, the outline determination section 126 compares the inner product IP with a predetermined threshold value T-IP, determines that the angle formed by of the vectors VA and VB is an almost right angle and the vertex of the rectangle is included in the partial pixel string when $|IP| \leq T\text{-}IP$, and determines that the vertex of the rectangle is not included in the partial pixel string when $|IP| > T\text{-}IP$.

Since the angle theta formed by of the vectors VA and VB is calculated by $\arccos(IP/(|VA| \times |VB|))$, it is necessary to calculate the vector length and perform division and the like. Since it is known that the lengths of the vectors VA and VB are included in the range from 2 to 2 square root of 2, these troublesome calculations are omitted in this embodiment by setting the value T-IP at 2.

As described above, the outline determination section 126 detects the vertex of the rectangle by moving the partial pixel string along the outline, determines that the shape of the trace of the outline is rectangular when the outline determination section 126 has detected the four vertices of the rectangle while moving the partial pixel string along the entire outline, and determines that the shape of the trace of the outline is not rectangular when the outline determination section 126 has not detected the four vertices of the rectangle.

In the recognition target image extraction process, when it has been determined that the shape of the trace of the outline is rectangular by the outline determination process, the binary data corresponding to each pixel positioned inside the outline is extracted as the recognition target image.

When it has been determined that the shape of the trace of the outline is not rectangular by the outline determination process, the pixel information change process is performed in which each white pixel forming the outline is changed to a black pixel. The white pixel is changed to the black pixel by setting the binary data corresponding to each white pixel sequentially traced by the outline extraction process at "0".

Figure 14:
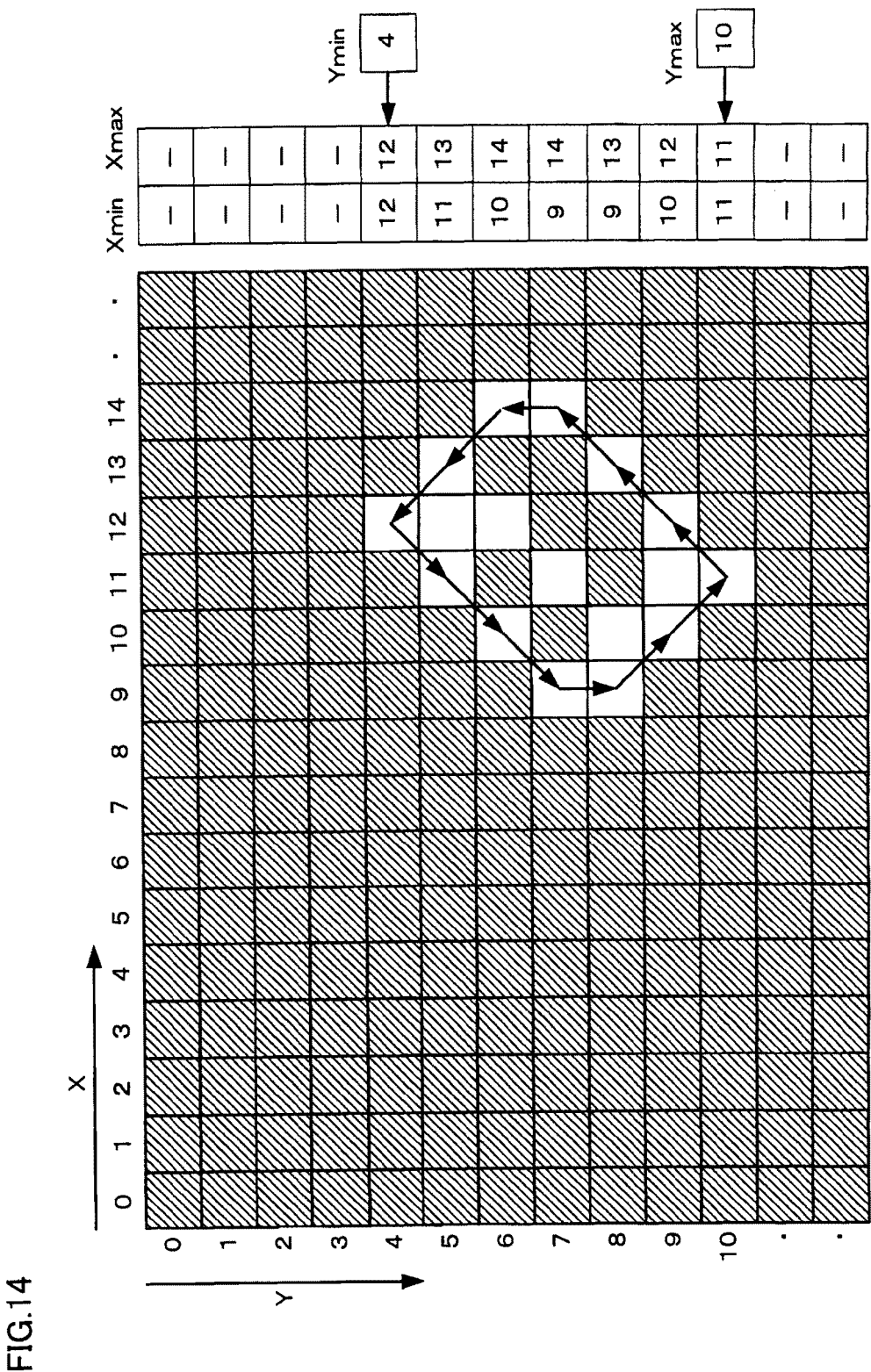
FIG. 14 shows a specific example of a pixel information change process.

When the binary data of each pixel positioned inside the outline has been extracted, the pixel information change process is performed in which each pixel positioned inside the outline is changed to a black pixel. As shown in FIG. 14, the minimum value Xmin and the maximum value Xmax of the X coordinate and the minimum value Ymin and the maximum value Ymax of the Y coordinate of each white pixel forming the outline are extracted, and the binary data corresponding to each pixel from the minimum value Xmin to the maximum value Xmax is set at "0" for each Y coordinate from the minimum value Ymin to the maximum value Ymax, for example.

Figure 15:
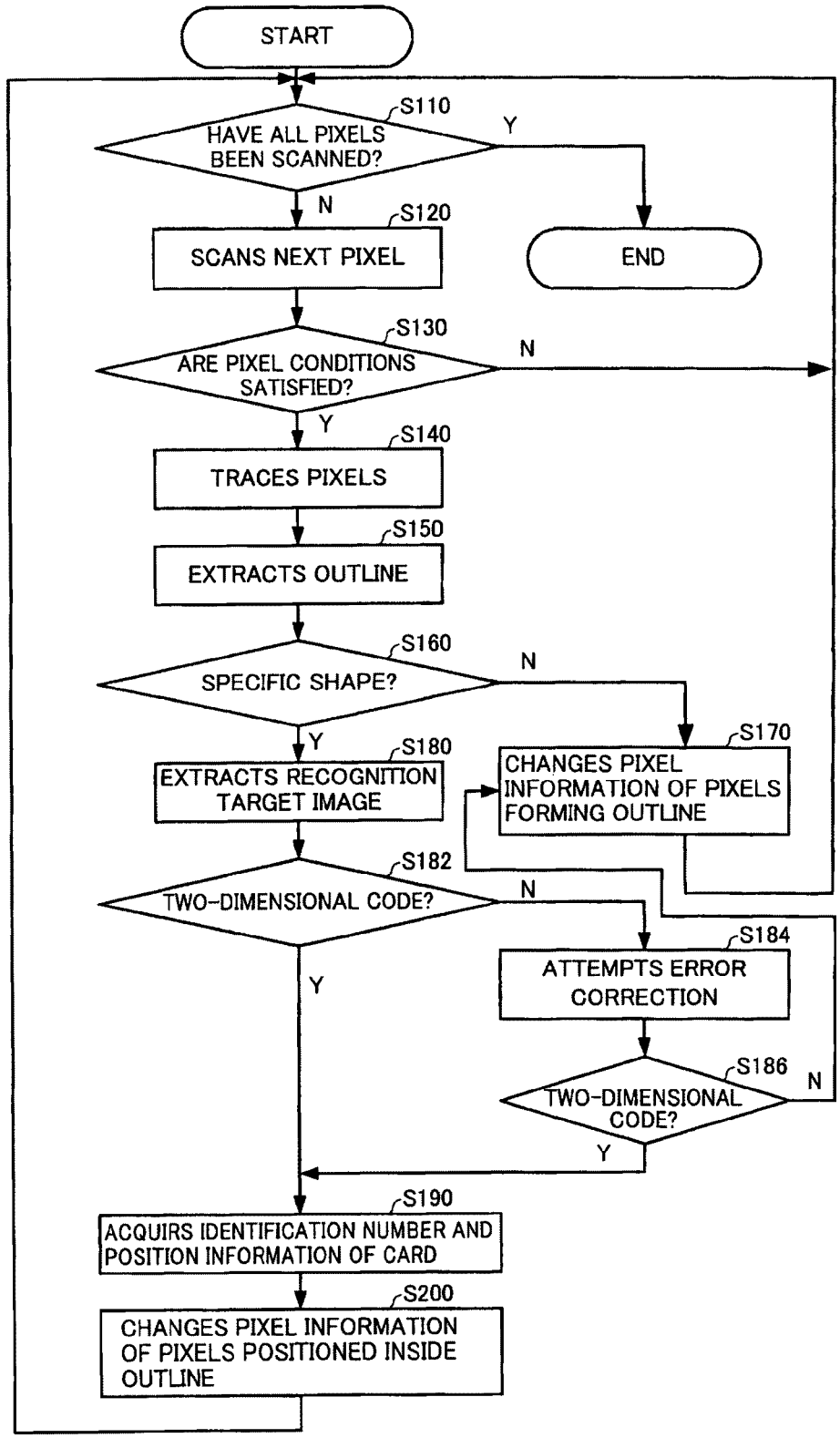
FIG. 15 is a flowchart illustrative of an example of a process according to one embodiment of the invention.

FIG. 15 is a flowchart illustrative of an example of the process according to this embodiment. This example illustrates the process after the binarization process has been performed by the binarization section 123.

Scanning of each pixel forming the binarization image obtained by the binarization section 123 is started, and whether or not all pixels have been scanned is determined (step S110). If all pixels have not been scanned, the next pixel is scanned (step S120). Whether or not the pixel information of the scanned pixel satisfies predetermined pixel conditions (whether or not the pixel is a white pixel) is determined (step S130). When the pixel information of the scanned pixel does not satisfy the predetermined pixel conditions (when the pixel is a black pixel), the process returns to the step S110.

When the pixel information of the scanned pixel satisfies the predetermined pixel conditions (when the pixel is a white pixel), the pixel is extracted as the trace starting point, and the pixels (white pixels) having the pixel information which satisfies the predetermined pixel conditions are sequentially traced from the trace starting point until the trace starting point is again reached (step S140). The outline is extracted based on the coordinate values of each traced pixel (each white pixel) (step S150). The vertex of the extracted outline is detected, and whether or not the shape of the trace of the outline is a predetermined shape (rectangular) is determined based on the detected vertex (step S160). When the shape of the trace of the outline is not a predetermined shape (rectangular), the pixel information of the pixels (traced white pixels) forming the outline is changed to the pixel information (binary data=0) other than the pixel information which satisfies the predetermined pixel conditions (step S170), and the process returns to the step S110.

When the shape of the trace of the outline is a predetermined shape (rectangular), the binary data corresponding to each pixel positioned inside the outline is extracted as the recognition target image (step S180).

When the extracted recognition target image is the two-dimensional code according to this embodiment, a process in a step S190 is performed (step S182). Determination conditions for determining that the recognition target image is the two-dimensional code according to this embodiment may be set in advance, and the recognition target image may be determined to be the two-dimensional code according to this embodiment when the conditions are satisfied.

When the recognition target image is not the two-dimensional code according to this embodiment (step S182), an error correction is performed (step S184), and whether or not recognition target image is the two-dimensional code according to this embodiment is again determined. When the recognition target image is the two-dimensional code according to this embodiment, the process in the step S190 is performed (step S186). When the recognition target image is not the two-dimensional code according to this embodiment, the process in the step S170 is performed.

Whether or not the recognition target image is the two-dimensional code according to this embodiment may be determined and error correction may be performed using a method described in "4-4. Recognition process of recognition target image and error correction process", for example.

When the recognition target image is not the two-dimensional code according to this embodiment, the identification number, the position, and the like of the card are acquired from the extracted recognition target image (step S190). The pixel information of each pixel positioned inside the outline is changed to the pixel information (binary data=0) other than the pixel information which satisfies the predetermined pixel conditions (step S200), and the process returns to the step S110. The process is terminated when all pixels have been scanned.

4-4. Recognition Process of Recognition Target Image and Error Correction Process In this embodiment, a reference point correspondence position of the recognition target image is detected, a focused point correspondence position on the recognition target image corresponding to a focused point (e.g. point placement reserved position) set while being associated with a reference point based on the reference point correspondence position is calculated, the pixel information of the recognition target image is detected based on the calculated focused point correspondence position, and correspondence data associated with the two-dimensional code is calculated based on the extracted pixel information.

FIGS. 40 to 43 are views illustrative of an example of a focused point pixel information detection process. K1', K2', K3', and K4' are reference point correspondence positions of a recognition target image 400. The reference points may be set at the vertices (K1, K2, K3, and K4 in FIG. 41) at the four corners of the two-dimensional region, for example. When the two-dimensional region is rectangular (including square), since the shape can be specified by three or two vertices (vertices on the diagonal) forming the rectangle, the reference points may be three or two vertices.

The reference point correspondence positions of the recognition target image may determined by peripheral edges (vertices) E1, E2, E3, E4 of the frame line and the width of the frame. The inner edge of a frame line 410 may be detected and determined to be the reference point correspondence positions.

When setting the focused points to be the point placement reserved positions of the main layers (250 in FIG. 41), information indicating whether or not the point is placed at the point placement reserved positions can be acquired from the recognition target image.

Figure 41:
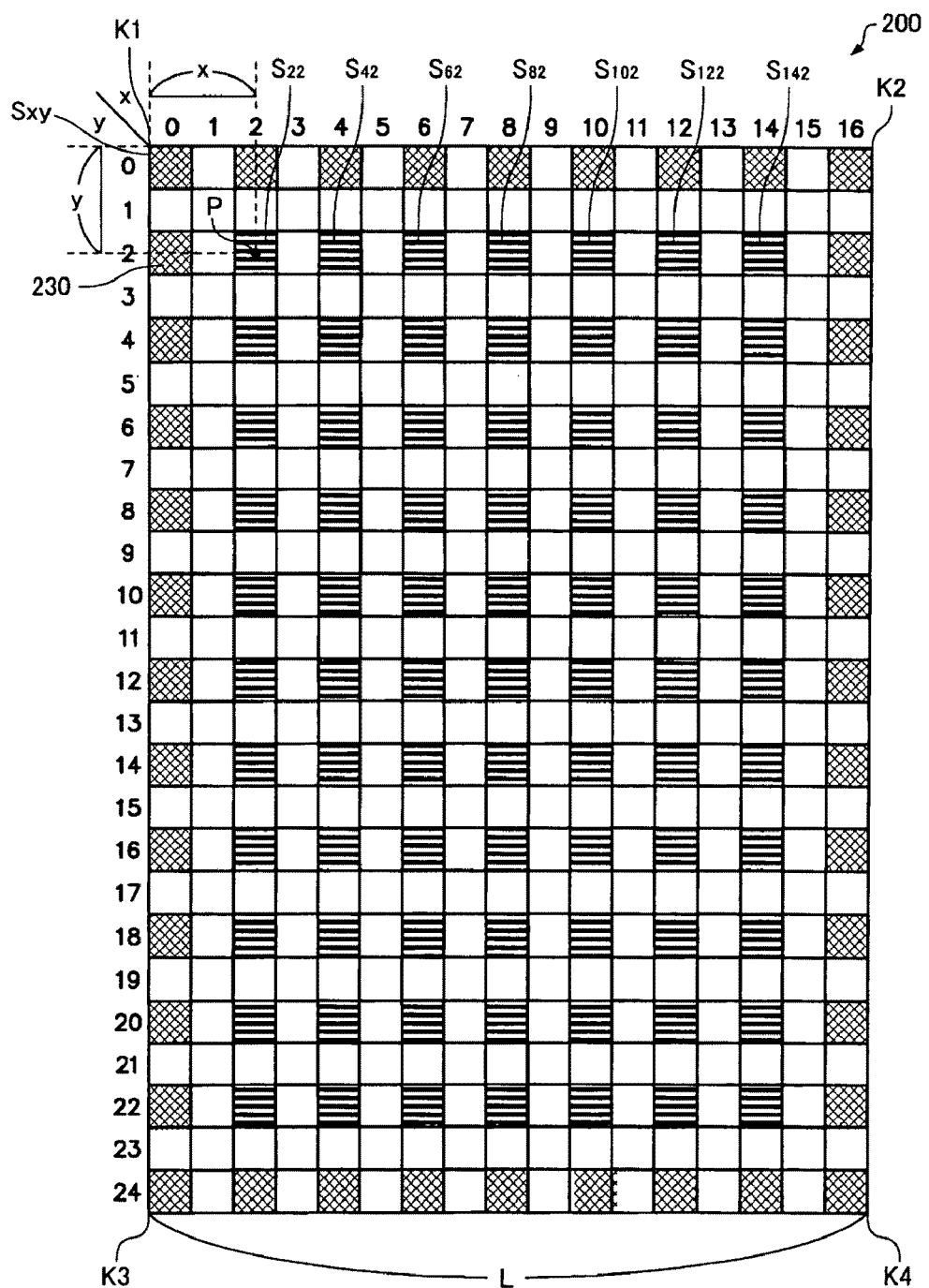
FIG. 41 is another view illustrative of a focused point pixel information detection process.

As shown in FIG. 41, the relative position of the point placement reserved position 250 of the main layer in the two-dimensional region with respect to the reference positions K1, K2, K3, and K4 is determined.

The center point of the cell S(2,2) shown in FIG. 41 which is the point placement reserved position of the main layer is indicated by P, and the corresponding position on the recognition target image is indicated by P'. When the relative position of the point P on the two-dimensional image from the reference point K1 is (x,y) (see FIG. 41), and the relative position of the point P' on the recognition target image from the reference point correspondence position K1' is (x',y'), the following expressions are satisfied.

$$x:x'=L:L'$$

$$y:y'=L:L'$$

Therefore, if the distance L between the reference positions in the two-dimensional region and the distance L' between the corresponding reference point correspondence positions in the recognition target image are determined, the point placement reserved position of the main layer of the recognition target image can be determined.

Figure 40:
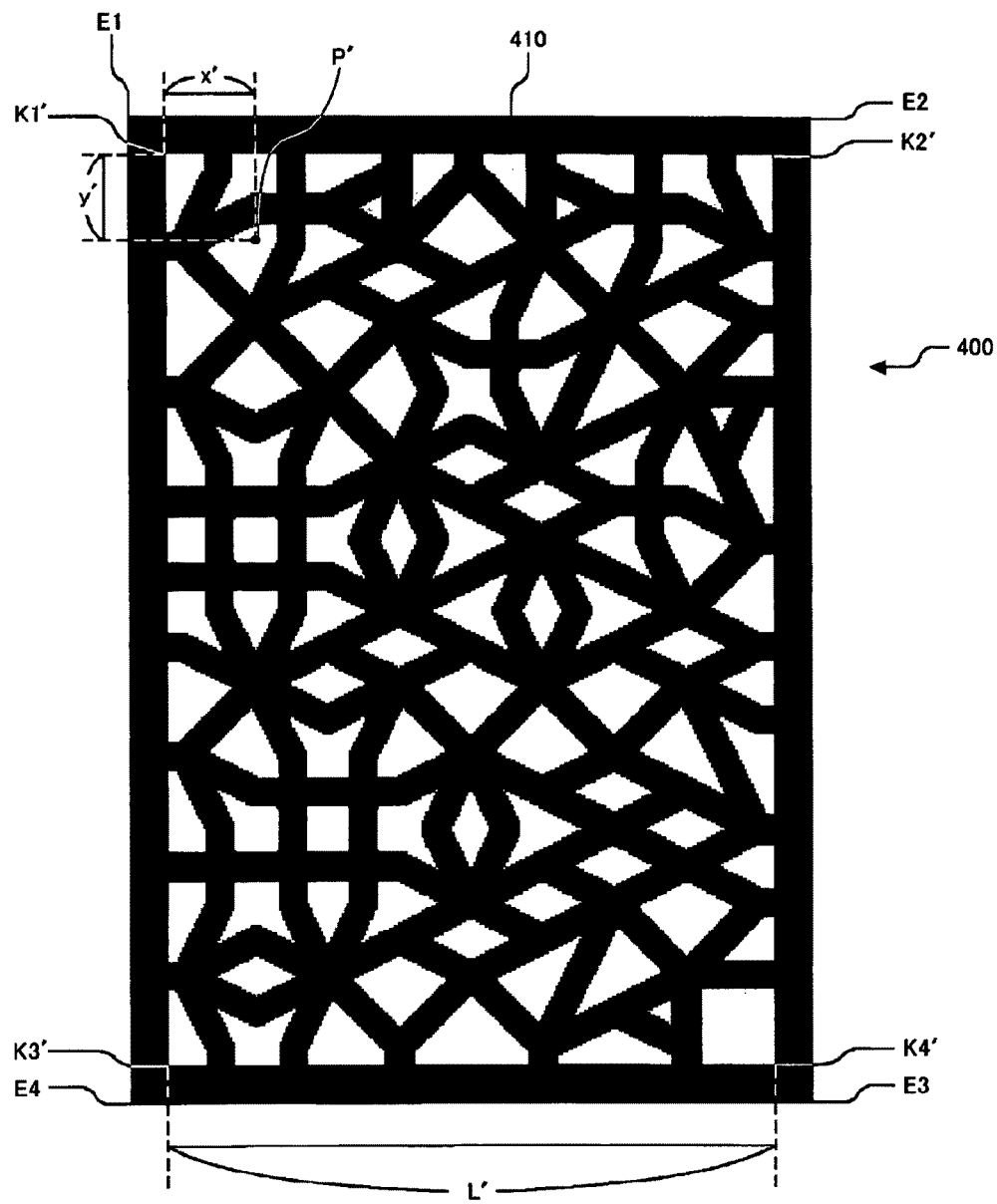
FIG. 40 is a view illustrative of a focused point pixel information detection process.

In FIG. 40, since the position P' on the recognition target image corresponding the center point P of the cell S(2,2) as the point placement reserved position of the main layer is a white pixel, it can be detected that the point is not placed in the cell S(2,2).

The binary data string placed in the main layers can be determined by performing a similar process for all of the point placement reserved positions forming the main layers.

The correspondence data associated with the two-dimensional code can be determined by determining data of which the standard Fibonacci representation is the determined binary data string.

For example, the correspondence table of the standard Fibonacci representation and the decimal number as shown in FIG. 19 may be provided, and the correspondence data of the decimal number corresponding to the standard Fibonacci representation may be determined referring to the correspondence table.

In this embodiment, a connection simulation process may be performed in which the points may be placed at the point placement reserved positions in the two-dimensional region based on the binary data string calculated from the recognition target image according to the preset binary data string placement conditions, and each point and the connection target point are connected according to the preset connection conditions, and at least one of an error detection process and an error correction process may be performed by comparing the connection state of the sampled point detected from the recognition target image and the connection state of the sampled point obtained by the connection simulation process.

Specifically, the image recognition system is provided with a point placement and connection algorithm when generating the two-dimensional code, and the connection simulation process is performed in which the points are placed in the two-dimensional region based on the binary data string obtained from the recognition target image and the points are connected according to the connection conditions.

Figure 42:
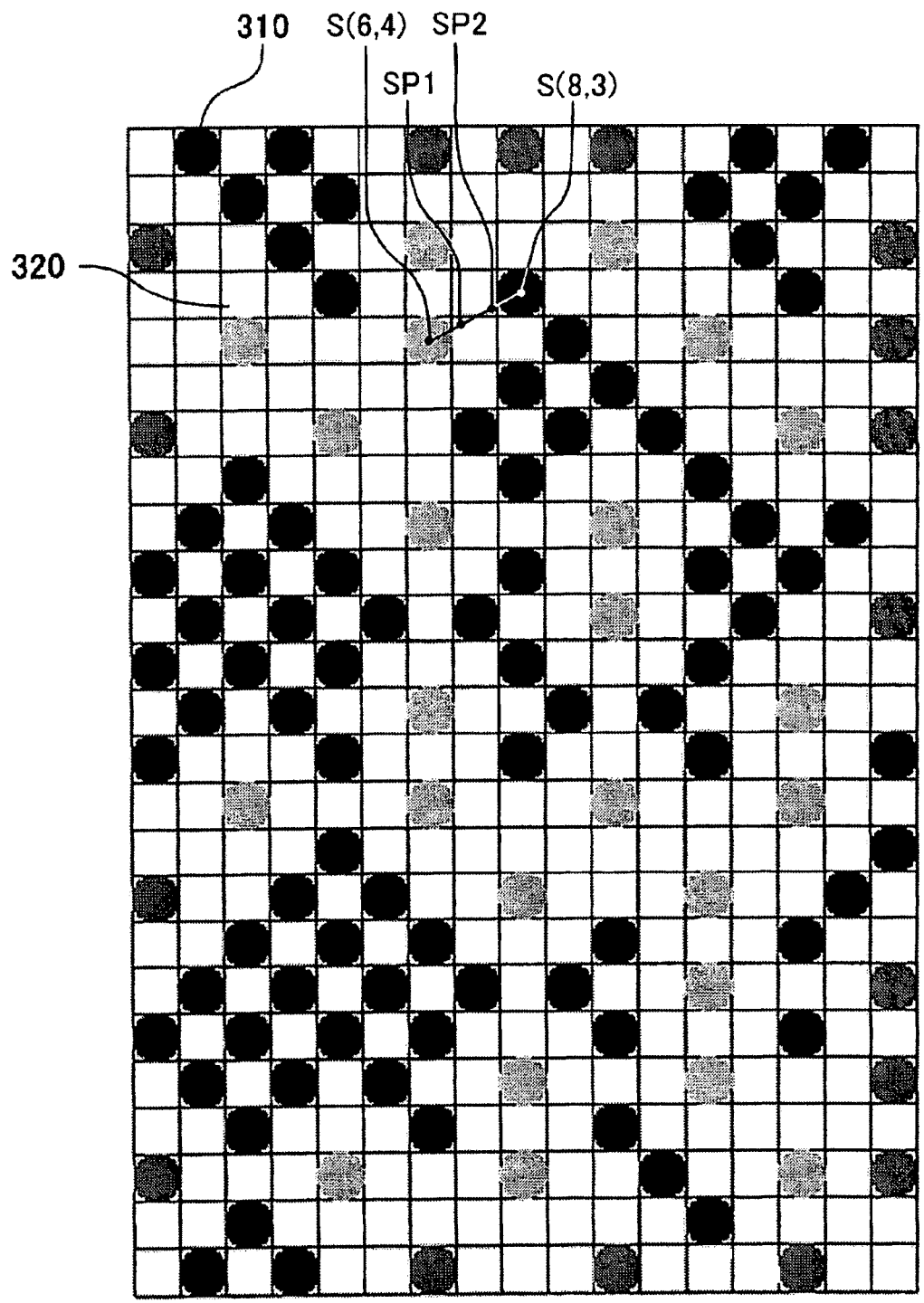
FIG. 42 is still another view illustrative of a focused point pixel information detection process.
Figure 43:
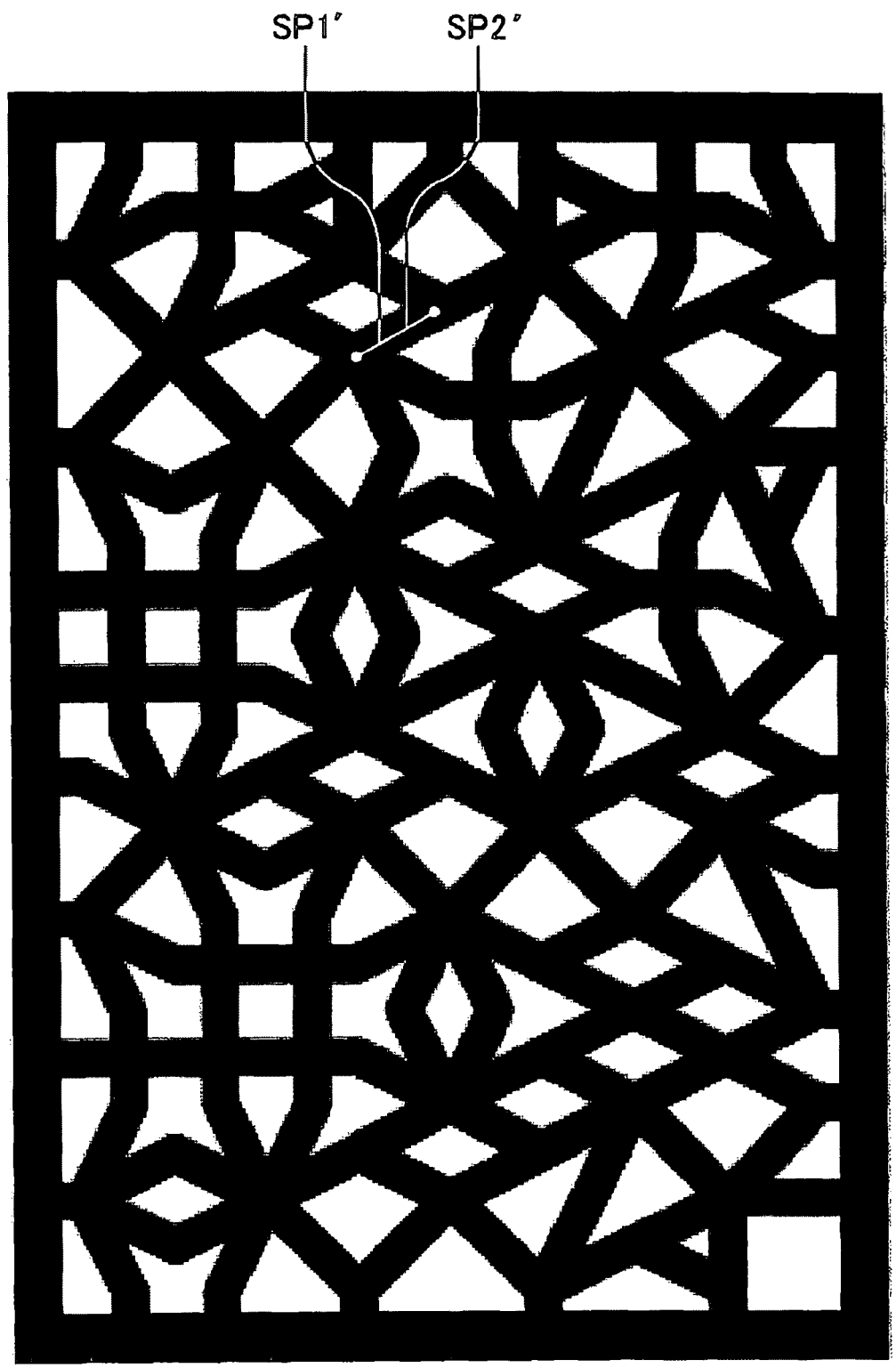
FIG. 43 is yet another view illustrative of a focused point pixel information detection process.

FIG. 42 is a view showing a state in which the points are placed in the two-dimensional region by the connection simulation process based on the binary data string obtained from the recognition target image. FIG. 43 shows the recognition target image. Since the point placed in the cell S(6,4) of the main layer and the point placed in the cell S(8,3) of the sublayer satisfy the connection conditions described with reference to FIG. 27, these points are connected through a line. Two points SP1 and SP2 on the line are sampled, and the positions of points SP1' and SP2' on the recognition target image corresponding to the points SP1 and SP2 are determined. The position is determined in the same manner as the method described with reference to FIGS. 40 and 41. The pixel information corresponding to the determined positions may be detected from the recognition target image, and the connection states may be compared by determining whether or not the detected pixel information indicates the presence of a line (e.g. whether or not the pixel is a black pixel).

An error may occur when the card is a forged card or the image is incorrectly recognized due to noise and the like.

When an error has been detected by the comparison result, the recognition process may be terminated, or the error correction process may be performed.

For example, when the error has occurred since the card is a forged card, it is unnecessary to correct the error. Therefore, the forged card can be prevented from being used by terminating the recognition process.

When the error has occurred due to incorrect image recognition caused by noise and the like, the error can be corrected by changing the position of the stone until the error does not occur and performing the connection simulation process.

In this embodiment, at least one of the error detection process and the error correction process may be performed for the binary data string determined from the recognition target image based on the conditions of the binary data string expressed by the standard Fibonacci representation.

For example, numbers "1" are not adjacent in the data string expressed by the standard Fibonacci representation. Therefore, it is determined that an error has occurred when the points are successively placed at the point placement reserved positions of the main layers.

In this case, the recognition process may be terminated or the error correction process may be performed.

For example, when the error has occurred since the card is a forged card, it is unnecessary to correct the error. Therefore, the forged card can be prevented from being used by terminating the recognition process.

When the error has occurred due to incorrect image recognition caused by noise and the like, the error can be corrected by changing the position of the stone based on the conditions of the binary data string expressed by the standard Fibonacci representation.

A simulation process may be performed in which the dummy point is placed at the point placement reserved position belonging to the sublayer set in the two-dimensional region at a position other than the main layer according to preset dummy point placement conditions, and at least one of the error detection process and the error correction process may be performed by comparing the position of the sampled dummy point detected from the recognition target image and the position of the dummy point obtained by the dummy point simulation process.

The dummy point may be placed in the sublayer according to the placement conditions relating to the placement of the points in the main layer and the parity layer, or may be placed in the sublayer according to a rule or conditions independent of the placement of the points in the main layer and the parity layer.

In the former case, the placement of the dummy point in the sublayer may be simulated after simulating the placement of the points in the main layer and the parity layer based on the binary data string determined from the recognition target image.

The position on the recognition target image corresponding to the dummy point obtained by the dummy point simulation process may be determined, the pixel information corresponding to the determined position may be detected from the recognition target image, and the error detection process and the error correction process may be performed by determining whether or not the detected pixel information indicates the presence of the dummy point (e.g. whether or not the pixel is black pixel).

Figure 44:
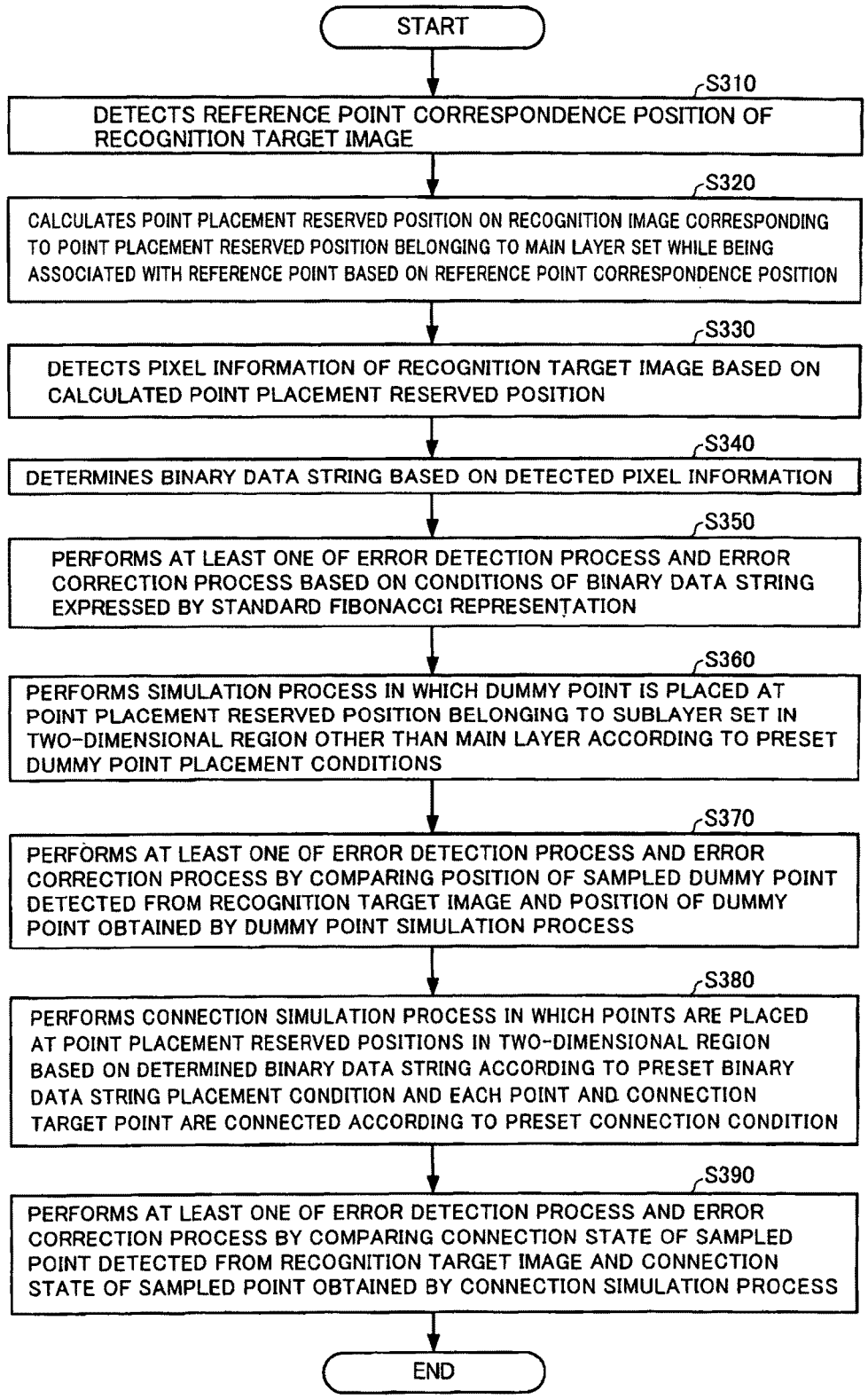
FIG. 44 is a flowchart illustrative of the flow of a recognition process of a recognition target image and an error correction process.
Figure 46:
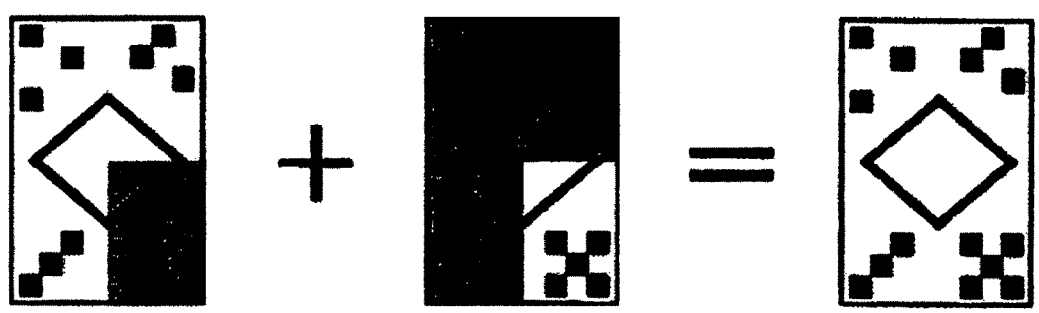
FIG. 46 is a view illustrative of a card using a two-dimensional code.

FIG. 44 is a flowchart illustrative of the flow of the recognition process of the recognition target image and the error correction process according to this embodiment.

The reference point correspondence position of the recognition target image is detected (step S310).

The point placement reserved position on the recognition target image corresponding to the point placement reserved position belonging to the main layer set while being associated with the reference point based on the reference point correspondence position is calculated (step S320).

The pixel information of the recognition target image is detected based on the calculated point placement reserved position (step S330).

The binary data string is determined based on the detected pixel information (step S340).

At least one of the error detection process and the error correction process is performed based on the conditions of the binary data string expressed by the standard Fibonacci representation (step S350).

The simulation process is performed in which the dummy point is placed at the point placement reserved position belonging to the sublayer set in the two-dimensional region at a position other than the main layer according to the preset dummy point placement conditions (step S360).

At least one of the error detection process and the error correction process is performed by comparing the position of the sampled dummy point detected from the recognition target image and the position of the dummy point obtained by the dummy point simulation process (step S370).

The connection simulation process is performed in which the points are placed at the point placement reserved positions in the two-dimensional region based on the determined binary data string according to the preset binary data string placement conditions, and each point and the connection target point are connected according to the preset connection conditions (step S380).

At least one of the error detection process and the error correction process is performed by comparing the connection state of the sampled point detected from the recognition target image and the connection state of the sampled point obtained by the connection simulation process (step S390).

Note that all of the above steps need not necessarily performed. The steps may be appropriately omitted depending on a recognition level described later.

4-5. Recognition Level of Two-Dimensional Code

The two-dimensional code according to this embodiment is scalable in terms of the depth of recognition. The recognition process can be achieved at high speed at the expense of performance when taking only the surface portion into consideration, and can be achieved with high performance at the expense of speed when taking the deep portion into consideration. Regarding the image quality of the input image, while the system operates with a low image quality in the former case, a high image quality is required in the latter case. The level used may be comprehensively determined taking the application, cost, and the like into consideration.

The term "security level" described below indicates the resistance to patch forgery.

Level 1: Only the information of the stone of the main layer is used.

The ID can be acquired even if the conditions (i.e. image quality) of the recognition target image are bad. However, only a minimum error check is performed (such as "Is standard Fibonacci representation?"). Moreover, since the security level decreases, the level 1 is desirably used under limited conditions.

Level 2: The information of the stone of the parity layer is used in addition to the level 1.

The detection possibility is increased even if a large amount of noise is present on the main layer. However, the security level is the same as that of the level 1.

Level 3: The information of the stone of the sublayer is used in addition to the level 2.

The ID can be detected without a problem including error detection. The security level is medium.

Level 4: In addition to the level 3, several points are sampled from each bridge, and the connection information between the stones is acquired and verified.

The security level poses no problem in practice. The processing speed and the ID detection/security level are well balanced.

Level 5: The entire shape of the bridge is examined.

The security level is the highest. However, since the details of the two-dimensional image are verified (compared with normal pattern), the processing load is increased.

Specifically, the method may be roughly classified as a method of comparing the edges of the bridges (only the boundary is examined) and a method of comparing the presence or absence of pixels forming the bridges (the entire card is examined). Since the continuity of the line of the bridge is completely examined using these methods, patch forgery is substantially impossible.

FIG. 45 is a comparison table of the two-dimensional code recognition level.

4-6. Error Correction in Pixel Units (Preprocess)

Since the bridge has a width, small pixel-unit noise on the bridge can be removed (noise in the portion other than the bridge can be reduced).

Specifically, noise can be removed by referring to the surrounding pixels (e.g. using a blur filter).

Since a blur filter is optically provided when using a camera with a small number of pixels or a lens with a low image quality, noise can be removed at high speed.

4-7. Error Correction of Two-Dimensional Code (Main Process)

For example, since one or more (three or more) cells necessarily exist between the stones of the main layers in the lateral direction due to the properties of the standard Fibonacci representation, occurrence of a problem can be detected if no cell exists between the stones of the main layers (path equal to or greater than allowable amount exists: partial floating and inclination of the card, large noise, or forged card).

In this case, the stone of the main layer is temporarily (by internal process) moved to a position at which one or more (three or more) cells are provided or the stone is removed to examine the degree of coincidence (degree of coincidence between the actual input image and the simulation) with the stone of the sublayer or the stone of the parity layer (the information of the bridge provided between the stones is also used), and the placement with the minimum error is returned as the recognition result after error correction. In a normal case, the error becomes zero or infinitely approaches zero if the correction succeeds. On the other hand, when the error does not become equal to or less than the threshold value by correction to some extent, the cause of the error may be the problem of the imaging system or forgery by patching, with high possibility.

This correction method is effective not only for an error detected by the properties of the standard Fibonacci representation as in the above example, but also for black/white inversion (when black and white are reversed due to noise or the like) of all of the stones and the bridges (or the portion in which the stone and the bridge are not placed) of the main layers, the sublayers, and the parity layers.

The above correction method is characterized in that an encoding routine is provided in the two-dimensional code decoding implementation and a simulation is performed, if necessary (to achieve minimum error). In other words, the above correction method is an all-out error correction using the entire shape of the assembly of the bridges forming the two-dimensional code. Since the presence or absence of one stone affects the surroundings and the parity to a large extent, local dependence is absent (affects the surroundings in chain reaction).

4-8. Sister ID and Orientation of Card

In this embodiment, orientation determination information is stored which indicates the relationship between the value of the binary data string and the orientation of the recognition target image, and the orientation of the recognition target image is determined based on the determined binary data string and the orientation determination information.

The relationship between sister IDs (normal-direction ID when recognized in the normal direction and reverse-direction ID when recognized in the opposite direction) as the reading targets and the orientation is stored as the orientation determination information, and the orientation of the recognition target image is determined whether the recognized data coincides with either the normal-direction ID or the reverse-direction ID. For example, when the determined data coincides with the reverse-direction ID, the orientation of the card is the reverse direction.

A condition (e.g. range) for the normal-direction ID and a condition for the reverse-direction ID may be stored as the orientation determination information, and the orientation of the recognition target image may be determined by the condition satisfied by the recognized data.

The sister IDs may be used particularly when applying a card, on which the two-dimensional code according to this embodiment is printed, to a card game machine and the like. In general, a two-dimensional code has two IDs, one when read from the normal position and the other read from the opposite position. In this case, the ID at the opposite position viewed from the ID at the normal position (vice versa) is called the sister ID. If the ID at the normal position is determined, the ID at the opposite position is uniquely determined (or vice versa). As advantages in practical use, important information for determining the orientation of the card is obtained, and the recognition accuracy is improved (redundancy is provided) by recognizing the card at the normal position and the opposite position, for example. The ID at the normal position and the ID at the opposite position can be converted at high speed merely by using arithmetic logical calculations.

A two-dimensional code may have only the ID at the normal position and may not have the ID at the opposite position. In this case, the two-dimensional code does not have the sister ID. This is because "32" (1010100) is not used when the block is 7 fits, for example.

The recognition engine may be configured to detect only a card having an ID at the normal position. In this case, it is considered that the card exists on the table of the housing only when the card is at the normal position. Specifically, the card disappears when the card is reversed (may be used as a switch). Since a similar effect is obtained by a card having a sister ID, only cards having the sister ID may be used in order to always determine the positions and the rotation angles of all cards.

5. Image Recognition Device

FIG. 1 shows an example of a functional block diagram of a game system to which the image recognition device according to this embodiment is applied. The game system according to this embodiment may have a configuration in which some of the elements (sections) shown in FIG. 1 are omitted.

The imaging section 150 is used to image the recognition target object. The function of the imaging section 150 may be implemented by a camera using a CCD as an imaging element or the like. The imaging section 150 outputs image data formed of grayscale data (pixel information) corresponding to the pixel at respective coordinates in the imaging range to the processing section 100.

An operation section 160 allows the player to input operation data. The function of the operation section 160 may be implemented by a lever, a direction indication key, a button, or the like.

A storage section 170 serves as a work area for the processing section 100, a communication section 196, and the like. The function of the storage section 170 may be implemented by a RAM (VRAM) or the like.

An information storage medium 180 (computer-readable medium) stores a program, data, and the like. The function of the information storage medium 180 may be implemented by an optical disk (CD or DVD), a memory card, a hard disk, a memory (ROM), or the like. The processing section 100 performs various processes according to this embodiment based on a program (data) stored in the information storage medium 180. Specifically, a program for causing a computer to function as each section according to this embodiment (program for causing the computer to execute processing of each section) is stored in the information storage medium 180.

A display 190 displays an image generated according to this embodiment.

A sound output section 192 outputs sound generated according to this embodiment. The function of the sound output section 192 may be implemented by a speaker, a headphone, or the like.

A portable information storage device 194 stores player's personal data, game save data, and the like. As examples of the portable information storage device 194, a memory card, a portable game system, and the like can be given.

The communication section 196 performs various types of control for communicating with the outside (e.g. host device or another game system). The function of the communication section 196 may be implemented by hardware such as a processor or a communication ASIC, a program, and the like.

The program (data) for causing a computer to function as each section according to this embodiment may be distributed to the information storage medium 180 (storage section 170) from an information storage medium of a host device (server) through a network and the communication section 196. Use of the information storage medium of the host device (server) may also be included within the scope of the invention.

The processing section 100 (processor) performs a game calculation process, an image generation process, a sound generation process, and the like based on operation data from the operation section 160, a program, and the like. The processing section 100 performs various processes using the storage section 170 as a work area. The function of the processing section 100 may be implemented by hardware such as a processor (e.g. CPU or DSP) or an ASIC (e.g. gate array) and a program.

The processing section 100 includes a game calculation section 110, an image generation section 140, and a sound generation section 142.

The game calculation section 110 performs a game calculation process for generating a game image and game sound. The game calculation process includes a process of determining the game content and a game mode, a process of starting a game when game start conditions have been satisfied, a process of proceeding with a game, a process of calculating a game parameter which changes accompanying game play, a process of terminating a game when game finish conditions have been satisfied, and the like.

The game calculation section 110 includes an image recognition section 120. The image recognition section 120 extracts image data corresponding to a pattern of a card from the image data output from the imaging section 150 as a recognition target image, and acquires identification information, the position, and the like of the card from the extracted recognition target image. The game calculation section 110 performs game calculations based on the acquired card identification information, position information, and the like.

The image recognition section 120 includes a differentiation section 121, a blur section 122, a binarization section 123, an outline extraction section 125, an outline determination section 126, a pixel information change section 127, a recognition target image extraction section 128, a focused point pixel information detection section 130, a correspondence data calculation section 132, a simulation section 134, an error detection/correction section 136, and an orientation determination section 138.

The differentiation section 121 subjects the image data output from the imaging section 150 to the quadratic differential process using the grayscale data (pixel information) of the focused pixel and the peripheral pixels.

The blur section 122 subjects the quadratic differential data subjected to the quadratic differential process by the differentiation section 121 to the blur process using the quadratic differential data of the focused pixel and the peripheral pixels.

The binarization section 123 converts the quadratic differential data output from the blur section 122 into binary data by comparison with a predetermined threshold value S-TH. When the quadratic differential data is greater than the threshold value S-TH, the binary data is set at "1". When the quadratic differential data is equal to or less than the threshold value S-TH, the binary data is set at "0".

The binarization process may be performed by translating (casting) the quadratic differential data output from the blur section 122 into an unsigned integer. The negative value of the new quadratic differential data can be made close to the maximum positive value by translating the quadratic differential data into an unsigned integer, whereby the contrast of the image after the binarization process can be increased.

The outline extraction section 125 extracts the outline of a pixel group formed of adjacent white pixels by scanning each pixel forming the binary image in a predetermined order to detect a first white pixel reached, and sequentially tracing other white pixels adjacent to the first white pixel until the first white pixel is again reached.

The recognition target image extraction section 128 extracts the binary data corresponding to each pixel positioned inside the outline as the recognition target image when the outline determination section 126 has determined that the shape of the trace of the outline is rectangular.

The pixel information change section 127 changes each white pixel forming the outline to a black pixel when the outline determination section 126 has determined that the shape of the trace of the outline is not rectangular. The pixel information change section 127 changes each white pixel to a black pixel by setting the binary data corresponding to each white pixel sequentially traced by the outline extraction section 125 at "0".

The pixel information change section 127 changes each pixel positioned inside the outline to a black pixel when the binary data of each pixel positioned inside the outline has been extracted by the recognition target image extraction section 128. As shown in FIG. 14, the minimum value Xmin and the maximum value Xmax of the X coordinate and the minimum value Ymin and the maximum value Ymax of the Y coordinate of each white pixel forming the outline are extracted, and the binary data corresponding to each pixel from the minimum value Xmin to the maximum value Xmax is set at "0" for each Y coordinate from the minimum value Ymin to the maximum value Ymax, for example.

The focused point pixel information detection section 130 detects the reference point correspondence position of the recognition target image, calculates the focused point correspondence position on the recognition target image corresponding to the focused point (e.g. point placement reserved position) set while being associated with a reference point based on the reference point correspondence position, and detects the pixel information of the recognition target image based on the calculated focused point correspondence position.

The correspondence data calculation section 132 calculates the correspondence data associated with the two-dimensional code based on the pixel information detected by the focused point pixel information detection section 130.

The focused point pixel information detection section 130 may calculate the point placement reserved position on the recognition target image as the focused point correspondence position using the point placement reserved position belonging to the main layer as the focused point, detect the pixel information of the recognition target image based on the calculated point placement reserved position, calculate the binary data string based on the pixel information detected by the correspondence data calculation section 132, and determine given data uniquely associated with the determined binary data string to be the correspondence data.

The simulation section 134 may perform the connection simulation process which places the points at the point placement reserved positions in the two-dimensional region based on the binary data string calculated by the correspondence data calculation section 132 according to the preset binary data string placement conditions, and connects each point and the connection target point according to the preset connection conditions.

The simulation section 134 may perform the dummy point simulation process in which the dummy point is placed at the point placement reserved position belonging to the sublayer set in the two-dimensional region at a position other than the main layer according to the preset dummy point placement conditions.

The error detection/correction section 136 may perform at least one of the error detection process and the error correction process by comparing the connection state of the sampled point detected from the recognition target image and the connection state of the sampled point obtained by the connection simulation process.

The error detection/correction section 136 may perform at least one of the error detection process and the error correction process for the binary data string calculated by the correspondence data calculation section 132 based on the conditions of the binary data string expressed by the standard Fibonacci representation.

The error detection/correction section 136 may perform at least one of the error detection process and the error correction process by comparing the position of the sampled dummy point detected from the recognition target image and the position of the dummy point obtained by the dummy point simulation process.

The orientation determination section 138 determines the orientation of the recognition target image based on the binary data string calculated by the correspondence data calculation section 132 and the orientation determination information.

The image generation section 140 performs a drawing process based on the results of various processes (game process and image recognition process) performed by the processing section 100 and outputs the image to the display section 190. In this case, the image generated by the image generation section 130 may be a two-dimensional image or a three-dimensional image.

The sound generation section 142 processes sound based on the results of various processes performed by the processing section 100, generates game sound such as background music (BGM), effect sound, or voice, and outputs the game sound to the sound output section 192.

The invention is not limited to the above-described embodiments, and various modifications can be made. Any term cited with a different term having a broader meaning or the same meaning at least once in this specification or drawings can be replaced by the different term in any place in this specification and drawings.

The above embodiments have been described taking an example of the two-dimensional code in which the points placed in the two-dimensional region are connected through a line and the generation and recognition methods thereof. Note that the invention is not limited thereto.

For example, the scope of the invention includes a two-dimensional code in which given data is encoded as a two-dimensional image, the two-dimensional code including a point placed in a point placement reserved position belonging to a main layer set in a two-dimensional region based on a binary data string uniquely associated with the given data, and a dummy point placed in a point placement reserved position belonging to a layer in the two-dimensional region other than the main layer, wherein a given pattern is formed by the points to form a two-dimensional image, and also includes methods of generating and recognizing the two-dimensional code.

Although only some embodiments of this invention have been described in detail above, those skilled in the art will readily appreciate that many modifications are possible in the embodiments without materially departing from the novel teachings and advantages of this invention. Accordingly, all such modifications are intended to be included within the scope of the invention.

What is claimed is:

1. A two-dimensional code recognition method using a computer comprising:

a focused point pixel information detection step of detecting a reference point correspondence position of a recognition target image, calculating a focused point correspondence position on a recognition target image corresponding to a focused point set while being associated with a reference point based on the reference point correspondence position, detecting pixel information of the recognition target image based on the calculated focused point correspondence position, calculating a point placement reserved position on a recognition target image as the focused point correspondence position while using a point placement reserved position belonging to a main layer in a two-dimensional region as the focused point, and detecting the pixel information of the recognition target image based on the calculated point placement reserved position; and a correspondence data calculation step of calculating correspondence data associated with a two-dimensional code based on the detected pixel information, determining a binary data string based on the detected pixel information, and calculating given data uniquely associated with the determined binary data string as the correspondence data, wherein at least one of the steps is executed using a processor.

2. The two-dimensional code recognition method as defined in claim 1, further comprising:

a connection simulation step of performing a connection simulation process in which a point is placed at the point placement reserved position in the two-dimensional region based on the binary data string calculated in the correspondence data calculation step according to a preset binary data string placement condition, and the point and a connection target point are connected according to a preset connection condition; and a line error detection/correction step of performing at least one of an error detection process and an error correction process by comparing a connection state of a sampled point detected from the recognition target image and a connection state of a sampled point obtained by the connection simulation process.

3. The two-dimensional code recognition method as defined in claim 1, further comprising:

a Fibonacci error detection/correction step of performing at least one of an error detection process and an error correction process for the binary data string calculated in the correspondence data calculation step based on a condition of the binary data string expressed by standard Fibonacci representation.

4. The two-dimensional code recognition method as defined in claim 1, further comprising:

a dummy point placement simulation step of performing a simulation process in which a dummy point is placed at a point placement reserved position belonging to a sublayer set in the two-dimensional region other than the main layer according to a preset dummy point placement condition; and a dummy point error detection/correction step of performing at least one of an error detection process and an error correction process by comparing a position of a sampled dummy point detected from the recognition target image and a position of a dummy point obtained by the dummy point simulation process.

5. The two-dimensional code recognition method as defined in claim 1, further comprising:

a step of storing orientation determination information indicating relationship between a value of the binary data string and orientation of the recognition target image; and an orientation determination step of determining the orientation of the recognition target image based on the binary data string calculated in the correspondence data calculation step and the orientation determination information.

6. The two-dimensional code recognition method as defined in claim 1, further comprising:

a recognition target image extraction step of extracting the recognition target image from input image data, wherein the focused point pixel information detection step includes detecting the pixel information based on the recognition target image extracted in the recognition target image extraction step; and wherein the recognition target image extraction step includes:

an outline extraction step of performing an outline extraction process in which an outline of a pixel group formed of continuous pixels having pixel information satisfying a predetermined pixel condition from the image data;

an outline determination step of determining whether or not a trace of the outline extracted in the outline extraction step satisfies a predetermined trace condition;

a pixel information change step of changing the pixel information of pixels forming the outline extracted in the outline extraction step to pixel information other than the pixel information satisfying the predetermined pixel condition when the predetermined trace condition is determined not to be satisfied in the outline determination step; and an extraction step of extracting the image data corresponding to an inner region of the outline extracted in the outline extraction step as the recognition target image when the predetermined trace condition is determined to be satisfied in the outline determination step.

7. The two-dimensional code recognition method as defined in claim 6, further comprising:

a binarization step of subjecting image data to a binarization process, wherein the outline extraction step includes extracting the outline from the image data subjected to the binarization process in the binarization step.

8. The two-dimensional code recognition method as defined in claim 7, further comprising:

a differentiation step of subjecting the image data to a differentiation process; and a blur step of subjecting the image data subjected to the differentiation process in the differentiation process to a blur process in which the pixel information of the focused pixel and peripheral pixels placed around the focused pixel is averaged as new pixel information of the focused pixel, wherein the binarization step includes subjecting the image data subjected to the blur process in the blur step to the binarization process.

9. The two-dimensional code recognition method as defined in claim 8, further comprising:

a line width detection step of detecting a width of a line forming the recognition target image extracted in the recognition target image extraction step, wherein the blur step includes determining the number of times of the blur process based on the detected width and performing the blur process the determined number of times.

10. The two-dimensional code recognition method as defined in claim 7, further comprising:

a line width detection step of detecting a width of a line forming the recognition target image extracted in the recognition target image extraction step, wherein the binarization step includes determining a threshold value used for the binarization process based on the detected width and performing the binarization process by using the determined threshold value.

11. An image recognition device recognizing a two-dimensional code, comprising:

a focused point pixel information detecting section, executed on a processor, which detects a reference point correspondence position of a recognition target image, calculates a focused point correspondence position on a recognition target image corresponding to a focused point set while being associated with a reference point based on the reference point correspondence position, detects pixel information of the recognition target image based on the calculated focused point correspondence position, calculates a point placement reserved position on a recognition target image as the focused point correspondence position while using a point placement reserved position belonging to a main layer in a two-dimensional region as the focused point, and detects the pixel information of the recognition target image based on the calculated point placement reserved position; and a correspondence data calculating section which calculates correspondence data associated with a two-dimensional code based on the detected pixel information, determines a binary data string based on the detected pixel information, and calculates given data uniquely associated with the determined binary data string as the correspondence data.

12. The image recognition device as defined in claim 11, further comprising:

a connection simulation section which performs a connection simulation process in which a point is placed at the point placement reserved position in the two-dimensional region based on the binary data string calculated by the correspondence data calculating section according to a preset binary data string placement condition, and the point and a connection target point are connected according to a preset connection condition; and a line error detection/correction section which performs at least one of an error detection process and an error correction process by comparing a connection state of a sampled point detected from the recognition target image and a connection state of a sampled point obtained by the connection simulation process.

13. The image recognition device as defined in claim 11, further comprising:

a Fibonacci error detection/correction section which performs at least one of an error detection process and an error correction process for the binary data string calculated in the correspondence data calculation step based on a condition of the binary data string expressed by standard Fibonacci representation.

14. The image recognition device as defined in claim 11, further comprising:

a dummy point placement simulation section which performs a simulation process in which a dummy point is placed at a point placement reserved position belonging to a sublayer set in the two-dimensional region other than the main layer according to a preset dummy point placement condition; and a dummy point error detection/correction section which performs at least one of an error detection process and an error correction process by comparing a position of a sampled dummy point detected from the recognition target image and a position of a dummy point obtained by the dummy point simulation process.

15. The image recognition device as defined in claim 11, further comprising:

an orientation determination information storage section which stores orientation determination information that indicates a relationship between a value of the binary data string and an orientation of the recognition target image; and an orientation determination section which determines the orientation of the recognition target image based on the binary data string calculated by the correspondence data calculation section and the orientation determination information stored in the orientation determination information storage section.

16. The image recognition device as defined in claim 11, further comprising:

a recognition target image extraction section which extracts the recognition target image from input image data, wherein the focused point pixel information detection section detects the pixel information based on the recognition target image extracted by the recognition target image extraction section; and wherein the recognition target image extraction section includes:

an outline extraction section which performs an outline extraction process in which an outline of a pixel group formed of continuous pixels having pixel information satisfying a predetermined pixel condition from the image data;

an outline determination section which determines whether or not a trace of the outline extracted by the outline extraction section satisfies a predetermined trace condition;

a pixel information change section which changes the pixel information of pixels forming the outline extracted by the outline extraction section to pixel information other than the pixel information satisfying the predetermined pixel condition when the predetermined trace condition is determined not to be satisfied by the outline determination section; and an extraction section which extracts the image data corresponding to an inner region of the outline extracted by the outline extraction section as the recognition target image when the predetermined trace condition is determined to be satisfied by the outline determination section.

17. The image recognition device as defined in claim 16, further comprising:

a binarization section which subjects image data to a binarization process, wherein the outline extraction process further includes extracting the outline from the image data subjected to the binarization process by the binarization section.

18. The image recognition device as defined in claim 17, further comprising:

a differentiation section which subjects the image data to a differentiation process; and a blur section which subjects the image data subjected to the differentiation process by the differentiation section to a blur process in which the pixel information of the focused pixel and peripheral pixels placed around the focused pixel is averaged as new pixel information of the focused pixel, wherein the binarization section subjects the image data subjected to the blur process by the blur section to the binarization process.

19. The image recognition device as defined in claim 18, further comprising:

a line width detection section which detects a width of a line forming the recognition target image extracted by the recognition target image extraction section, wherein the blur section determines the number of times of the blur process based on the detected width and performs the blur process the determined number of times.

20. The image recognition device as defined in claim 17, further comprising:
a line width detection section detects a width of a line forming the recognition target image extracted by the recognition target image extraction section,
wherein the binarization section determines a threshold value used for the binarization process based on the detected width and performs the binarization process by using the determined threshold value.

21. A non-transitory computer-readable storage medium storing a program that causes a computer to execute a method comprising:
a focused point pixel information detection step of:
detecting a reference point correspondence position of a recognition target image,
calculating a focused point correspondence position on a recognition target image corresponding to a focused point set while being associated with a reference point based on the reference point correspondence position,
detecting pixel information of the recognition target image based on the calculated focused point correspondence position,
calculating a point placement reserved position on a recognition target image as the focused point correspondence position while using a point placement reserved position belonging to a main layer in a two-dimensional region as the focused point, and
detecting the pixel information of the recognition target image based on the calculated point placement reserved position; and
a correspondence data calculation step of:
calculating correspondence data associated with a two-dimensional code based on the detected pixel information,
determining a binary data string based on the detected pixel information, and
calculating given data uniquely associated with the determined binary data string as the correspondence data,
wherein at least on of the steps is executed using a processor.

* * * * *